(12) United States Patent
Godshaw et al.

(10) Patent No.: US 12,048,363 B2
(45) Date of Patent: Jul. 30, 2024

(54) ANTI-THEFT CARRYING STRAPS

(71) Applicant: Travel Caddy, Inc., Franklin Park, IL (US)

(72) Inventors: Donald E. Godshaw, Wilmette, IL (US); Jason Michael Kramer, Greendale, IN (US); Bryce Ryan Hickman, Schaumburg, IL (US); Du Hai, Uncasville, CT (US); Malea Reeves, Chicago, IL (US); Jaclyn Scott, Arlington Heights, IL (US)

(73) Assignee: Travel Caddy, Inc., Franklin Park, IL (US)

( * ) Notice: Subject to any disclaimer, the term of this patent is extended or adjusted under 35 U.S.C. 154(b) by 0 days.

(21) Appl. No.: 17/939,426

(22) Filed: Sep. 7, 2022

(65) Prior Publication Data

US 2022/0408893 A1 Dec. 29, 2022

Related U.S. Application Data

(63) Continuation of application No. 16/508,235, filed on Jul. 10, 2019, now abandoned.

(Continued)

(51) Int. Cl.
*B32B 7/09* (2019.01)
*A45C 3/00* (2006.01)
(Continued)

(52) U.S. Cl.
CPC .............. *A45C 13/18* (2013.01); *A45C 3/001* (2013.01); *A45C 3/06* (2013.01); *A45C 13/02* (2013.01);
(Continued)

(58) Field of Classification Search
CPC ....................................................... B32B 7/09
See application file for complete search history.

(56) References Cited

U.S. PATENT DOCUMENTS

| 161,617 A | 4/1875 | Iden |
|---|---|---|
| 257,003 A | 4/1882 | Harris |

(Continued)

FOREIGN PATENT DOCUMENTS

| DE | 2624309 A1 | 12/1977 |
|---|---|---|
| DE | 2722436 A1 | 11/1978 |

(Continued)

OTHER PUBLICATIONS

Notification Concerning Transmittal of International Preliminary Report on Patentability and International Preliminary Report on Patentability from the International Bureau of WIPO for International Application No. PCT/US2019/041265 dated Jul. 31, 2020, pp. 1-15.

(Continued)

*Primary Examiner* — Andrew T Piziali
(74) *Attorney, Agent, or Firm* — Nancy R. Gamburd; Gamburd Law Group LLC

(57) ABSTRACT

In various embodiments, a carrying bag is disclosed which includes a one or more security panel assemblies comprising a first flexible material layer and a polymeric fiber matrix, such as a polymer fiber-based cut-resistant fabric, matrix or mesh. Various carrying straps are disclosed which include a first flexible fabric or webbing; and a second flexible fabric or webbing comprising a polymeric fiber matrix. Additional polymeric fibers, filaments, cables, threads or yarns may be included in the security panel assemblies and straps, such as cut-resistant monofilament and multifilament fibers comprised of a polyethylene such as ultra high molecular weight polyethylene (UHMAWPE), high-modulus polyethylene (Continued)

(HMPE), or High Performance Polyethylene (HPPE), for example.

19 Claims, 45 Drawing Sheets

Related U.S. Application Data

(60) Provisional application No. 62/695,994, filed on Jul. 10, 2018.

(51) Int. Cl.

| | | |
|---|---|---|
| A45C 3/06 | (2006.01) | |
| A45C 13/02 | (2006.01) | |
| A45C 13/18 | (2006.01) | |
| A45C 13/30 | (2006.01) | |
| A45C 13/36 | (2006.01) | |
| B32B 5/02 | (2006.01) | |
| B32B 5/26 | (2006.01) | |
| B32B 7/12 | (2006.01) | |

(52) U.S. Cl.
CPC .............. *A45C 13/30* (2013.01); *A45C 13/36* (2013.01); *B32B 5/024* (2013.01); *B32B 5/026* (2013.01); *B32B 5/26* (2013.01); *B32B 7/09* (2019.01); *B32B 7/12* (2013.01); *A45C 2003/002* (2013.01); *B32B 2262/02* (2013.01); *B32B 2262/0253* (2013.01); *B32B 2262/0276* (2013.01); *B32B 2262/101* (2013.01); *B32B 2307/581* (2013.01); *B32B 2439/00* (2013.01)

(56) References Cited

U.S. PATENT DOCUMENTS

| | | | |
|---|---|---|---|
| 275,537 A | 4/1883 | Straw | |
| 276,240 A | 4/1883 | Hallidie | |
| 873,195 A | 3/1904 | Willets | |
| 1,166,612 A | 1/1916 | Macaulay | |
| 1,172,708 A | 2/1916 | Hoard | |
| 1,318,183 A | 10/1919 | Schultz | |
| 1,557,382 A | 10/1925 | Sundback | |
| 1,672,322 A | 6/1928 | Keiser et al. | |
| 2,231,198 A | 2/1941 | Scott | |
| 2,254,578 A | 9/1941 | O'Brien | |
| 2,609,898 A | 9/1952 | Finkelstein | |
| 2,635,664 A | 4/1953 | Cohen | |
| 2,663,359 A | 12/1953 | Wood | |
| 3,133,576 A | 5/1964 | Stines | |
| 3,327,365 A | 6/1967 | Damast | |
| 3,443,671 A | 5/1969 | Dyke | |
| 3,587,795 A | 6/1971 | Berry et al. | |
| 3,958,616 A | 5/1976 | Beverstock | |
| 3,971,458 A | 7/1976 | Koenig | |
| 4,153,146 A | 5/1979 | Patton et al. | |
| 4,395,891 A | 8/1983 | Remington | |
| 4,610,334 A | 9/1986 | Pelavin | |
| 4,679,554 A * | 7/1987 | Markham | A61F 5/40 602/70 |
| 4,773,535 A | 9/1988 | Cook | |
| 4,782,556 A | 11/1988 | Kim | |
| 4,792,026 A | 12/1988 | Dimmick et al. | |
| 4,807,640 A | 2/1989 | Watson et al. | |
| 4,885,570 A | 12/1989 | Chien | |
| 4,928,363 A | 5/1990 | Easton | |
| 4,949,401 A | 8/1990 | Kimsey, Jr. | |
| 4,997,222 A | 3/1991 | Reed | |
| 5,031,944 A | 7/1991 | Keyaki | |
| 5,081,855 A | 1/1992 | Terada et al. | |
| 5,100,191 A | 3/1992 | Detrick et al. | |
| 5,257,441 A | 11/1993 | Barlow | |
| 5,361,464 A | 11/1994 | Bunnell | |
| 5,419,951 A * | 5/1995 | Golz | B66C 1/18 139/411 |
| 5,535,491 A | 7/1996 | Allport | |
| 5,579,564 A | 12/1996 | Rullo et al. | |
| 5,586,368 A | 12/1996 | Nelson | |
| 5,743,447 A | 4/1998 | McDermott | |
| 5,855,991 A * | 1/1999 | McLarty, III | D04B 21/20 428/196 |
| 5,915,631 A | 6/1999 | Laxton et al. | |
| 6,026,662 A | 2/2000 | Schlipper | |
| 6,053,385 A | 4/2000 | Ward et al. | |
| 6,070,308 A | 6/2000 | Rohlf | |
| 6,227,015 B1 | 5/2001 | Luquire | |
| 6,244,081 B1 | 6/2001 | Schlipper | |
| 6,314,624 B1 | 11/2001 | Lin | |
| 6,494,512 B1 | 12/2002 | Cada et al. | |
| 6,510,593 B1 | 1/2003 | Kim | |
| 6,536,084 B2 | 3/2003 | Davis | |
| 6,684,404 B2 | 2/2004 | Bachner, Jr. et al. | |
| 6,804,867 B2 | 10/2004 | Oda et al. | |
| 7,020,937 B2 | 4/2006 | Nakatsuka et al. | |
| 7,047,602 B2 | 5/2006 | Wang | |
| 7,069,753 B2 | 7/2006 | Schlipper | |
| 7,155,881 B1 | 1/2007 | McGuire et al. | |
| 7,351,938 B2 | 4/2008 | Keane | |
| 7,454,819 B2 | 11/2008 | Wu | |
| 7,467,529 B1 | 12/2008 | Lai et al. | |
| 7,472,461 B2 | 1/2009 | Anstee | |
| 7,526,843 B2 | 5/2009 | Lin | |
| 7,603,753 B2 | 10/2009 | Baker | |
| 7,661,223 B2 | 2/2010 | Dudney | |
| 7,721,923 B2 | 5/2010 | Holt | |
| 7,743,713 B2 | 6/2010 | Volk et al. | |
| 7,772,973 B2 | 8/2010 | Shih | |
| 7,979,964 B2 | 7/2011 | Jans | |
| 8,015,676 B1 | 9/2011 | Choate | |
| 8,060,994 B2 | 11/2011 | Petzl et al. | |
| 8,082,635 B2 | 12/2011 | Leveau | |
| 8,113,399 B2 | 2/2012 | Lee | |
| 8,234,758 B2 | 8/2012 | Liu | |
| 8,267,290 B2 | 9/2012 | Schlipper | |
| 8,276,247 B2 | 10/2012 | Yang | |
| 8,365,365 B2 | 2/2013 | Schlipper | |
| 8,453,301 B1 | 6/2013 | McCoy | |
| 8,528,115 B2 | 9/2013 | Damon et al. | |
| 8,590,120 B2 | 11/2013 | Sakai | |
| 8,661,861 B2 | 3/2014 | Lai | |
| 8,752,254 B2 | 6/2014 | Perner | |
| 8,978,850 B2 | 3/2015 | Bettua et al. | |
| 2003/0010801 A1 | 1/2003 | Schlipper | |
| 2003/0110818 A1 | 6/2003 | Schlipper | |
| 2003/0141160 A1 | 7/2003 | Schlipper | |
| 2004/0262111 A1 | 12/2004 | Ghiassi | |
| 2005/0059307 A1 | 3/2005 | Moeseke | |
| 2005/0257351 A1 | 11/2005 | Pitts et al. | |
| 2006/0006035 A1 | 1/2006 | Liang | |
| 2006/0102673 A1 | 5/2006 | Collier | |
| 2006/0180619 A1 | 8/2006 | Schlipper | |
| 2006/0249548 A1 | 11/2006 | Holt | |
| 2007/0045072 A1 | 3/2007 | Selvi | |
| 2007/0102469 A1 | 5/2007 | Roth | |
| 2007/0175791 A1 | 8/2007 | Watts | |
| 2007/0209894 A1 | 9/2007 | Selvi | |
| 2007/0240798 A1 | 10/2007 | Bihler | |
| 2008/0085411 A1 | 4/2008 | Prickett | |
| 2008/0196217 A1 | 8/2008 | Eschbach | |
| 2009/0068906 A1 | 3/2009 | Kawano et al. | |
| 2009/0106951 A1 | 4/2009 | Edwards et al. | |
| 2009/0140020 A1 | 6/2009 | Schlipper | |
| 2009/0156096 A1 | 6/2009 | Horta et al. | |
| 2009/0183347 A1 | 7/2009 | Abels | |
| 2011/0010896 A1 | 1/2011 | Schlipper | |
| 2011/0214787 A1 | 9/2011 | Schulte | |
| 2011/0272231 A1 | 11/2011 | Hoberman et al. | |
| 2012/0125494 A1 | 4/2012 | Avganim | |
| 2013/0008752 A1 | 1/2013 | Avganim et al. | |
| 2013/0048164 A1 | 2/2013 | Fleming | |
| 2013/0140120 A1 | 6/2013 | Rasmussen | |
| 2013/0276941 A1 | 10/2013 | Schlipper | |

(56) References Cited

U.S. PATENT DOCUMENTS

| | | | |
|---|---|---|---|
| 2013/0299540 | A1 | 11/2013 | Avganim |
| 2014/0001001 | A1 | 1/2014 | Turpeau |
| 2014/0069757 | A1 | 3/2014 | Schlipper |
| 2014/0090942 | A1 | 4/2014 | Schlipper |
| 2014/0105522 | A1 | 4/2014 | Schlipper |
| 2014/0238801 | A1 | 8/2014 | Lai |
| 2014/0325805 | A1 | 11/2014 | Troiano |
| 2015/0216275 | A9 | 8/2015 | Schlipper |
| 2015/0230571 | A1* | 8/2015 | Godshaw .............. A45C 13/30 150/101 |
| 2016/0348402 | A1* | 12/2016 | Barron ................ E05B 67/003 |
| 2018/0070692 | A1 | 3/2018 | Godshaw et al. |

FOREIGN PATENT DOCUMENTS

| | | |
|---|---|---|
| EP | 0408522 A1 | 1/1991 |
| EP | 0878143 A1 | 11/1998 |
| EP | 1688059 A3 | 8/2006 |
| EP | 1941812 A1 | 7/2008 |
| EP | 2064967 A2 | 6/2009 |
| EP | 1688059 B1 | 3/2011 |
| EP | 2653056 A1 | 10/2013 |
| FR | 760606 B1 | 2/1934 |
| FR | 2601566 A | 7/1986 |
| GB | 026827 A | 11/1910 |
| GB | 162091 A | 4/1921 |
| GB | 1156718 A1 | 7/1969 |
| GB | 2031375 A | 4/1980 |
| GB | 2275174 A1 | 8/1994 |
| GB | 2390295 A1 | 1/2004 |
| JP | 2002363838 A | 12/2002 |
| JP | 2012229806 A1 | 11/2012 |
| WO | WO02/31786 A1 | 4/2002 |
| WO | WO2004068992 A2 | 8/2004 |
| WO | WO2005118990 A1 | 12/2005 |
| WO | WO2009/036657 A1 | 3/2009 |
| WO | WO2011109805 A9 | 9/2011 |

OTHER PUBLICATIONS

Notification of Transmittal of the International Search Report and Written Opinion of the International Searching Authority, or the Declaration from the International Bureau of WIPO for International Application No. PCT/US2019/041265 dated Oct. 29, 2019, pp. 1-16.

Notification of Transmittal of the International Search Report and Written Opinion of the International Searching Authority, or the Declaration from the International Bureau of WIPO for International Application No. PCT/US2015/019332, dated Jun. 19, 2015, pp. 1-19.

Notification of Transmittal of the International Search Report and Written Opinion of the International Searching Authority, or the Declaration from the International Bureau of WIPO for International Application No. PCT/US2012/057298 dated Feb. 1, 2013, pp. 1-5.

Notification of Transmittal of the International Search Report and Written Opinion of the International Searching Authority, or the Declaration from the International Bureau of WIPO for International Application No. PCT/US2010/028557 dated May 26, 2010, pp. 1-10.

Notification Concerning Transmittal of International Preliminary Report on Patentability and International Preliminary Report on Patentability from the International Bureau of WIPO for International Application No. PCT/US2012/057298 dated Apr. 8, 2014, pp. 1-6.

City Safe 100 by PacSafe, Model #2400, Retrieved from http://www.corporatetravelsafety.com/catalog/city-safe-pacsafe-p-340.html, Retrieved on Mar. 24, 2009, 4 pages.

Pacsafe Anti-theft Bags and Travel Security Products Retrieved from: http://www.pacsafe.com/www/index.php?room=7&subRoom=76&sub category id=29/5/10/2010 8:26:12AM (cited as "http://www.pacsafe.com/www/index.php?_room=7&_subRoom=76&sub_category_id=29—bottom of page, in particular 'eXomesh Ultimate removable laminated insert' " in PCT/US2010/028557), 2 pages.

European Patent Office Supplementary Search Report and European Search Opinion, European Patent Application No. 12835469.3, dated May 7, 2015, pp. 1-6.

Australia Patent Examination Report No. 1, Australian Patent Application No. 2012316168, dated Aug. 31, 2015, pp. 1-3.

Notification of Transmittal of the International Search Report and Written Opinion of the International Searching Authority, or the Declaration from the International Bureau of WIPO for International Application No. PCT/US2016/013250, dated Apr. 21, 2016, pp. 1-16.

European Patent Office Supplementary Search Report and European Search Opinion, European Patent Application No. 16188900.1, dated Feb. 16, 2017, pp. 1-5.

European Patent Office Supplementary Search Report and European Search Opinion, European Patent Application No. 15758571.2, dated Jan. 3, 2017, pp. 1-6.

* cited by examiner

ANTI-THEFT CARRYING STRAPS

CROSS-REFERENCE TO A RELATED APPLICATION

This application is a continuation of and claims priority to and the benefit of U.S. patent application Ser. No. 16/508,235, filed Jul. 10, 2019, inventors Donald E. Godshaw et al., titled "Anti-Theft Carrying Straps", which is a nonprovisional of and claims priority to and the benefit of U.S. Provisional Patent Application No. 62/695,994, filed Jul. 10, 2018, inventors Donald E. Godshaw et al., titled "Anti-Theft Carrying Bags and Carrying Straps", which are commonly assigned herewith, the entire contents of which are incorporated herein by reference with the same full force and effect as if set forth in their entireties herein, and with priority claimed for all commonly disclosed subject matter.

FIELD OF THE INVENTION

This invention relates to various types of carrying bags and, more particularly, to a cut or slash-resistant carrying bag with a cut or slash-resistant security panel for carrying bags such as purses, backpacks, messenger bags, briefcases, luggage, and so on, and to cut or slash-resistant carrying straps which may be used with such carrying bags.

BACKGROUND OF THE INVENTION

Handbags, travel bags, purses, backpacks, messenger bags, briefcases, waist packs, draw-string sacks, suitcases, luggage and other types of carrying bags (individually and collectively referred to as "bag(s)" or "carrying bag(s)") are often made from flexible materials such as cloth, canvas, nylon, ballistic nylon, leather and similar materials. Such bags typically include one or more interior chambers through which access may be gained by an opening in the top or side of the bag. Such bags also often include a carry (or carrying) strap which is typically connected between opposite sides of the bag. Additionally, such bags often also include multiple side pockets with top and/or side access openings.

On occasion, such bags are subject to theft or attempted theft. For example, often a bag may be hung or supported by the bag carrying (or carry) strap on a chair or a hook or the like. In such circumstances, a thief may "snatch" the bag by grabbing the carrying strap and departing. Another scheme that has been used by thieves is to use a sharp instrument, such as a knife or box cutter, to cut through the soft-sided material comprising the bag, and thereby gain access to the contents which may be lifted through the cut opening in the bag, or which may fall out from the cut opening of the bag when a lower part of the bag has been slashed. Yet another scheme that has been used by thieves includes various types of pickpocketing, such as by unzipping a zipper in either a stealth manner or while the bag's owner is distracted, and thereby gaining access to the bag's contents while undetected by the bag's owner.

Of additional concern are situations in which a bag may be left unattended or in which the bag's owner may be inattentive or distracted, for any period of time, including brief periods of time. For example, people at a beach may carry their belongings in a purse, a beach bag, a backpack, and so on, and desire to leave the carrying bag on the beach while they swim, wade, splash or surf in the water. In such circumstances, a person's attention is often on their activities, and the carrying bag is not being observed at all or most times, and such an unattended carrying bag is a prime target for potential theft. In other circumstances, the owner of the bag may be inattentive or distracted, such as intentionally distracted by groups or teams of thieves or pickpockets. While the bag is unattended or the attention of the owner is diverted, moreover, a potential thief typically has considerably more time in which to attempt to gain access to the contents of the bag, especially compared with the much more rapidly occurring grabbing, pickpocketing or slashing of a carrying bag.

Accordingly, a need remains for comparatively cut or slash-resistant carrying bags, which are relatively easy and comparatively inexpensive to assemble, which have comparatively thin, non-bulky configurations, and which are light and flexible. A need also remains for additional anti-theft features for carrying straps and openings of bags, to prevent cutting through any strap attached to the bag while nonetheless providing a comfortable and wearable strap, and further to prevent typical "snatching" of bags, to eliminate or diminish the potential for undetected access to the contents of the bag, while nonetheless maintaining a comparatively flexible and attractive style of the bag for the consumer.

SUMMARY

The representative embodiments provide comparatively cut or slash-resistant carrying bags, which are relatively easy and comparatively inexpensive to assemble, which have comparatively thin, non-bulky configurations, and which are light and flexible. The representative embodiments provide comparatively cut or slash-resistant carrying straps, which are also relatively easy and comparatively inexpensive to assemble, which are flexible and comfortable, such as for wearing by a consumer without the strap or parts of the strap digging in to the consumer's shoulder. Representative embodiments include additional anti-theft features for carrying straps and bags, to prevent cutting through any significant panels of the bag (including at or near the seams of panels forming the bag), to prevent cutting through any strap attached to the bag, to prevent typical "snatching" of bags, and further to provide readily and easily usable locking capabilities for straps, including while unattended, to eliminate or diminish the potential for undetected access to the contents of the bag, while nonetheless maintaining a comparatively flexible and attractive style of the bag for the consumer.

In a representative embodiment, a security panel assembly comprises: a first flexible material layer having a first side and a plurality of edges; and a polymeric fiber matrix arranged on the first side of the first flexible material layer, the polymeric fiber matrix comprising at least one polymeric fiber arranged as a plurality of polymeric fiber intersections or crossings, each fiber intersection or crossing comprising at least two sections of the at least one polymeric fiber abutting each other, the at least one polymeric fiber comprising at least one polymeric fiber, filament, cable, thread or yarn.

Such a representative security panel assembly comprise may further comprise: a second flexible material layer arranged adjacent to the polymeric fiber matrix and coupled to the first side of the first flexible material layer. In such an embodiment, the second flexible material layer is coupled to the first flexible material layer with a plurality of stitches, or with an adhesive, or with both a plurality of stitches and an adhesive.

In a representative embodiment, the security panel assembly has a cut-resistance level to withstand an applied cutting force up to 500 grams applied over 20 mm. In another representative embodiment, the security panel assembly has a cut-resistance level to withstand an applied cutting force up to 3,000 grams applied over 20 mm.

In a representative embodiment, one or more portions of the polymeric fiber matrix are not coupled to the first flexible material layer and extend beyond one or more the edges of the first flexible material layer or outside the periphery or circumference of the first flexible material layer.

In various embodiments, the at least one polymeric fiber is a multifilament fiber, cable, thread or yarn. For example, the multifilament fiber, cable, thread or yarn may comprise at least one polymeric fiber, filament, cable, thread or yarn and either or both at least one carbon fiber or at least one metallic wire, fiber, filament, cable, thread or yarn. Also for example, the multifilament fiber, cable, thread or yarn may comprise a combination of at least one first type of cut-resistant, polymeric fiber, filament, cable, thread or yarn and at least one second, different type of polymeric fiber, filament, cable, thread or yarn.

Also for example, the at least one polymeric fiber, filament, cable, thread or yarn may comprise at least one material selected from the group consisting of: aramid; liquid crystal polymer; polyethylene; ultra high molecular weight polyethylene ("UHNWPE") having a molecular mass between 3.5 and 7.5 million Daltons; high-modulus polyethylene ("HMPE"); High Performance Polyethylene ("HPPE"); glass; nylon; polyester; and combinations thereof.

In another representative embodiment, the polymeric fiber matrix is comprised of a plurality of knitted or woven fibers, filaments, cables, threads, or yarns to form the plurality of fiber intersections or crossings.

In various embodiments, the polymeric fiber matrix has an area smaller than first flexible material layer to provide at least one tab or peripheral seam region of the first flexible material layer. In another representative embodiment, the polymeric fiber matrix is coupled to a plurality of strips of first flexible material layers, the plurality of strips of first flexible material layers extending beyond one or more edges of the polymeric fiber matrix to form a plurality of tabs or seam regions.

In a representative embodiment, the polymeric fiber matrix comprises a mesh or netting having a plurality of bonded or coupled polymeric fiber intersections or crossings. In another representative embodiment, the polymeric fiber matrix comprises a plurality of polymeric fibers, filaments, cables, threads or yarns arranged in a crossing or quilting pattern on the first side of the first flexible material layer and extending on a second side of the first flexible material layer or an intervening flexible material layer.

In a representative embodiment, the polymeric fiber matrix is coupled to the first flexible material layer with a plurality of stitches, or with an adhesive, or with both a plurality of stitches and an adhesive.

In a representative embodiment, a carrying bag comprises: an exterior bag having at least one opening for access to an interior of the exterior bag; and a plurality of security panel assemblies arranged within the interior or coupled to the exterior bag, each security panel assembly of the plurality of security panel assemblies comprising a polymeric fiber matrix, wherein a first security panel assembly and a second security panel assembly of the plurality of security panel assemblies are coupled to each other through at least one seam comprising one or more stitches through each of the respective polymeric fiber matrices.

In a representative embodiment, each security panel assembly of the plurality of security panel assemblies has a cut-resistance level to withstand an applied cutting force up to 500 grams applied over 20 mm. In another representative embodiment, each security panel assembly of the plurality of security panel assemblies has a cut-resistance level to withstand an applied cutting force up to 3,000 grams applied over 20 mm.

In a representative embodiment, each security panel assembly of the plurality of security panel assemblies further comprises: a first flexible material layer having a first side and a plurality of edges; wherein the polymeric fiber matrix is arranged on the first side of the first flexible material layer, the polymeric fiber matrix comprising at least one polymeric fiber arranged as a plurality of polymeric fiber intersections or crossings, each fiber intersection or crossing comprising at least two sections of the at least one polymeric fiber abutting each other, the at least one polymeric fiber comprising at least one polymeric fiber, filament, cable, thread or yarn.

In another representative embodiment, each security panel assembly of the plurality of security panel assemblies further comprises: a second flexible material layer arranged adjacent to the polymeric fiber matrix and coupled to the first side of the first flexible material layer. In various embodiments, the second flexible material layer is coupled to the first flexible material layer with a plurality of stitches, or with an adhesive, or with both a plurality of stitches and an adhesive.

In a representative embodiment, at least one polymeric fiber matrix of at least one security panel assembly of the plurality of security panel assemblies is comprised of a plurality of knitted or woven fibers, filaments, cables, threads, or yarns to form the plurality of fiber intersections or crossings. In a representative embodiment the polymeric fiber matrix has an area smaller than first flexible material layer to provide at least one tab or peripheral seam region of the first flexible material layer.

In a representative embodiment, the carrying bag may further comprise: a carrying strap having a cut-resistance level to withstand an applied cutting force up to 3,000 grams applied over 20 mm laterally across the carrying strap, the carrying strap comprising: a first flexible fabric or webbing; and a second flexible fabric or webbing coupled to the first flexible fabric or webbing, the second flexible fabric or webbing comprising a second polymeric fiber matrix.

In another representative embodiment, the carrying bag may comprise an exterior bag having at least one opening for access to an interior of the exterior bag and having a plurality of panels; a plurality of security panel assemblies arranged within the interior or coupled to the exterior bag, each security panel assembly of the plurality of security panel assemblies coupled to a panel of the plurality of panels and comprising a polymeric fiber matrix comprising at least one polymeric fiber arranged as a plurality of polymeric fiber intersections or crossings, wherein a first panel coupled to a first security panel assembly of the plurality of security panel assemblies and a second panel coupled to a second security panel assembly of the plurality of security panel assemblies are coupled to each other through at least one seam comprising one or more stitches through each of the respective polymeric fiber matrices.

In a representative embodiment, a carrying strap comprises: a first flexible fabric or webbing; and a second flexible fabric or webbing coupled to the first flexible fabric or webbing, the second flexible fabric or webbing comprising a polymeric fiber matrix, the polymeric fiber matrix comprising at least one polymeric fiber arranged as a plurality of polymeric fiber intersections or crossings, each fiber intersection or crossing comprising at least two sections of the at least one polymeric fiber abutting each other, the at least one polymeric fiber comprising at least one polymeric fiber, filament, cable, thread or yarn.

In a representative embodiment, the at least one polymeric fiber, filament, cable, thread or yarn is cut-resistant such that the carrying strap has a cut-resistance level to withstand an applied cutting force up to 500 grams applied over 20 mm laterally across the carrying strap. In another representative embodiment, the carrying strap has a cut-resistance level to withstand an applied cutting force up to 3,000 grams applied over 20 mm laterally across the carrying strap.

In a representative embodiment, the second flexible fabric or webbing may further comprise: a first flexible material layer having a first side and a plurality of edges, the polymeric fiber matrix arranged on the first side of the first flexible material layer; and a second flexible material layer arranged adjacent to the polymeric fiber matrix and coupled to the first side of the first flexible material layer with a plurality of stitches, or with an adhesive, or with both a plurality of stitches and an adhesive, to form a security panel assembly.

In a representative embodiment, the at least one polymeric fiber is a multifilament fiber, cable, thread or yarn. In various embodiments, the multifilament fiber, cable, thread or yarn comprises at least one polymeric fiber, filament, cable, thread or yarn and either or both at least one carbon fiber or at least one metallic wire, fiber, filament, cable, thread or yarn. In a representative embodiment, the at least one polymeric fiber, filament, cable, thread or yarn comprises at least one material selected from the group consisting of: aramid; liquid crystal polymer; polyethylene; ultra high molecular weight polyethylene ("UHNWPE") having a molecular mass between 3.5 and 7.5 million Daltons; high-modulus polyethylene ("HMPE"); High Performance Polyethylene ("HPPE"); glass; nylon; polyester; and combinations thereof.

In various embodiments, the polymeric fiber matrix is comprised of a plurality of knitted or woven fibers, filaments, cables, threads, or yarns to form the second flexible fabric or webbing. In various embodiments, the polymeric fiber matrix comprises a mesh or netting having a plurality of bonded or coupled polymeric fiber intersections or crossings. In various embodiments, the polymeric fiber matrix comprises a plurality of polymeric fibers, filaments, cables, threads or yarns arranged in a crossing or quilting pattern on a first side of a first flexible material layer and extending on a second side of the first flexible material layer or an intervening flexible material layer. In various embodiments, the at least one polymeric fiber is a monofilament fiber, cable, or thread.

In a representative embodiment, the second flexible fabric or webbing is coupled to the first flexible fabric or webbing with a plurality of stitches, or with an adhesive, or with both a plurality of stitches and an adhesive.

In a representative embodiment, the first flexible fabric or webbing is tubular and further comprises a lumen, and wherein the second flexible fabric or webbing is arranged within the lumen.

In another representative embodiment, the first flexible fabric or webbing has first and second lateral folds, and wherein the second flexible fabric or webbing is arranged within the first and second lateral folds.

In a representative embodiment, the carrying strap may further comprise: a third flexible fabric or webbing coupled over the first and second lateral folds of the first flexible fabric or webbing to enclose the second flexible fabric or webbing between the first flexible fabric or webbing and the third flexible fabric or webbing. In such a representative embodiment, the first flexible fabric or webbing further may have first and second central folds over the second flexible fabric or webbing.

In a representative embodiment, the carrying strap may further comprise: a third flexible fabric or webbing arranged in between the second flexible fabric or webbing and the first and second central folds of the first flexible fabric or webbing to enclose the second flexible fabric or webbing between the first flexible fabric or webbing and the third flexible fabric or webbing.

In a representative embodiment, the carrying strap may further comprise: a plurality of cut-resistant monofilament polymer fibers arranged within the first and second lateral folds.

In various embodiments, the first flexible fabric or webbing has a first lateral fold on a first lateral side, wherein the second flexible fabric or webbing is arranged within the first lateral fold; and wherein the carrying strap further comprises: a third flexible binding coupled over the first flexible fabric or webbing on a second lateral side to enclose the second flexible fabric or webbing between the first flexible fabric or webbing and the third flexible binding.

In another representative embodiment, the first flexible fabric or webbing has a first lateral fold on a first lateral side to form two layers of the first flexible fabric or webbing, wherein the second flexible fabric or webbing is arranged within the first lateral fold and wherein a plurality of stitches couple the two layers of the folded first flexible fabric or webbing on the second lateral side. In such a representative embodiment, each of the two layers of the folded first flexible fabric or webbing may have a lateral fold on the second lateral side, wherein a plurality of stitches couple the lateral folds of the two layers of the folded first flexible fabric or webbing on the second lateral side.

In another representative embodiment, the second flexible fabric or webbing has a form factor of a plurality of flexible bindings, a first flexible binding of the plurality of flexible bindings coupled over the first flexible fabric or webbing on a first lateral side and a second flexible binding of the plurality of flexible bindings coupled over the first flexible fabric or webbing on a second lateral side.

In another representative embodiment, the second flexible fabric or webbing has a first side and a second side and first and second lateral edges, the first flexible fabric or webbing is arranged on the first side of the second flexible fabric or webbing; and wherein the carrying strap may further comprise: a third flexible fabric or webbing arranged on the second side of the second flexible fabric or webbing and coupled to the first flexible fabric or webbing laterally to the first and second lateral edges of the second flexible fabric or webbing.

In another representative embodiment, the second flexible fabric or webbing has a first side and a second side and first and second lateral edges, the first flexible fabric or webbing is arranged on the first side of the second flexible fabric or webbing; and wherein the carrying strap may further comprise: a third flexible fabric or webbing arranged on the second side of the second flexible fabric or webbing; a first flexible binding of a plurality of flexible bindings coupled over the first and third flexible fabrics or webbings on a first lateral side; and a second flexible binding of the plurality of flexible bindings coupled over the first and third flexible fabrics or webbings on a second lateral side.

In another representative embodiment, the first flexible fabric or webbing has a first lateral fold on a first lateral side; and wherein the carrying strap may further comprise: a third flexible fabric or webbing offset laterally from the first flexible fabric or webbing, the third flexible fabric or webbing having a second lateral fold on a second lateral side; wherein the second flexible fabric or webbing is arranged within the first lateral fold and the second lateral fold. In such a representative embodiment, the first flexible fabric or webbing may have a first lateral region and a second lateral region, the third flexible fabric or webbing may have a first lateral region and a second lateral region, wherein the first lateral regions of the first and third flexible fabrics or webbings are coupled to a first side of the second flexible fabric or webbing and the second lateral regions of the first and third flexible fabrics or webbings are coupled to a second side of the second flexible fabric or webbing to enclose the second flexible fabric or webbing between the first flexible fabric or webbing and the third flexible fabric or webbing.

In another representative embodiment, the second flexible fabric or webbing has first and second lateral folds, and wherein the first flexible fabric or webbing is arranged within the first and second lateral folds. In such a representative embodiment, the second flexible fabric or webbing further may have first and second central folds over the first flexible fabric or webbing.

In another representative embodiment, the first flexible fabric or webbing has first and second lateral folds, wherein the second flexible fabric or webbing has first and second lateral folds and is arranged within the first and second lateral folds of the first flexible fabric or webbing; and wherein the carrying strap may further comprise: a plurality of cut-resistant monofilament polymer fibers arranged within the first and second lateral folds of the second flexible fabric or webbing. In such a representative embodiment, the first flexible fabric or webbing further may have first and second central folds over the second flexible fabric or webbing.

In another representative embodiment, the first flexible fabric or webbing has first and second lateral folds, wherein the second flexible fabric or webbing has first and second lateral folds and is arranged within the first and second lateral folds of the first flexible fabric or webbing; and wherein the carrying strap may further comprise: a third flexible fabric or webbing coupled to the folded first flexible fabric or webbing on a first side; and at least one cut-resistant monofilament polymer fiber arranged centrally between the first side of the folded first flexible fabric or webbing and the third flexible fabric or webbing.

In various embodiments, the first flexible fabric or webbing has first, second and third lateral folds to form a first bottom layer, a second top layer, a third intermediate layer and a fourth intermediate layer, wherein the second flexible fabric or webbing is arranged within the first and second lateral folds of the first flexible fabric or webbing; and wherein the carrying strap may further comprise: at least one cut-resistant monofilament polymer fiber arranged centrally between the third and fourth intermediate layers of the first flexible fabric or webbing.

In another representative embodiment, the first flexible fabric or webbing has first, second and third lateral folds to form a first bottom layer, a second top layer, a third intermediate layer and a fourth intermediate layer, wherein the second flexible fabric or webbing is arranged within the third lateral fold of the first flexible fabric or webbing; and wherein the carrying strap may further comprise: at least one cut-resistant monofilament polymer fiber arranged centrally between the third and fourth intermediate layers of the first flexible fabric or webbing.

In various embodiments, the first flexible fabric or webbing has first, second and third lateral folds to form a first bottom layer, a second top layer, a third intermediate layer and a fourth intermediate layer, wherein the second flexible fabric or webbing is arranged within the first, second and third lateral folds of the first flexible fabric or webbing; and wherein the carrying strap may further comprise: at least one cut-resistant monofilament polymer fiber arranged centrally between the third and fourth intermediate layers of the first flexible fabric or webbing.

In a representative embodiment, the carrying strap may comprise: a first flexible fabric or webbing; and a cut-resistant polymeric fiber matrix extending longitudinally along or within the first flexible fabric or webbing, the polymeric fiber matrix comprising at least one polymeric fiber arranged as a plurality of polymeric fiber intersections, each fiber intersection comprising at least two sections of the at least one polymeric fiber abutting each other, the at least one polymeric fiber comprising at least one polymeric fiber, filament, cable, thread or yarn; wherein the first flexible fabric or webbing and cut-resistant polymeric fiber matrix collectively have a cut-resistance level to withstand an applied cutting force up to 3,000 grams applied over 20 mm laterally across the carrying strap.

In such a representative embodiment, the polymeric fiber matrix may be woven or braided into the first flexible fabric or webbing. In another representative embodiment, the polymeric fiber matrix comprises a plurality of warp cut-resistant polymeric fibers, filaments, cables, threads or yarns.

In a representative embodiment, the carrying strap may comprise: a first flexible fabric or webbing; and a security panel assembly coupled to the first flexible fabric or webbing, the security panel assembly comprising: a first flexible material layer having a first side and a plurality of edges; and a polymeric fiber matrix arranged on the first side of the first flexible material layer, the polymeric fiber matrix comprising at least one polymeric fiber arranged as a plurality of polymeric fiber intersections or crossings, each fiber intersection or crossing comprising at least two sections of the at least one polymeric fiber abutting each other, the at least one polymeric fiber comprising at least one polymeric fiber, filament, cable, thread or yarn; a second flexible material layer arranged adjacent to the polymeric fiber matrix and coupled to the first side of the first flexible material layer with a plurality of stitches, or with an adhesive, or with both a plurality of stitches and an adhesive.

Numerous other advantages and features of the present invention will become readily apparent from the following detailed description of the invention and the embodiments thereof, from the claims and from the accompanying drawings.

BRIEF DESCRIPTIONS OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters and/or numeric subscripts are utilized to identify parts or subparts of a component or additional types, instantiations or variations of a selected component embodiment in the various views, as further indicated by textual context, in which.

DETAILED DESCRIPTION OF REPRESENTATIVE EMBODIMENTS

Figure 1:
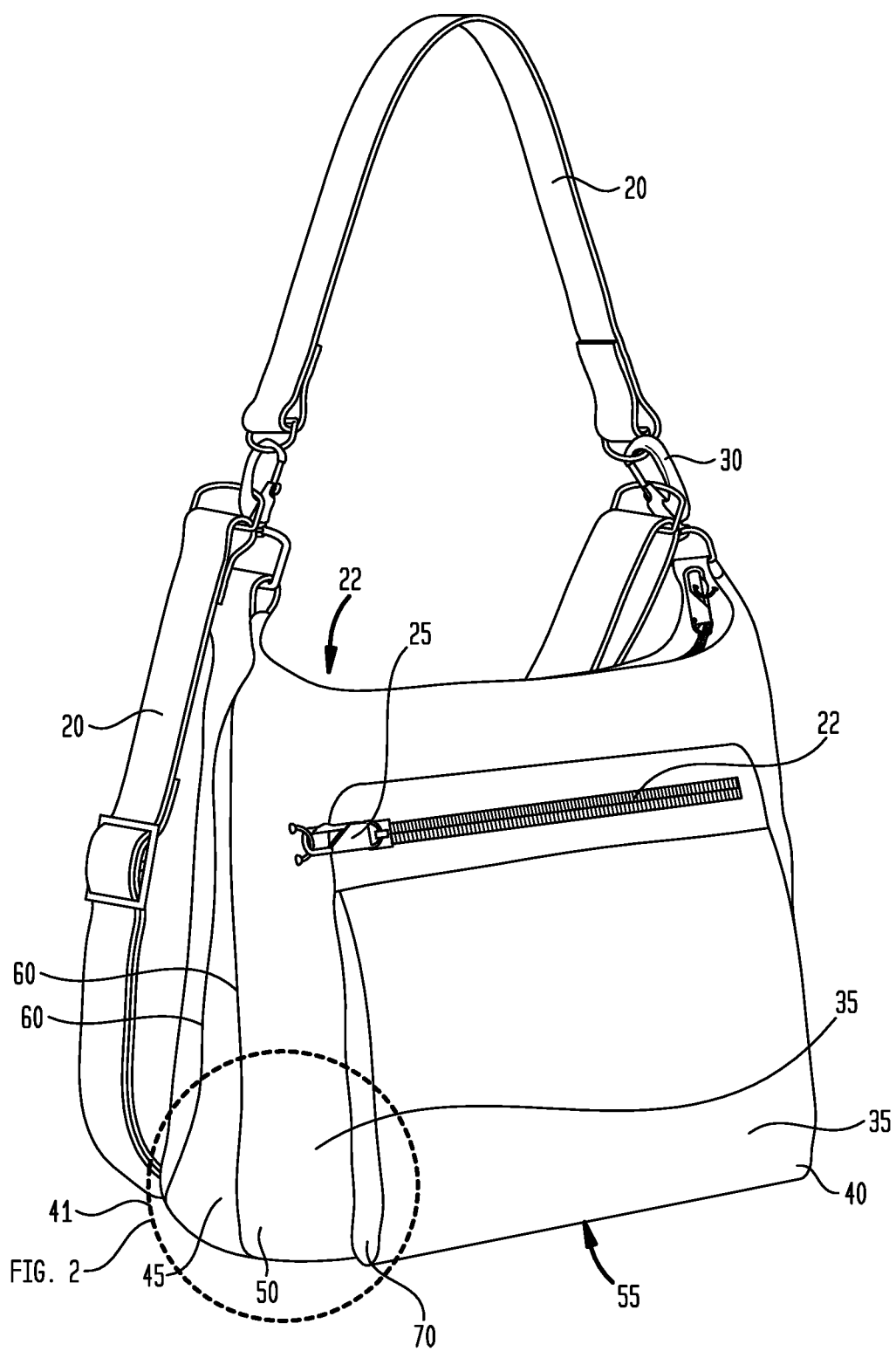
FIG. 1 is an isometric view of a typical purse or shoulder bag incorporating various features of a representative carrying bag embodiment.

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

Reference is made to the following patent applications and issued patents, the entire contents of which are incorporated herein by reference with the same full force and effect as if set forth in their entirety herein (individually and collectively referred to as the "related applications"): U.S. patent application Ser. No. 15/879,194; U.S. patent application Ser. No. 15/879,149; U.S. Pat. Nos. 9,655,424; 9,486, 047; U.S. patent application Ser. No. 15/484,472; U.S. Pat. Nos. 8,925,181; 9,854,890; 9,854,883; U.S. patent application Ser. No. 14/641,173; U.S. Pat. Nos. 9,675,153; and 9,681,716.

Various embodiments of security panel assemblies 100A-100J are illustrated in the various Figures and discussed below and, as a result, any reference herein to a security panel assembly 100 shall be understood to mean and include any and all of the various security panel assembly and subassembly embodiments disclosed herein, including without limitation security panel assemblies 100A-100J. Various embodiments of carrying straps 20A-20T are illustrated in the various Figures and discussed below and, as a result, any reference herein to a carrying strap 20 shall be understood to mean and include any and all of the various carrying strap embodiments disclosed herein, including without limitation carrying straps 20A-20T illustrated and discussed below with reference to FIGS. 38-75.

While various first, second, third, etc. material layers, fabrics, webbings, etc., are illustrated and discussed herein, it should also be noted that the usage of first, second, third, etc. in the claims may differ and may not track the usage in describing the Figures, e.g., depending upon and due to the ordering of the claim elements. For example, the claims may refer to a first fabric or webbing because it is listed as a first claim element, while the detailed description may refer to it as a second fabric or webbing, and vice-versa, particularly as the various embodiments may refer to the same feature or element which is utilized in different structures of the different embodiments. For example, the detailed description may refer to a first webbing material 210 which does not include a polymeric fiber matrix 125 and to a second fabric or webbing material 284 which does include a polymeric fiber matrix 125, while due to the ordering of claim elements, the claims may refer to a first fabric or webbing material which does include a polymeric fiber matrix and a second fabric or webbing material which does not include a polymeric fiber matrix.

Figure 2:
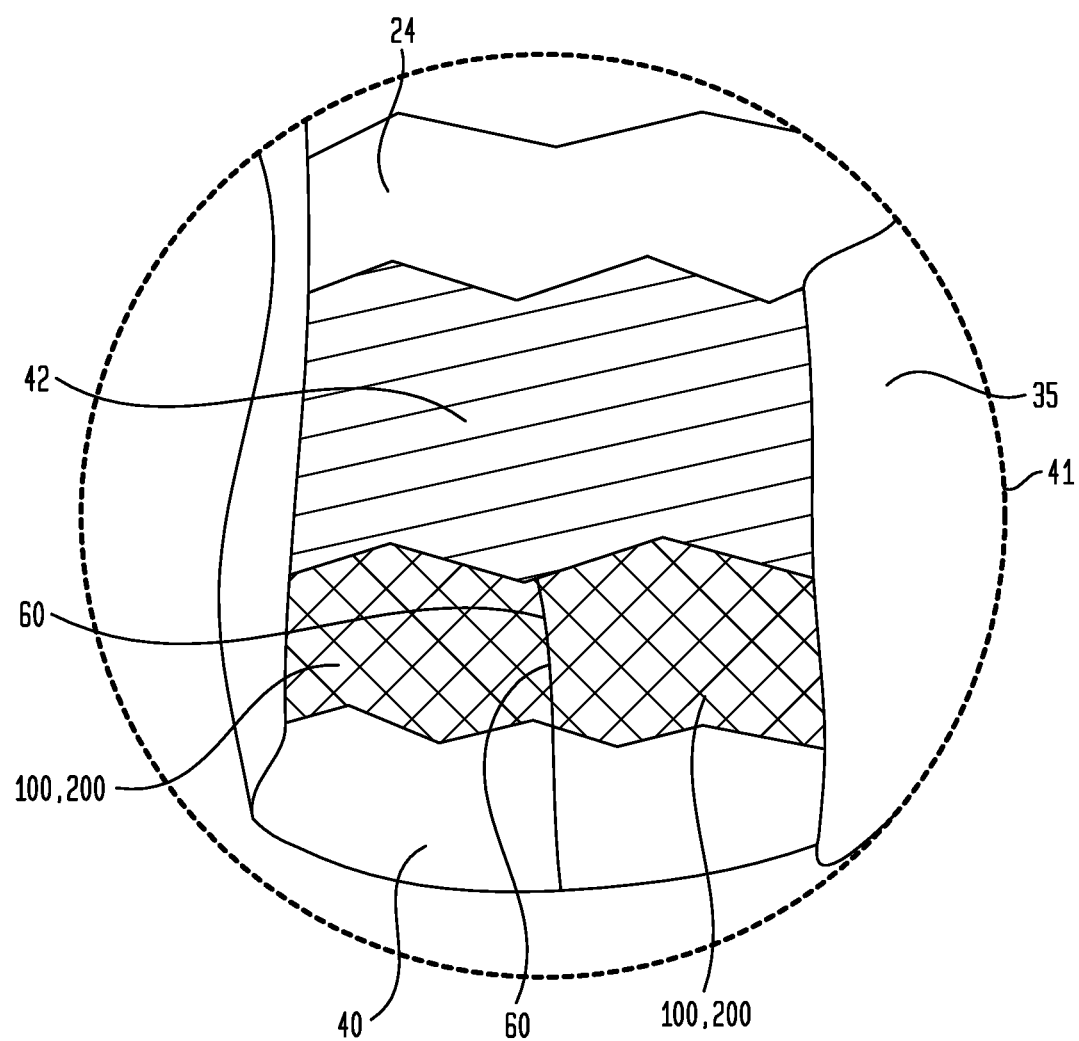
FIG. 2 is an isometric, partial cut-away view of the typical purse or shoulder bag of FIG. 1 showing the placement of a security panel assembly within or as part of the exterior bag.
Figure 3:
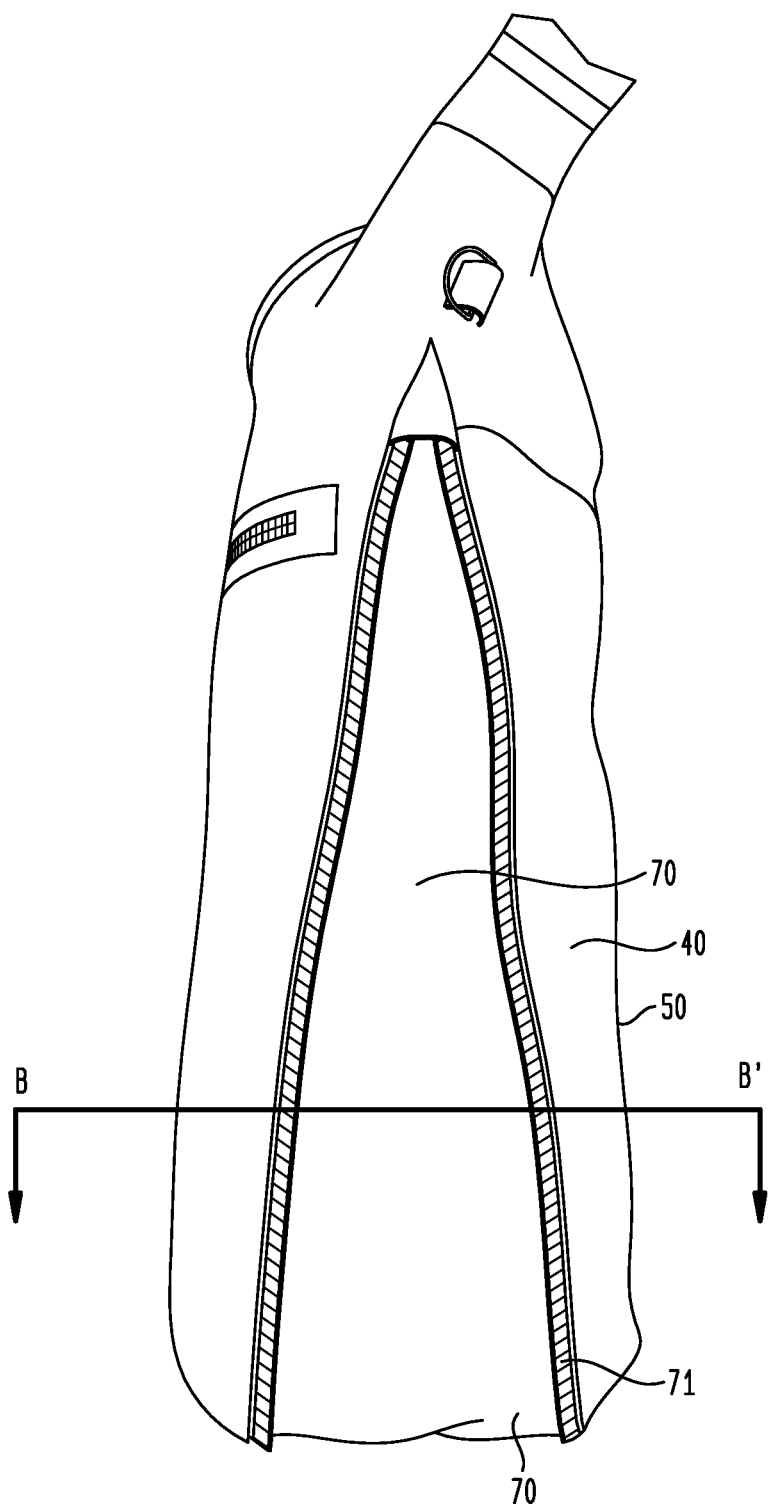
FIG. 3 is an isometric view illustrating an expandable gusset formed using a plurality of representative nonmetallic, cut-resistant yarn or fiber-based embodiments of security panel assemblies.

FIG. 1 is an isometric view of a typical purse or shoulder bag 50 incorporating various features of a representative carrying bag 50 embodiment. FIG. 2 is an isometric cut-away view of the typical purse or shoulder bag 50 of FIG. 1 showing the placement of a security panel assembly 100 within the exterior of the bag 50 or formed as part of the exterior material 40. FIG. 3 is an isometric view illustrating an expandable gusset 70 formed using a plurality of representative nonmetallic, cut-resistant yarn or fiber-based embodiments of security panel assemblies 100. Such one or more security panel assemblies 100 are typically arranged along or as part of the various panels forming the representative carrying bag 50 embodiment, such as along or as part of a front panel 35, a side panel 45, a bottom panel 55, for example and without limitation. In a representative embodiment, the one or more security panel assemblies 100 are typically sewn, adhered, or otherwise coupled or attached into one or more seams 60 which couple the various panels together to form the representative carrying bag 50 embodiment. In other representative embodiment, the one or more security panel assemblies 100 are typically sewn, adhered, or otherwise coupled or attached into or form part of the various panels which are then coupled to form the representative carrying bag 50 embodiment.

As discussed in the related applications, in addition to incorporating one or more security panel assemblies 100 and a cut-resistant strap 20, the representative carrying bag 50 embodiment generally or optionally includes other security features, such as locking zipper pulls 25 (for a zippered opening 22 to provide access to the interior 24 of the bag 50) and locking snap hooks 30 coupling the strap 20 to the carrying bag 50. Such a representative carrying bag 50 embodiment may have any selected or desired form or style, including as shown at https://www.travelonbags.com/anti-theft, such as a purse, a backpack, a briefcase, a laptop or tablet case, a weekender bag, a crossbody bag, etc., also for example and without limitation.

The various Figures illustrate nonmetallic, fiber-based security panel assemblies 100 and nonmetallic, fiber-based carrying straps 20. Instead of utilizing a metallic wire or cable to form a wire matrix, for these representative security panel assemblies 100 and carrying straps 20, a non-metallic, substantially cut-resistant polymer-based fiber, thread or yarn (individually and collectively referred to as a "fiber") 110 is utilized, such as a Kevlar® aramid fiber, thread or yarn available from DuPont of Wilmington, Del. US, or a Vectran® liquid crystal polymer multifilament fiber, thread or yarn available from Kuraray America Inc. of Houston, Texas US, or any of the various other non-metallic, substantially cut-resistant polymer-based fibers, threads or yarns described below or as otherwise known in the art, including ultra high molecular weight polyethylene ("UHMIWPE"), high-modulus polyethylene ("HMPE"), High Performance Polyethylene ("HPPE"), for example and without limitation. In addition, a security panel assembly 100 also may include a substantially cut-resistant fabric comprising a plurality of interwoven, spun, blown, or otherwise embedded or linked, substantially cut-resistant polymer-based fibers, threads or yarns 110. The various security panel assemblies may also include spaced-apart fibers 110 forming a polymeric fiber matrix 125 (illustrated in FIGS. 10-12, for example), and may be interwoven with other types of threads, yarns or fibers, as discussed in greater detail below.

Figure 4:
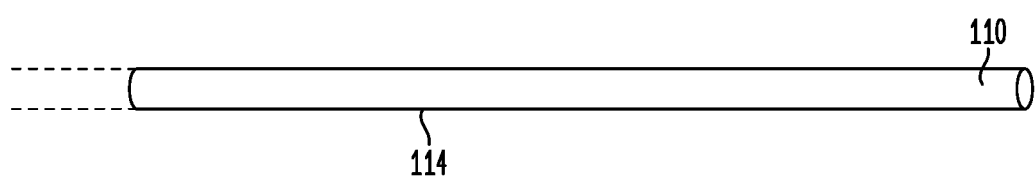
FIG. 4 is an isometric view illustrating a monofilament nonmetallic, cut-resistant yarn or fiber used in various embodiments of a security panel assembly and/or a carrying strap.

FIG. 4 is an isometric view illustrating a monofilament nonmetallic, cut-resistant yarn or fiber 114 used in various embodiments of a security panel assembly 100 and/or a carrying strap 20. Such a monofilament nonmetallic, cut-resistant yarn or fiber 114 is formed as a comparatively thick or larger diameter cut-resistant polymer-based fibers, threads or yarns 110, for example and without limitation.

Figure 5:
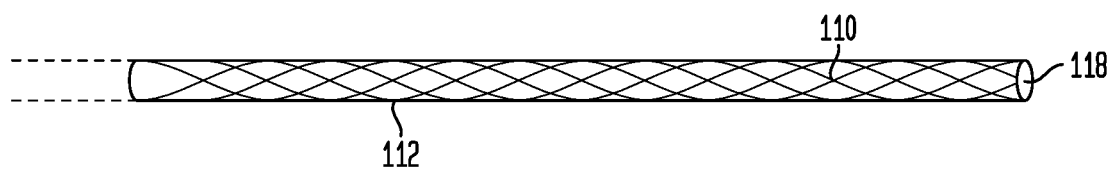
FIG. 5 is an isometric view illustrating a first, woven type of multifilament nonmetallic, cut-resistant yarn or fiber used in various embodiments of a security panel assembly and/or a carrying strap.

FIG. 5 is an isometric view illustrating a first, woven type of multifilament nonmetallic, cut-resistant yarn or fiber 112 used in various embodiments of a security panel assembly 100 and/or a carrying strap 20. As illustrated in FIG. 5, a representative multifilament nonmetallic, cut-resistant yarn or fiber 112 is comprised of a plurality of cut-resistant polymer-based fibers, threads or yarns 110 which are woven together, optionally around a core or cording 118. Such a core or cording 118 may be comprised of any suitable material, such as any type of polymer, and may or may not itself be comprised of one or more cut-resistant polymer-based fibers, threads or yarns 110, for example and without limitation.

Figure 6:
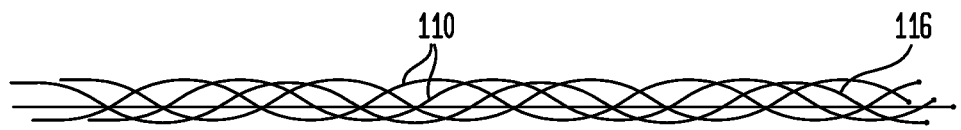
FIG. 6 is an isometric view illustrating a second, braided type of multifilament nonmetallic, cut-resistant yarn or fiber used in various embodiments of a security panel assembly and/or a carrying strap.

FIG. 6 is an isometric view illustrating a second, braided type of multifilament nonmetallic, cut-resistant yarn or fiber 116 used in various embodiments of a security panel assembly 100 and/or a carrying strap 20. As illustrated in FIG. 6, a representative multifilament nonmetallic, cut-resistant yarn or fiber 116 is comprised of a plurality of cut-resistant polymer-based fibers, threads or yarns 110 which are braided together. Any type of weaving, braiding, spinning, blowing, etc. method may be utilized to form any of the various multifilament nonmetallic, cut-resistant yarn or fiber 112, 116, and any and all such variations are within the scope of the disclosure.

It should be noted that any reference to cut-resistant, polymeric fibers, filaments, cables, threads or yarns 110, 112, 114, or 116 should be understood to mean and include any one or more of the cut-resistant, polymeric fibers, filaments, cables, threads or yarns 110, 112, 114, or 116, rather than all of the various nonmetallic, cut-resistant yarns or fibers 110, 112, 114, and 116. The various Figures also illustrate the use of various fabrics, webbings, or other flexible materials, which may or may not include cut-resistant, polymeric fibers, filaments, cables, threads or yarns 110, 112, 114, or 116. As used herein, "fabric" and/or "webbing" should be understood to mean and include any type of woven or nonwoven flexible material, such as a flexible material formed from weaving, braiding, spinning, blowing, etc. of any type of natural or synthetic thread, yarn, or fiber, including any type of natural or synthetic leather, suede, or sponge, for example and without limitation, and any and all such variations are within the scope of the disclosure.

In addition, this polymeric fiber matrix 125 may also be included or embedded in the webbing utilized to form a substantially cut-resistant carry strap. For such embodiments, the cut-resistant, polymeric fibers, filaments, cables, threads or yarns 110, 112, 114, or 116 is or are typically woven with the other fiber material comprising the webbing during manufacture. Also for such embodiments, an additional cut-resistant metallic cable may not be required to provide the desired level of security.

Combinations of different types of material may also be utilized to form the various fibers 110. For example and without limitation, a cut-resistant fiber 110 may be combined with metallic or carbon fibers or threads, or elastic or rubber fibers or threads, in any of various combinations, such as a combination of steel and polymer.

Any type of weaving, braiding or knitting may be utilized, and as illustrated in the various Figures, to form a security panel assembly, a carrying strap, or a fiber 110. For example, a security panel assembly may include a substantially cut-resistant, knitted fabric comprising a plurality of abutting, knitted and substantially cut-resistant polymer-based fibers, threads or yarns 110.

The various fibers 110 for the representative security panel assemblies and carrying straps may be spaced-apart or abutting, and may be interwoven with other types of threads, yarns or fibers (including metallic fibers, wires, yarns or threads), creating a substantially cut-resistant fabric or mesh having any type of finish or weave to create any desired flexibility, stretchability, texture, or other property of a fabric, for example and without limitation.

In addition to the various substantially cut-resistant polymer-based fibers, threads or yarns discussed above, the substantially cut-resistant polymer-based fibers, threads or yarns 110 forming representative security panel assemblies and carrying straps, may be comprised of a wide variety of materials and compounds, including for example and without limitation: polyethylene fibers, threads or yarns, such as ultra high molecular weight polyethylene ("UHMWPE", e.g., a thermoplastic polyethylene having a molecular mass between about 3.5 and 7.5 million atomic mass units (Daltons), high-modulus polyethylene ("HMPE"), High Performance Polyethylene ("HPPE"); glass fibers, threads or yarns; nylon fibers, threads or yarns; Cuben Fiber (a laminated fabric constructed from Ultra High Molecular Weight Polyethylene (UHMWPE) fiber monofilaments and polyester, PVF etc. films) ("CTF3"). The resulting security panel assemblies 100 and carrying straps 20, and cut-resistant polymer-based fibers, threads or yarns 110, may have any desired level of cut-resistance or other properties to meet any applicable standard, such as the American National Standards Institute ("ANSI") cut level A1-A9 standards or the EN388 standard, for various properties such as blade cut-resistance, abrasion resistance, tear resistance, and puncture resistance.

For example and without limitation, in a representative embodiment, the representative security panel assemblies and carrying straps, may have the following specification: ISO 13997:1999 Blade Cut Resistance Level 5=31.5 Newton, ANSI/ISEA 2016 Blade Cut Resistance Level A5/A6=3007 grams/force (2200 grams minimum); EN 388: 2003 Tear Strength Level 4=518.2 Newton; EN 388:2003 Abrasion Resistance Level 4=more than 8,000 cycles, and EN 388.2003 Puncture Resistance Level 4=271.6 Newton. Various substantially cut-resistant polymer-based fibers, threads or yarns are available commercially, including Dyneema® (and Cubic Tech) from Royal DSM N.V., The Netherlands and Stanley, North Carolina, U.S.; Cut-Tex® PRO from PPSS Group, United Kingdom; and Spectra® by Honeywell, Colonial Heights, Virginia, U.S. The security panel assembly also may have any selected coating, such as a rubber or polymer coating, for example and without limitation. In the various illustrated embodiments, such nonmetallic, cut-resistant yarns or fibers 110 may appear as yellow in color, and in some embodiments, is also referred to as "fishing" lines or cut-resistant material ("CRM") filaments.

As used herein, unless otherwise specified, "cut-resistant" for a security panel assembly 100 or fabric 200 means and includes a capability to meet or exceed (equal or be greater than) the American National Standards Institute ("ANSI") ANSI/ISEA 105 (2016) cut level A2 within a predetermined distance interval of at least 5 cm, i.e., to provide resistance to cutting by a moving blade having an applied force up to 500 grams as the blade is moved or attempted to be moved over or across a distance of 5 cm or more within 10 seconds. For example, a security panel assembly 100 may be initially punctured by a blade in areas of the security panel assembly 100 in which there is no cut-resistant polymer-based fiber, thread or yarn 110, but as the blade is moved, within 5 cm of the point of puncture, the blade will encounter a resistance to cutting which meets or exceeds ANSI/ISEA 105 (2016) cut level A2. Continuing with the example, in a representative embodiment, the movement of such a cutting blade applied force up to 500 grams generally will be stopped within such a 5 cm interval. A material which is not considered particularly "cut-resistant", such as a cotton fabric of a T-shirt for example, is capable of being cut by a moving blade having an applied force less than 500 grains as the blade is moved or attempted to be moved over or across a distance of 5 cm or more.

For a carrying strap 20 to provide an anti-theft feature, it need only provide resistance to cutting laterally across the strap 20, such that the strap 20 is not cut into two or more separate pieces, which would enable it to be detached from the wearer's shoulder or from a chair, for example. As used herein, unless otherwise specified, "cut-resistant" for a carrying strap 20 means and includes a capability to meet or exceed (equal or be greater than) the American National Standards Institute ("ANSI") ANSI/ISEA 105 (2016) cut level A2 within a predetermined distance interval of at least 5 cm laterally across the carrying strap 20, i.e., to provide resistance to cutting by a moving blade having an applied force up to 500 grams as the blade is moved or attempted to be moved laterally (i.e., perpendicular to its length or longitudinal dimension) across the carrying strap 20 over or across a distance of 5 cm or more within 10 seconds.

For example and without limitation, representative embodiments of the security panel assembly 100 and carrying straps 20 meet or exceed ANSI/ISEA 105 (2016) cut level A4 or A5, for example and without limitation, withstanding an applied force up to 1,500 grams or 2,200 grams respectively as the blade is moved or attempted to be moved over or across a distance of 20 mm. For example and without limitation, representative embodiments of the security panel assembly 100 and carrying straps 20 meet or exceed ANSI/SEA 105 (2016) cut level A6, for example and without limitation, withstanding an applied force up to 3,000 grams as the blade is moved or attempted to be moved over or across a distance of 20 mm.

The various cut-resistant polymer-based fibers, threads or yarns 110 utilized to form the representative security panel assemblies and carrying straps and/or to form any of the protected seams, may comprise a single strand or multiple strands, with any selected thread count, which in turn may be twisted or braided, for example and without limitation, such as "super braid", "extreme braid", polyethylene-based filament lines such as braided lines of Dyneema® and Spectra®, fishing lines, and which also may be coated, such as to have a slippery coating or film, such as a silicone, plastic, other polymer, or wax coating, also for example and without limitation.

The security panel assembly 100 may be configured to have any desired shape or size, such as rectangular, square, circular, trapezoidal, cuboid, rhomboidal, a parallelepiped, ovoid or ellipsoid, or any and all other shapes and sizes, for example and without limitation.

The substantially cut-resistant polymer-based fibers, threads or yarns 110 may be comprised of any nonmetallic wire, cable, fiber, thread or yarn, twisted or untwisted, braided or unbraided, coated or uncoated, and any and all combinations of metallic and nonmetallic wires, cables, fibers, threads or yarns. For example and without limitation, substantially cut-resistant polymer-based fibers, threads or yarns 110 may be combined with or further comprised of one or more metallic (e.g., steel, titanium) or polymeric fibers, wires, threads or yarns, or various combinations of different materials, including any and all of the various polymeric fibers, threads or yarns 110 discussed above, and as may be combined in any of various ways, such as with metallic or carbon fibers or threads, metal alloys, or elastic or rubber fibers or threads, in any of various combinations, such as a combinations of steel and polymer. In a representative embodiment, the substantially cut-resistant polymer-based fibers, threads or yarns 110 are selected for a combination of flexibility and cut-resistance, not just tensile strength, and may have any of various compositions which may include multiple metallic or nonmetallic wires, cables, fibers, threads or yarns, including steel wires, cables, fibers, threads or yarns, such as configured as twisted or untwisted 1×3, 1×7, 1×19, 3×7, 7×7, 7×19, 7×37, etc., wires, cables, fibers, threads or yarns, for example and without limitation.

For example and without limitation, forming a polymeric fiber, thread or yarn 110 are a plurality of high modulus polyethylene fibers such as UHMAWPE or HPPE, with a center core, and a plurality of strands (or roots) of it braided together around the core, such as eight fibers around the core, typically formed using a cable knitting machine or another twisting mechanism for the braid. The amount of UHMWPE or HPPE in any of the polymeric fibers, threads or yarns 110 may be varied as may be necessary or desirable to meet any selected specification, and a representative embodiment utilizes 100% UHMWPE, for example and without limitation. Specialized cutters, as known in the art, are utilized to cut the polymeric fibers, threads or yarns 110 or polymeric fiber matrix 125 to the desired length or size.

Additional wire cables or fibers may also be included in any of the various straps, and polymeric fibers, threads or yarns 110 may be substituted for any specification of one or more wire cables in any of the various straps, and vice-versa.

Those having skill in the art will recognize that additional variations of the structure of representative security panel assemblies and carrying straps are available, and all such variations are considered equivalent and within the scope of the disclosure, as disclosed in the patent applications described above and incorporated herein by reference.

Figure 7:
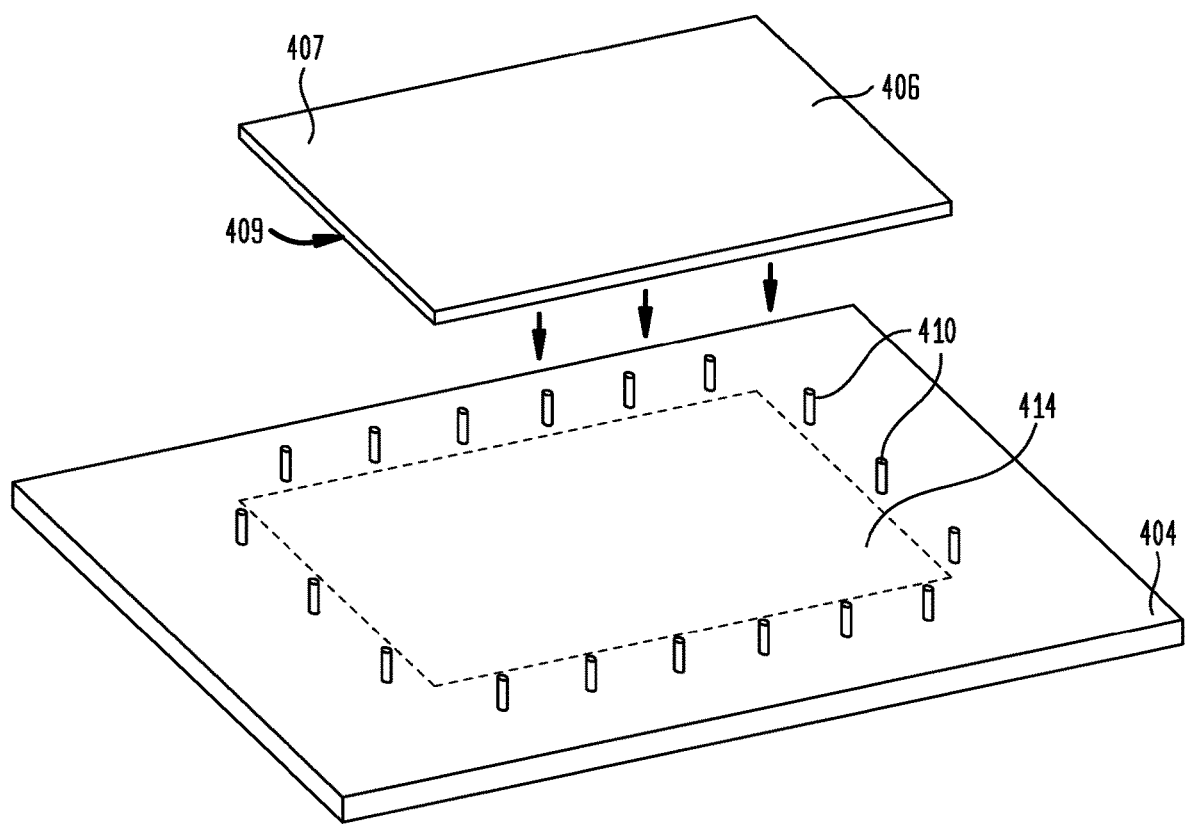
FIG. 7 is an isometric view illustrating a placement of a first flexible material (or material layer) on a first mounting board.
Figure 8:
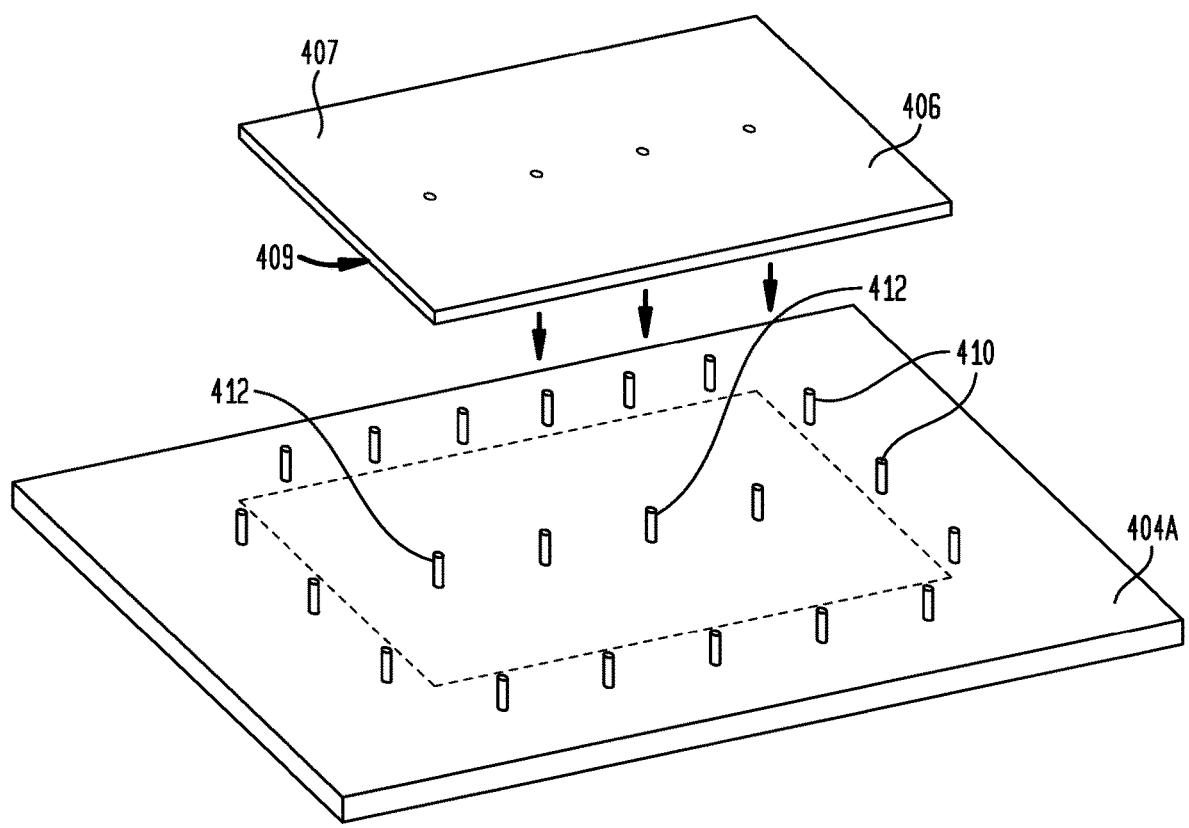
FIG. 8 is an isometric view illustrating a placement of a first flexible material (or material layer) on a second mounting board.

FIG. 7 is an isometric view illustrating a placement of a first flexible material (or material layer) 406 on a first mounting board 404. FIG. 8 is an isometric view illustrating a placement of a first flexible material (or material layer) 406 on a second mounting board 404A. As illustrated in FIG. 7, the first flexible material layer 406 has been placed on a mounting board or base 404 having a plurality of pegs (nails or needles) 410. The first flexible material 406 has been placed within the area or region 414 defined by or enclosed by the pegs 410, such that none of the pegs 410 are inserted through the first material layer 406, but peripherally surround the first material layer 406. As illustrated in FIG. 8, the first flexible material layer 406 has been placed on a mounting board or base 404A also having a plurality of pegs (nails or needles) 410 but also having a plurality of pegs (nails or needles) 412 which insert through the first material layer 406. In addition, the mounting board or base 404A has additional pegs 410 which surround the periphery of, but do not pierce, the first material layer 406.

Figure 9:
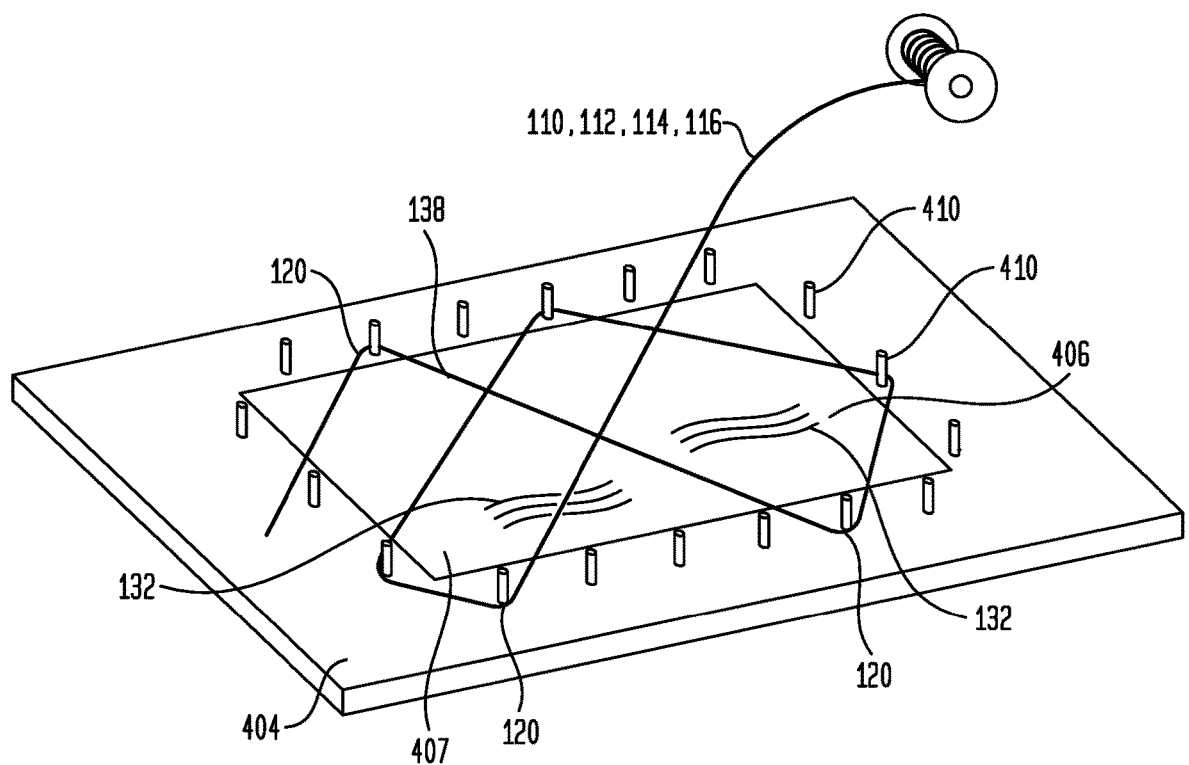
FIG. 9 is an isometric view illustrating a representative routing of a nonmetallic, cut-resistant yarn or fiber on a first flexible material (or material layer) for a first or second embodiment of a security panel assembly.
Figure 11:
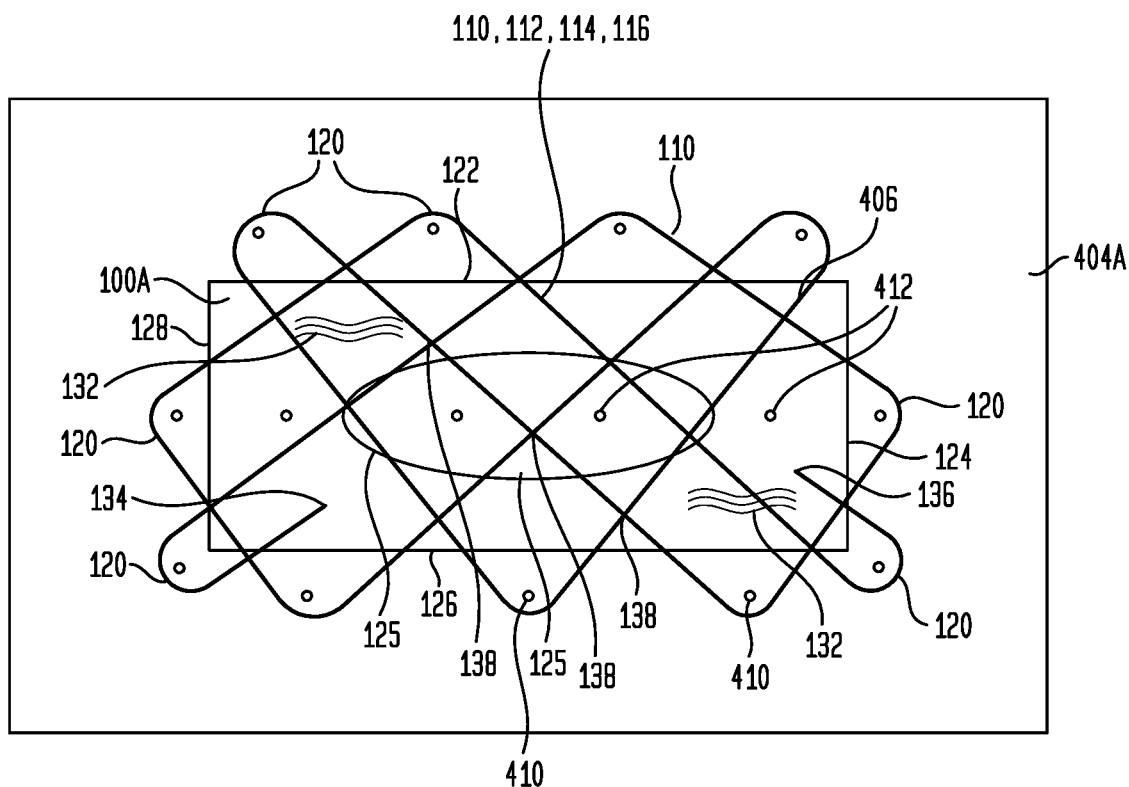
FIG. 11 is a plan view illustrating another representative completed routing of a nonmetallic, cut-resistant yarn or fiber on a first flexible material (or material layer) for a first or second embodiment of a security panel assembly.

FIG. 9 is an isometric view illustrating a representative routing of a nonmetallic, cut-resistant yarn or fiber 110, 112, 114, or 116 on a first flexible material (or material layer) 406 for a first embodiment of a security panel assembly 100A. FIG. is an isometric view illustrating a representative completed routing of a nonmetallic, cut-resistant yarn or fiber 110, 112, 114, or 116 on a first flexible material (or material layer) 406 to form a polymeric fiber matrix 125 for a first embodiment of a security panel assembly 100A. FIG. 11 is a plan view illustrating another representative completed routing of a nonmetallic, cut-resistant yarn or fiber 110, 112, 114, or 116 on a first flexible material (or material layer) 406 to form a polymeric fiber matrix 125 for a first embodiment of a security panel assembly 100A.

Figure 10:
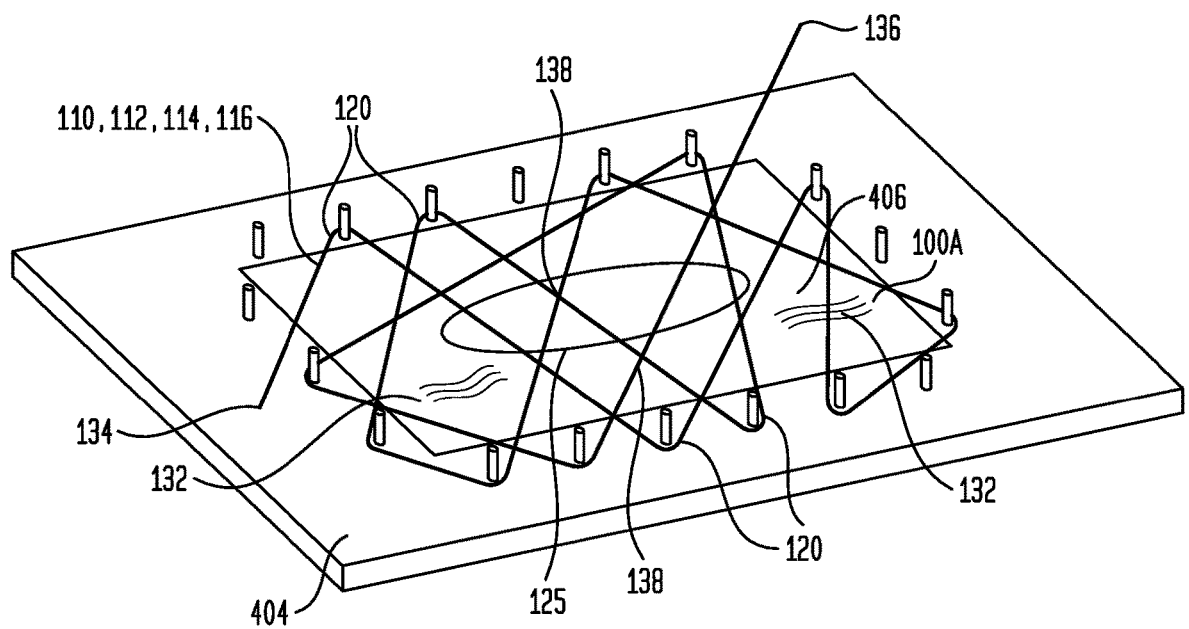
FIG. 10 is an isometric view illustrating a representative completed routing of a nonmetallic, cut-resistant yarn or fiber on a first flexible material (or material layer) for a first or second embodiment of a security panel assembly.

Referring to FIGS. 9-11, the routing of a nonmetallic, cut-resistant yarn or fiber 110, 112, 114, or 116 on the first material layer 406 forms a polymeric fiber matrix 125 for a first embodiment of a security panel assembly 100A, in which the nonmetallic, cut-resistant yarn or fiber 110, 112, 114, or 116 has a plurality of intersections (or crossings) 138. The nonmetallic, cut-resistant yarn or fiber 110, 112, 114, or 116 is routed over the first material layer 406 (which also may have or be coated with an adhesive or cement 132) around the various pegs 410 in a predetermined pattern to form a polymeric fiber matrix 125. It should be noted that the polymeric fiber matrix 125 spans a larger area than the first material layer 406, resulting in portions or loops 120 of the nonmetallic, cut-resistant yarn or fiber 110, 112, 114, or 116 extending beyond one or more edges 122, 124, 126, and/or 128 of the first material layer 406. As discussed below, the security panel assembly 100 formed this way does not require any additional trimming of the margins (salvage portions or tabs) of the first material layer 406. In addition, when incorporated into a bag 50, the nonmetallic, cut-resistant yarn or fiber 110, 112, 114, or 116 may extend within and across any seams 60, providing added security or protection.

A wide variety of predetermined patterns may be implemented for the routing of the nonmetallic, cut-resistant yarn or fiber 110, 112, 114, or 116, such as an oscillating pattern, in addition to the patterns illustrated. In a representative embodiment, the predetermined pattern is selected or implemented to create a plurality of intersections (or crossings) 138, in which there are a plurality of intersections (or crossings) 138 formed along or spaced apart from each edge of the plurality of edges 122, 124, 126, and/or 128, together with a plurality of intersections (or crossings) 138 within the interior of the polymeric fiber matrix 125 (i.e., the region spaced apart inwardly or closer to the center).

In addition, as the polymeric fiber matrix 125 is formed by a nonmetallic, cut-resistant yarn or fiber 110, 112, 114, or 116 having ends 134, 136 which are not generally or sufficiently sharp and therefore would generally not pierce portions of the bag 50, the ends 134, 136 do not require any particular positioning or coating within the security panel assembly 100A, and may extend externally to the first material layer 406 (i.e., beyond the edges 122, 124, 126, and/or 128 of the first material layer 406) as illustrated in FIG. 10 or which may be arranged on the first material layer 406 (i.e., within the edges 122, 124, 126, and/or 128 of the first material layer 406) as illustrated in FIG. 11.

Figure 12:
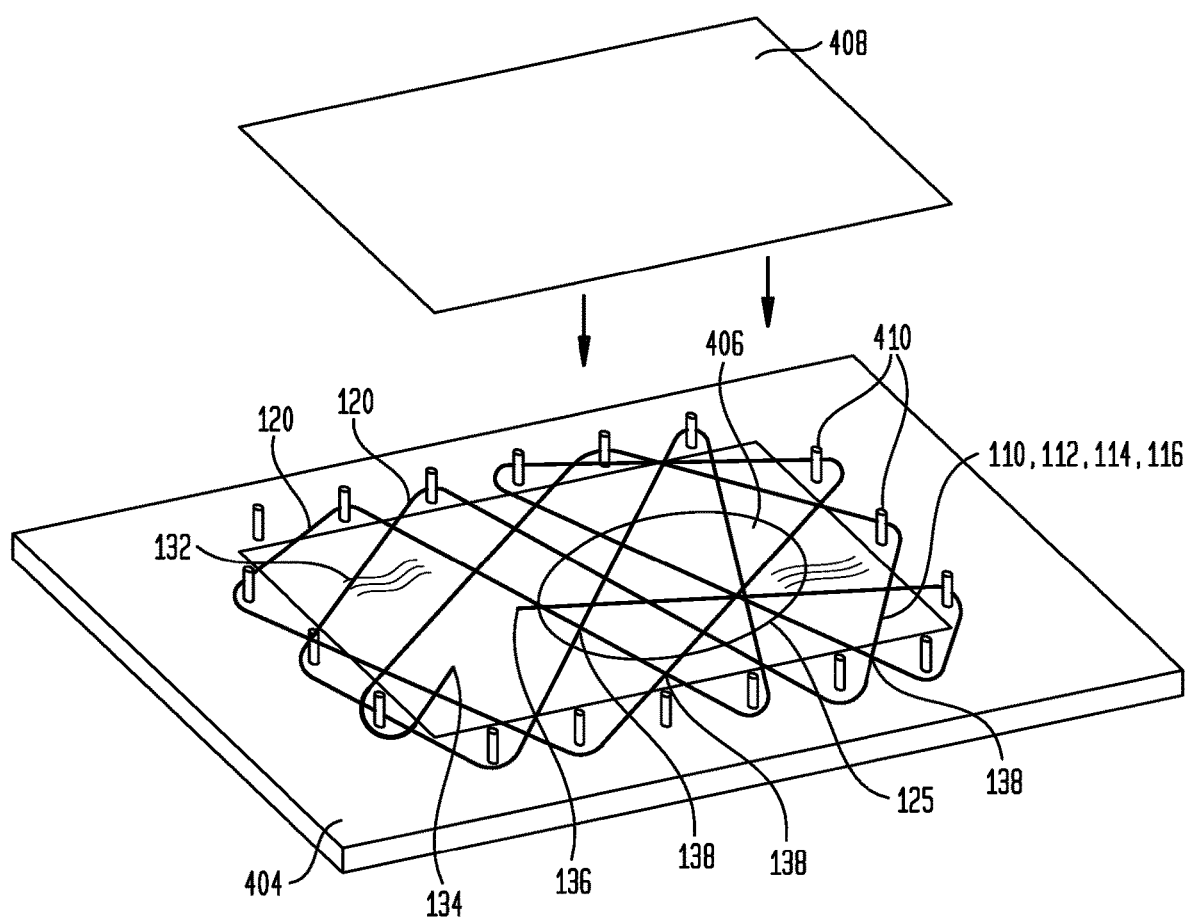
FIG. 12 is an isometric view illustrating placement of an optional second flexible material (or material layer) over a nonmetallic, cut-resistant yarn or fiber routed on a first flexible material (or material layer) for a second embodiment of a security panel assembly.
Figure 13:
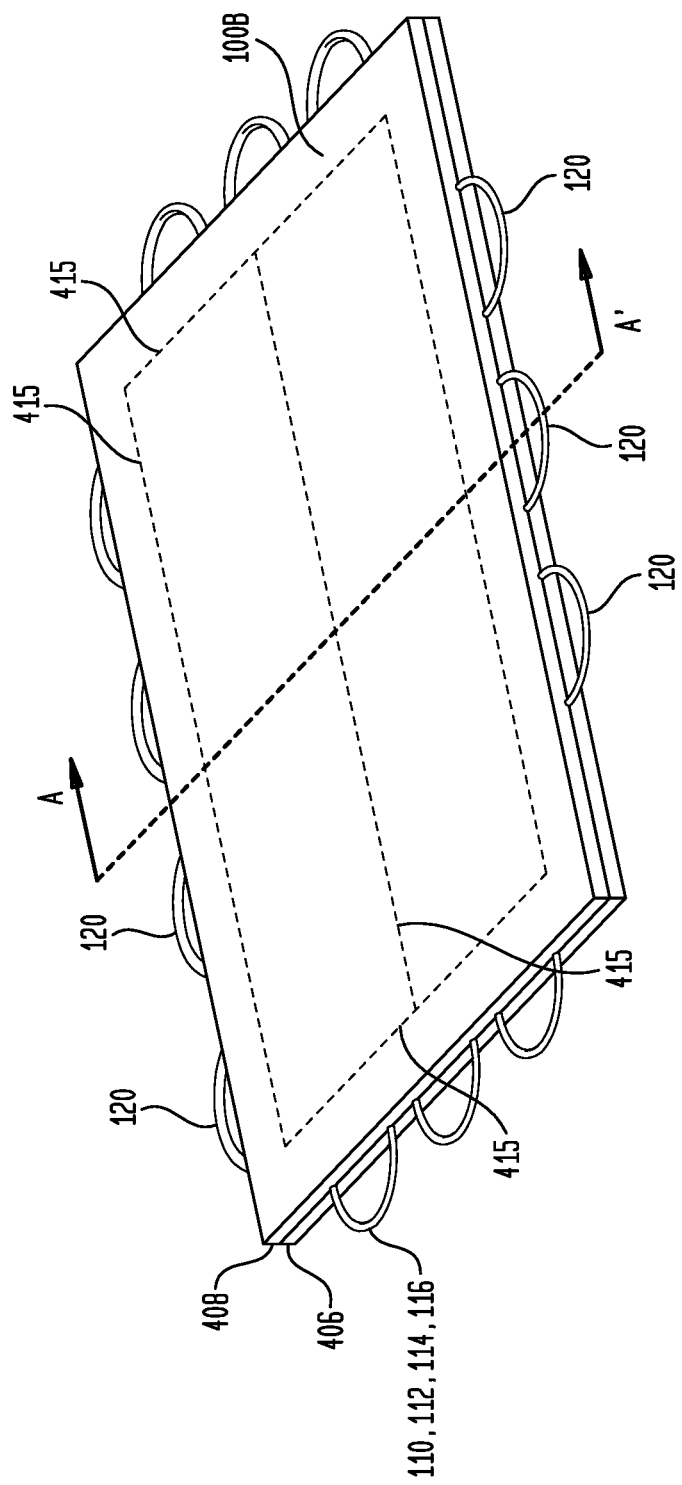
FIG. 13 is an isometric view illustrating a second embodiment of a security panel assembly.
Figure 14:
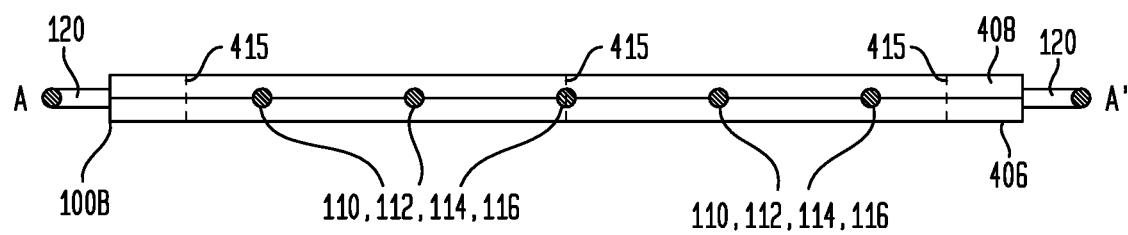
FIG. 14 is cross-sectional view (through the A-A' plane) of the second embodiment of a security panel assembly of FIG. 13.

FIG. 12 is an isometric view illustrating placement of an optional second flexible material (or material layer) 408 over a nonmetallic, cut-resistant yarn or fiber 110, 112, 114, or 116 routed on a first flexible material (or material layer) for a second embodiment of a security panel assembly 100B. FIG. 13 is an isometric view illustrating a second embodiment of a security panel assembly 100B. FIG. 14 is cross-sectional view (through the A-A' plane) of the first embodiment of a security panel assembly 100B of FIG. 13. As illustrated, an optional second material layer 408 has been added over the polymer matrix 125, and has been stitched through and to the polymer matrix 125 and the first material layer 406 (stitch lines 415). In the security panel assembly 100A, 100B, the fiber matrix 125 extends to, at or over the edges 122, 124, 126, and/or 128 of the first material layer 406 and/or second material layer 408, rather than being on spaced apart from the edges 122, 124, 126, and/or 128 on the side closer to the center 412 of the first material layer 406. For example, the loops 120 of the nonmetallic, cut-resistant yarn or fiber 110, 112, 114, or 116 may extend over the edges 122, 124, 126, and/or 128 of the first material layer 406, as illustrated.

The security panel assembly 100B differs from the security panel assembly 100A only insofar as the security panel assembly 100B includes the optional second material layer 408. As the security panel assembly 100A does not include the optional second material layer 408, the polymeric fiber matrix 125 also may be stitched or otherwise adhered to the first material layer 406 (such as through stitch lines 415 or adhesive 132).

It should be noted that the first flexible material layer 406 and the optional second material layer 408 may be formed by other components of the bag 50. For example, in a representative embodiment, the security panel assembly 100A is coupled directly to the exterior fabric or material 40 of the bag 50, such that the exterior fabric or material 40 comprises or forms a second material layer 408. The combination of the security panel assembly 100A with the exterior fabric or material 40 then results in a security panel assembly 100B in which the second material layer 408 comprises or is formed by the exterior fabric or material 40, forming a security panel assembly 100B which is integrated with or forms a panel of the bag 50. Also for example, in a representative embodiment, the security panel assembly 100A is coupled directly to the lining fabric or material 42 of the bag 50, such that the lining fabric or material 42 comprises or forms a second material layer 408. The combination of the security panel assembly 100A with the lining fabric or material 42 then results in a security panel assembly 100B in which the second material layer 408 comprises or is formed by the lining fabric or material 42. Also for example, in a representative embodiment, the first material layer 406 may be comprised of the lining fabric or material 42 of the bag 50, and the second material layer 408 may comprise the exterior fabric or material 40, also forming a security panel assembly 100B which is integrated with or forms a panel of the bag 50.

Figure 15:
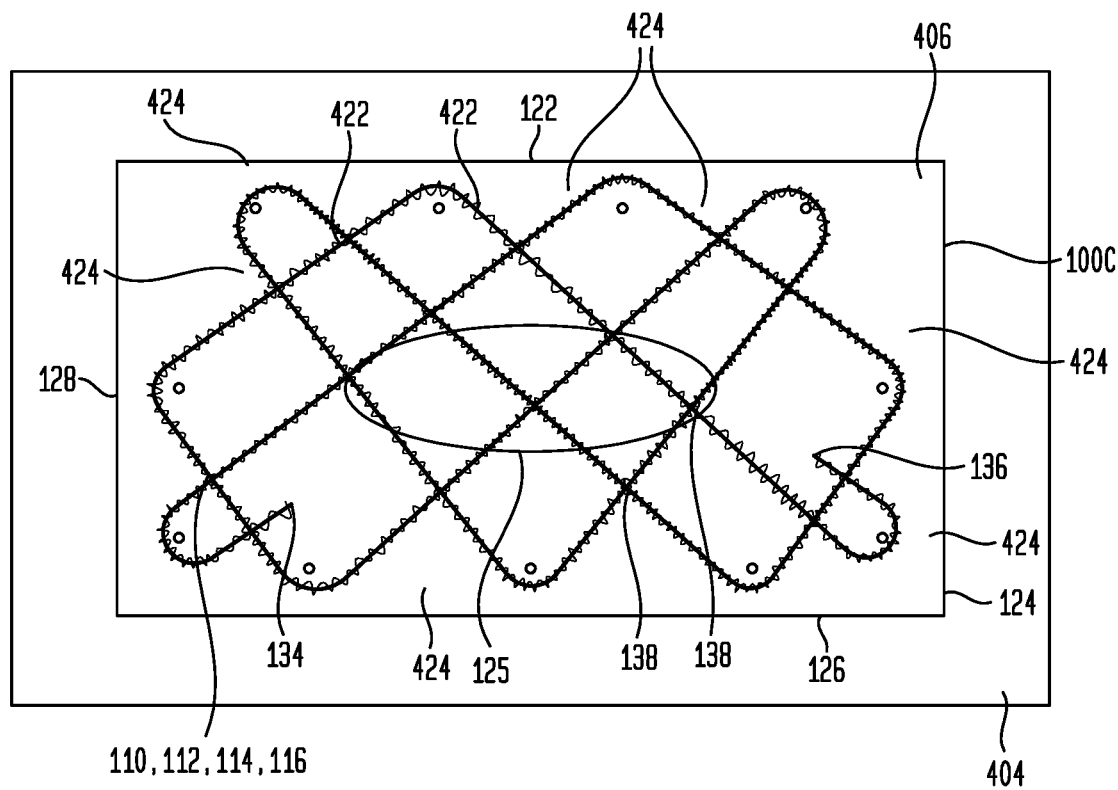
FIG. 15 is a plan view illustrating a third embodiment of a security panel assembly.

FIG. 15 is a plan view illustrating additional representative nonmetallic, cut-resistant yarn or fiber-based embodiments of third security panel assembly 100C. As illustrated, a nonmetallic, cut-resistant yarn or fiber 110, 112, 114, or 116 has been routed over a first material layer 406, and is held in place using a cross stitch or zig-zag lock stitch 422. The margins or salvage portions 424 of the first material layer 406 are then trimmed to form a security panel assembly 100C. No second material layer 408 is utilized for this embodiment.

It should be noted that the polymeric fiber matrix 125 having cut-resistant, polymeric fibers, filaments, cables, threads or yarns 110, 112, 114, or 116 can be penetrated, such as with a sewing needle, without damaging the polymeric fiber matrix 125 having cut-resistant, polymeric fibers, filaments, cables, threads or yarns 110, 112, 114, or 116, in contrast with metallic cables, which can be broken or damaged when pierced. Also, the ends 134, 136 of the cut-resistant, polymeric fibers, filaments, cables, threads or yarns 110, 112, 114, or 116 are not sharp, also in contrast to metallic cables, and do not require additional protection from poking through a material layer or during fabrication (e.g., to avoid cutting a person). Lighter weight material layers may also be used to form the security panel assemblies 100.

For the security panel assemblies 100, the ends of the cut-resistant, polymeric fibers, filaments, cables, threads or yarns 110, 112, 114, or 116 forming the polymer matrix 125 can be unfinished, can be secured inward toward the center of the respective security panel assembly 100, can be stitched or otherwise secured into one or more seams 60 (discussed below), can be additionally stitched into the material layer(s), or can be left alone, such as extending out of the outer boundaries of the first material layer 406 and/or optional second material layer 408 of the security panel assembly 100. The edges of the security panel assemblies 100 may be secured directly into a seam 60, and the polymer matrix 125 does not require an offset from the seams 60 of prior art metallic wire security panel assemblies. Additionally, foam or other layers are not necessary to be inserted between the security panel assemblies 100 and the material forming the exterior 40 of the carrying bag 50. Any adhesive within the security panel assemblies 100 is also optional.

Figure 16:
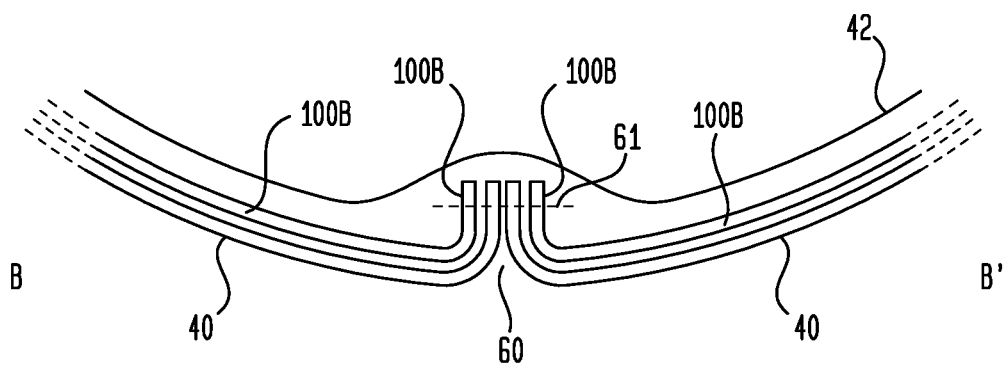
FIG. 16 is cross-sectional view (through the B-B' plane of the bag illustrated in FIG. 1) of a seam coupling two second embodiments of a security panel assembly.
Figure 17:
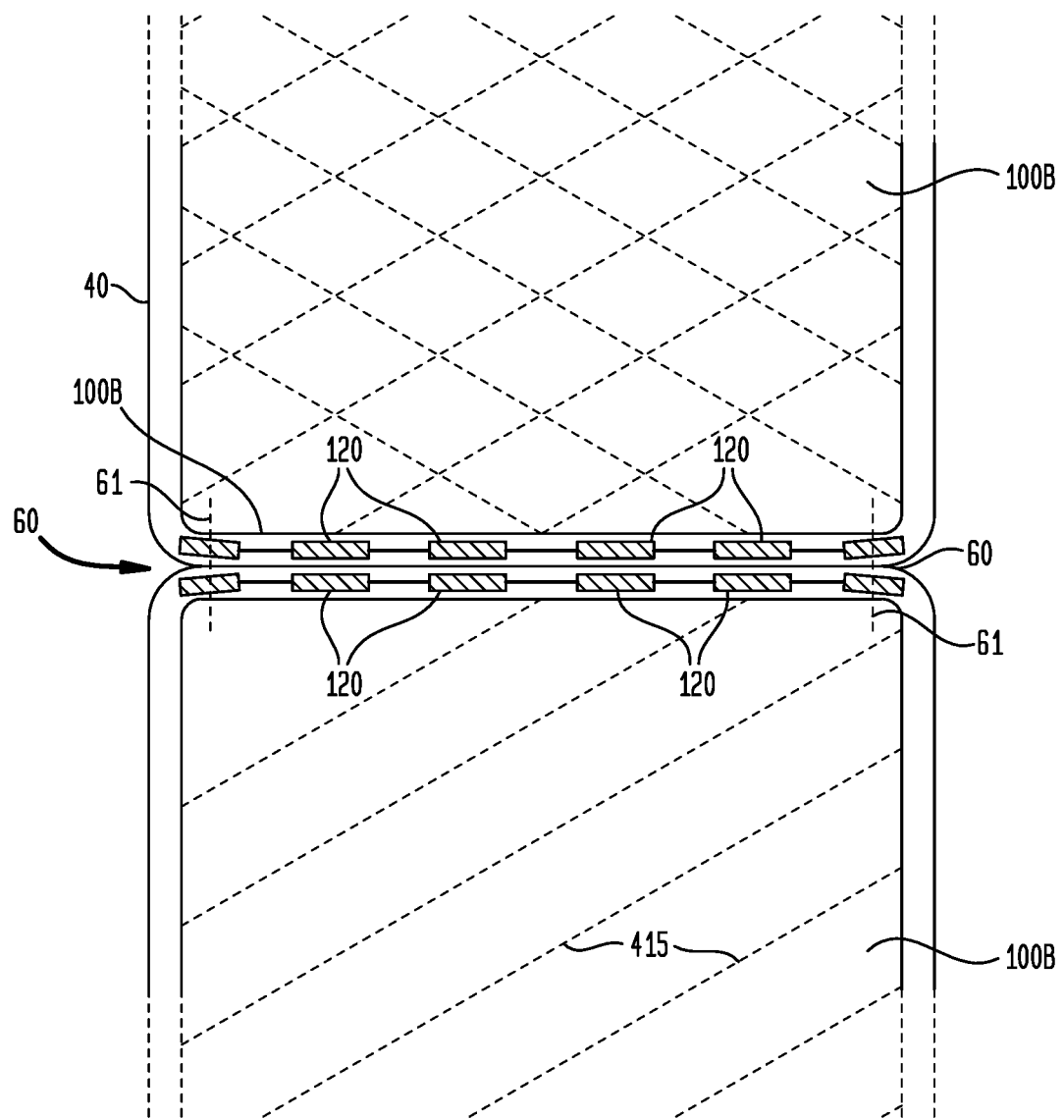
FIG. 17 is plan view of a seam coupling two second embodiments of a security panel assembly.

FIG. 16 is a partial cross-sectional view (through the B-B' plane of the bag 50 illustrated in FIG. 1) of a seam 60 coupling two embodiments of a security panel assembly using stitching 61. FIG. 17 is plan view of a seam 60 coupling two embodiments of a security panel assembly, and shows the loops 120 extending out of the security panel assemblies. FIGS. 16 and 17 illustrate seams 60 coupling a plurality of representative nonmetallic, cut-resistant yarn or fiber-based embodiments of security panel assemblies 100B. For ease of explanation, the additional material layer from the zipper 71 (of a gusset 70) is not separately illustrated in FIG. 16. If a security panel assembly 100A, 100C, 100D is utilized instead, the optional second material layer 408 would not be included in the seam 60. A highly novel feature of the representative embodiments using security panel assemblies 100 is that each security panel assembly 100 spans the seam 60 and is not offset from the seam 60. Stated another way, the seam 60 is formed by stitching through the polymeric fiber matrices 125 of the one or more security panel assemblies 100 which are being joined. This is a sharp contrast with the prior art, which would join a security panel assembly in a seam only through the margins or salvage portions 424, and provides additional and significant antitheft protection of the entire carrying bag, including the seam regions.

Figure 18:
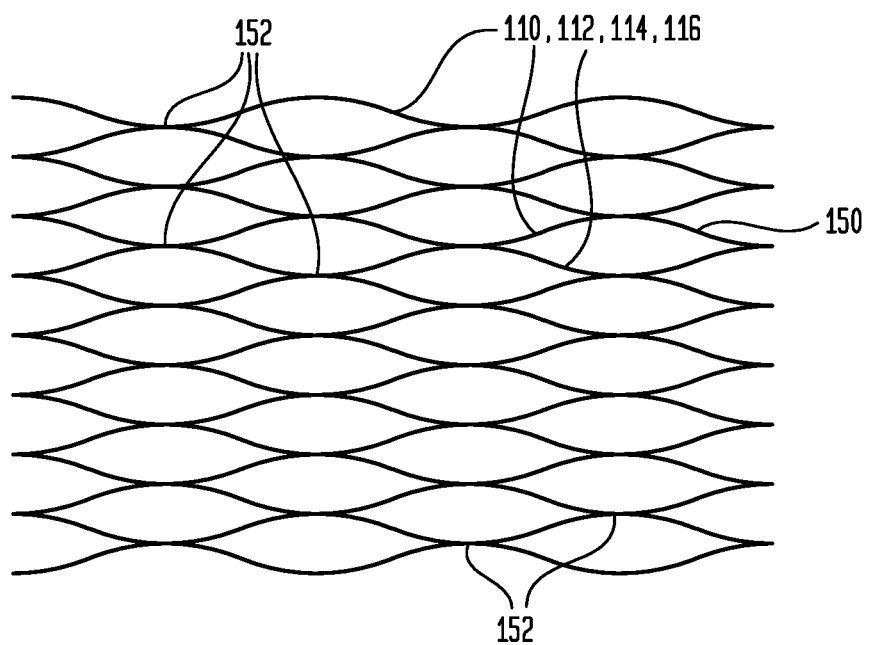
FIG. 18 is an isometric view illustrating placement of a nonmetallic, cut-resistant yarn or fiber mesh or netting on a first flexible material (or material layer) for a fourth embodiment of a security panel assembly.
Figure 18:
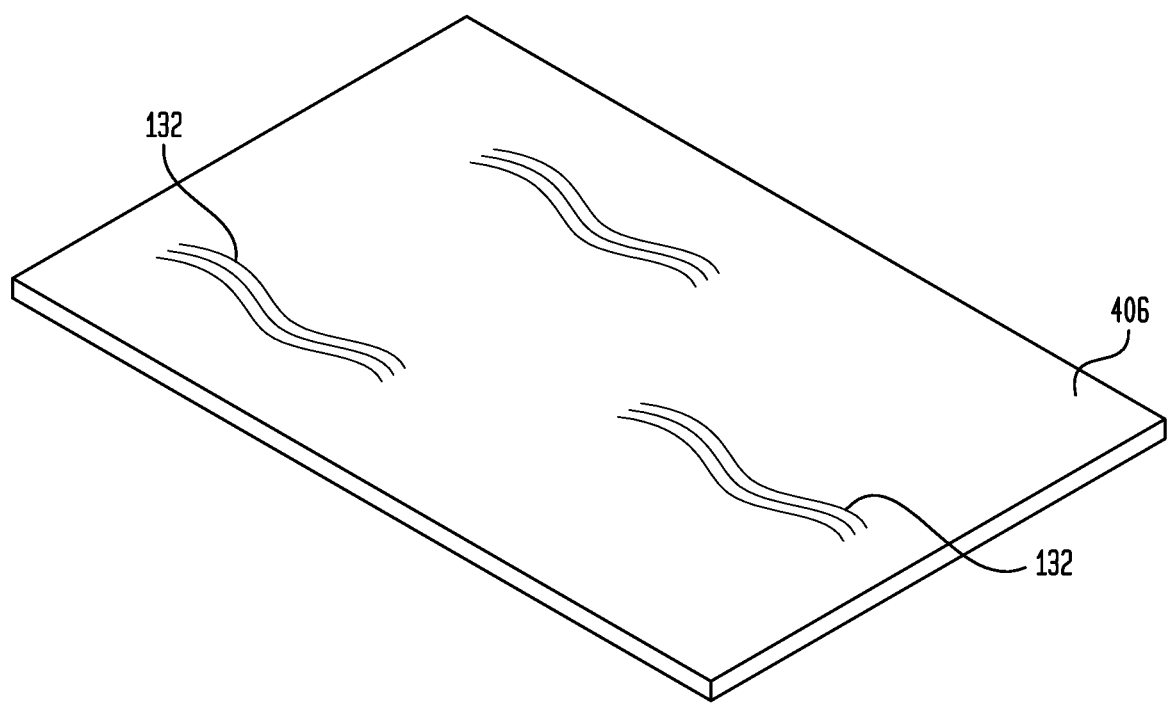
Figure 19:
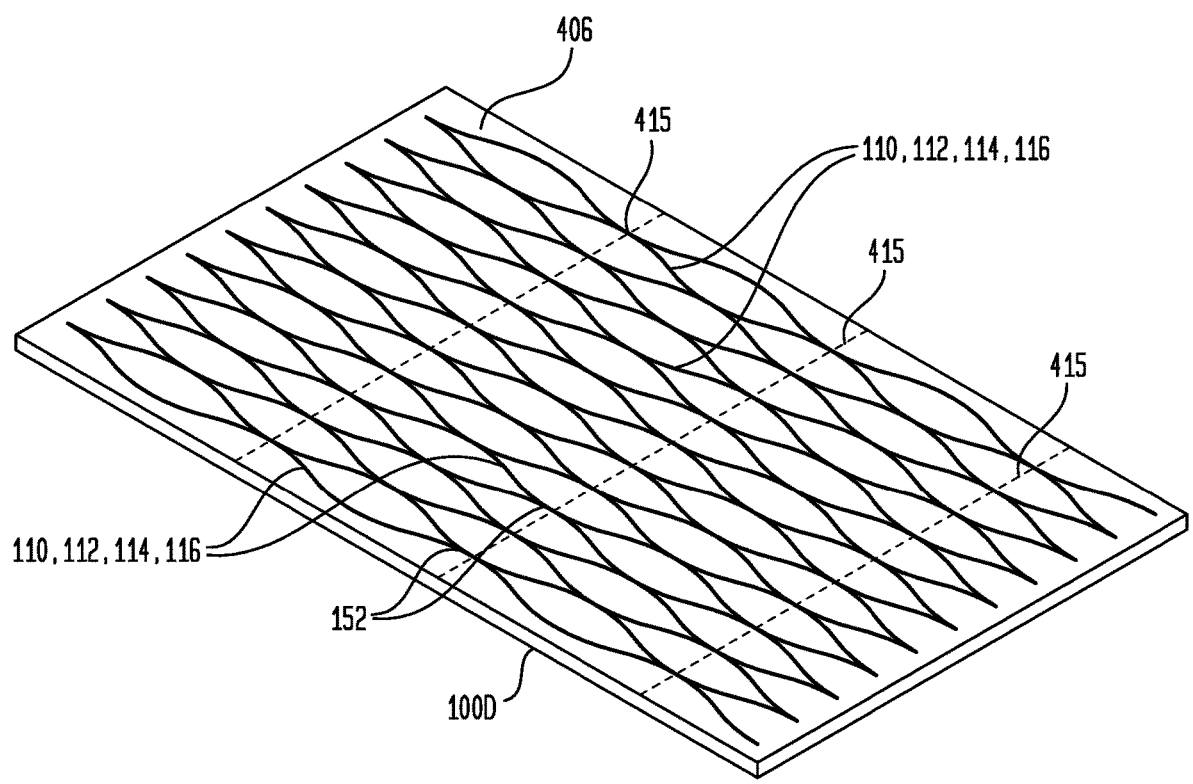
FIG. 19 is an isometric view illustrating the fourth embodiment of a security panel assembly having a nonmetallic, cut-resistant yarn or fiber mesh or netting on a first flexible material (or material layer).

FIG. 18 is an isometric view illustrating placement of a nonmetallic, cut-resistant yarn or fiber 110, 112, 114, or 116 mesh or netting 150 on a first flexible material (or material layer) 406 for a fourth embodiment of a security panel assembly 100D. FIG. 19 is an isometric view illustrating the fourth embodiment of a security panel assembly 100D having a nonmetallic, cut-resistant yarn or fiber 110, 112, 114, or 116 mesh or netting 150 on a first flexible material (or material layer) 406. For the fourth embodiment of a security panel assembly 100D, one or more representative cut-resistant, polymeric fibers, filaments, cables, threads or yarns 110, 112, 114, or 116 have been pre-fabricated into mesh or netting 150, and the mesh or netting 150 thereby forms a polymeric fiber matrix 125. For example, the mesh or netting 150 may be formed or otherwise pre-fabricated by arranging one or more cut-resistant, polymeric fibers, filaments, cables, threads or yarns 110, 112, 114, or 116 in a predetermined pattern (such as an oscillating pattern as illustrated) or another such pattern), and the yarns or fibers 110, 112, 114, or 116 are then bonded or otherwise coupled to each other at each intersection 152 of the cut-resistant, polymeric fibers, filaments, cables, threads or yarns 110, 112, 114, or 116, such as through a heat treatment, welding, molding, adhesive, etc., all for example and without limitation. Depending upon the selected predetermined pattern, each intersection 152 may be an intersection (or crossings) 138 of yarns or fibers 110, 112, 114, or 116 or more simply may be adjacent yarns or fibers 110, 112, 114, or 116 which are touching without crossing. Any and all such methods of forming the mesh or netting 150 from a plurality of yarns or fibers 110, 112, 114, or 116 are within the scope of the disclosure. The mesh or netting 150 may be secured to a first material layer 406 (and/or a second material layer 408), such as through stitching 415 or an adhesive 132, to form a security panel assembly 100D, and may be utilized as a security panel assembly 100 or within a carrying straps 20, as illustrated in the various Figures.

Figure 20:
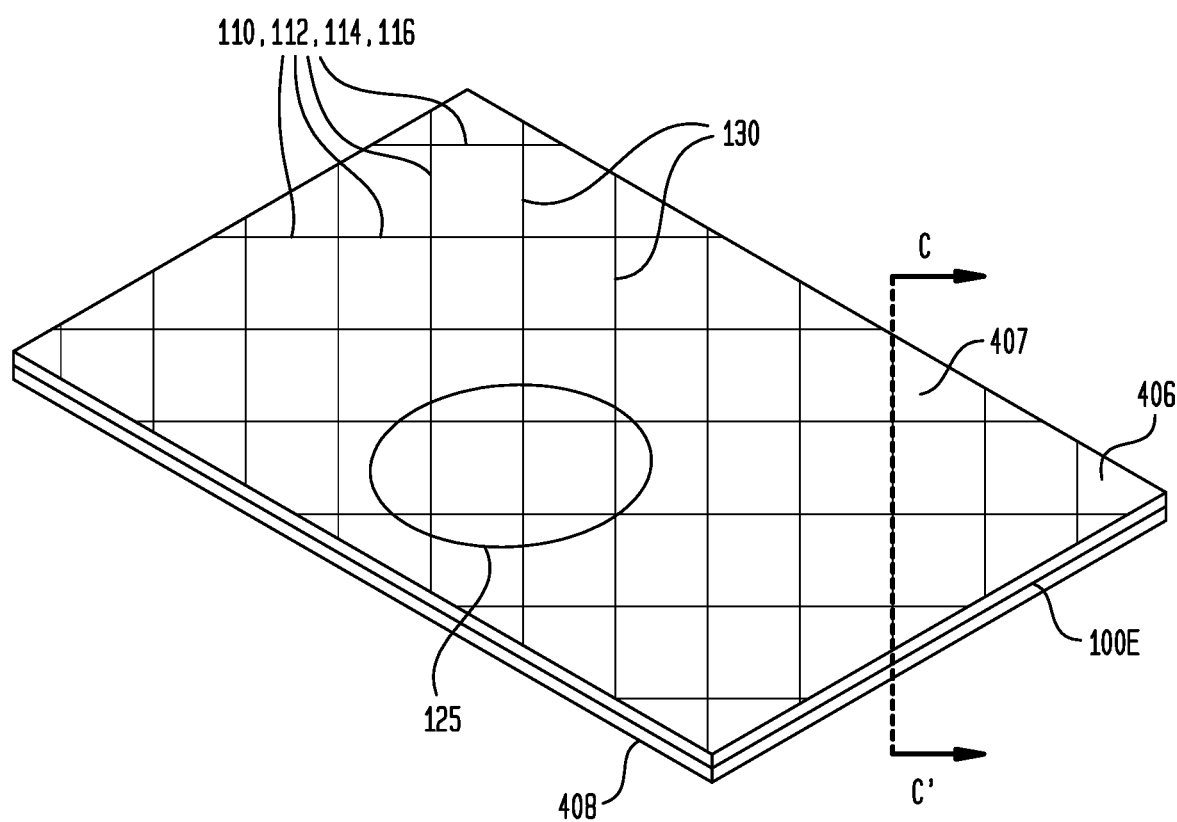
FIG. 20 is an isometric view illustrating a fifth, quilted embodiment of a security panel assembly.
Figure 21:
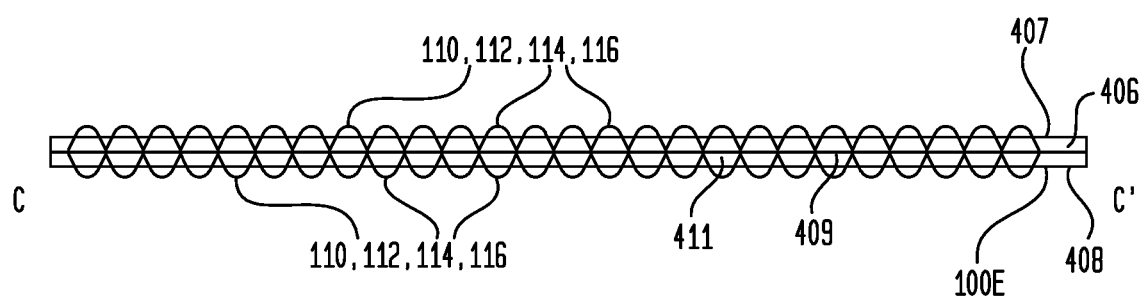
FIG. 21 is a cross-sectional view (through the C-C' plane) of the fifth, quilted embodiment of a security panel assembly illustrated in FIG. 20.

FIG. 20 is an isometric view illustrating a fifth, quilted embodiment of a security panel assembly 100E. FIG. 21 is a cross-sectional view (through the C-C' plane) of the fifth, quilted embodiment of a security panel assembly 100E illustrated in FIG. 20. The security panel assembly 100E comprises a first flexible material layer 406 and/or optional second material layer 408 which has or have been stitched through, such as in a quilting or crossing pattern 130, by representative cut-resistant, polymeric fibers, filaments, cables, threads or yarns 110, 112, 114, or 116, with the patterned cut-resistant, polymeric fibers, filaments, cables, threads or yarns 110, 112, 114, or 116 thereby forming a polymeric fiber matrix 125. In a representative embodiment, an optional second material layer 408 may be included, as illustrated in FIG. 21. For example, in a representative embodiment, the polymeric fiber matrix comprises a plurality of polymeric fibers, filaments, cables, threads or yarns arranged in a crossing or quilting pattern on the first side 407 of the first flexible material layer 406 and on either a second side 409 of the first flexible material layer 406 or an intervening flexible material layer 411, such as the second material layer 408 as illustrated. Also for example, in a representative embodiment, the first flexible material layer 406 is formed from the exterior fabric or material 40 of the bag 50, and the quilting or crossing pattern 130 formed by the stitching of the representative cut-resistant, polymeric fibers, filaments, cables, threads or yarns 110, 112, 114, or 116 forms a decorative pattern. Also for example, in a representative embodiment, the second material layer 408, if included, is optionally formed from the lining 42 of the bag 50.

Figure 22:
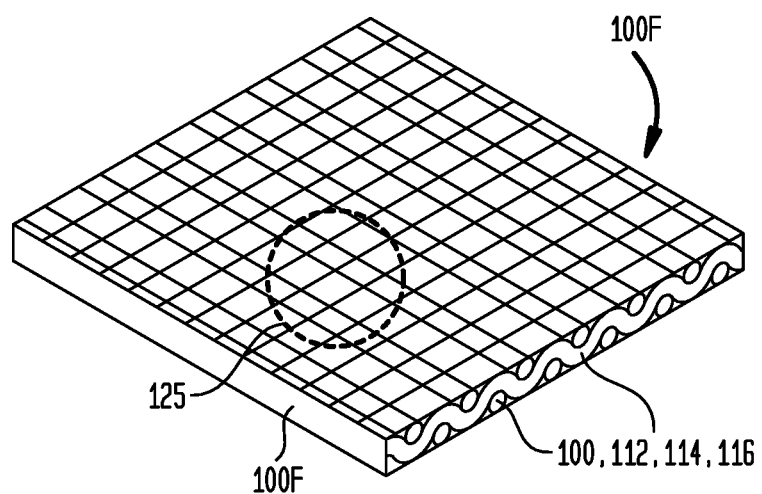
FIG. 22 is an isometric view illustrating a sixth embodiment of a security panel assembly formed from knit, woven, or spun nonmetallic, cut-resistant yarns or fibers.
Figure 23:
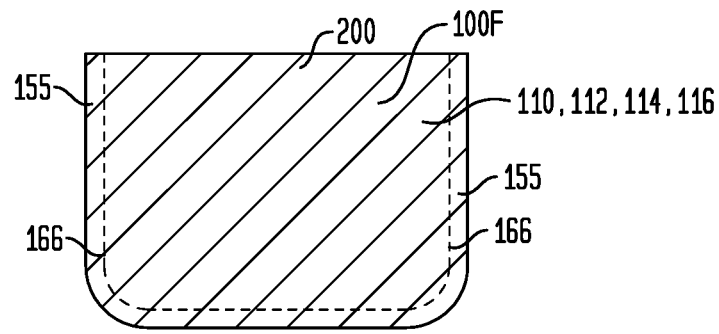
FIG. 23 is a plan view illustrating seam locations for a sixth embodiment of a security panel assembly formed from knit, woven, or spun nonmetallic, cut-resistant yarns or fibers.
Figure 24:
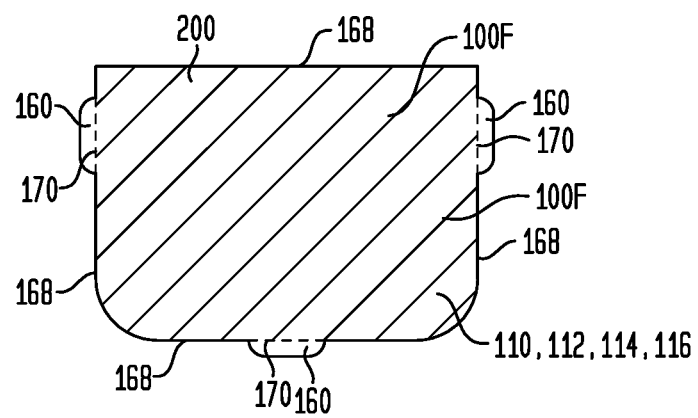
FIG. 24 is a plan view illustrating a sixth embodiment of a security panel assembly formed having tabs used in forming seams.

FIG. 22 is an isometric view illustrating a sixth embodiment of a security panel assembly 100F. A security panel assembly 100F is formed as a cut-resistant fabric 200 comprising a plurality of interwoven, knit, spun, blown, or otherwise routed, embedded or linked, cut-resistant, polymeric fibers, filaments, cables, threads or yarns 110, 112, 114, or 116 forming a polymeric fiber matrix 125, generally having a greater density of cut-resistant, polymeric fibers, filaments, cables, threads or yarns 110, 112, 114, or 116 than the security panel assemblies 100A-100E. For the security panel assembly 100F as illustrated, the cut-resistant, polymeric fibers, filaments, cables, threads or yarns 110, 112, 114, or 116 form a polymeric fiber matrix 125, and may be interwoven, knit, spun, or blown with other types of threads, yarns or fibers, including metallic, carbon, and threads which are not cut-resistant. FIG. 23 is a plan view illustrating peripheral locations or areas 155 of the security panel assembly 100F which are utilized within a seam 60, with the seam location for the security panel assembly 100F indicated using dashed lines 166, for example and without limitation. FIG. 24 is a plan view illustrating a sixth embodiment of a security panel assembly 100F formed having one or more tabs 160 in any of various locations around the periphery of the fabric 200 used in forming seams 60, such that a tab 160 is included in the seam 60 to secure the assembly 100F in a bag 50 or bag panel 35, 45, 55 or gusset 70, and again with the seam location for the security panel assembly 100F indicated using dashed lines 166.

FIGS. 25-30 are plan views illustrating a seventh embodiment of a security panel assembly 100G formed from a first flexible material (or material layer) 406 having knit, woven, or spun cut-resistant, polymeric fibers, filaments, cables, threads or yarns 110, 112, 114, or 116 forming a polymeric fiber matrix 125, such as a cut-resistant fabric 200, which is coupled to one or more second flexible materials (or material layers) 408, which is generally not cut-resistant and otherwise is not required to include any polymeric fiber matrix 125 having cut-resistant, polymeric fibers, filaments, cables, threads or yarns 110, 112, 114, or 116. The one or more second flexible materials (or material layers) 408 may be secured to a first flexible material (or material layer) 406 having knit, woven, or spun cut-resistant, polymeric fibers, filaments, cables, threads or yarns 110, 112, 114, or 116 forming a polymeric fiber matrix 125, such as through stitching 415 or an adhesive 132 (not separately illustrated), to form a security panel assembly 100G. In a representative embodiment, the one or more second flexible materials (or material layers) 408 may be separate one or more second flexible materials (or material layers) 408 or may be embodied as the exterior fabric or material 40 or lining 42.

One of the difficulties associated with using a cut-resistant fabric 200 directly within a seam 60 is that such cut-resistant fabrics 200 may tend to be thick or bulky, and may distort the seam 60 or render the seam 60 less precise, which may affect the style or desirability of the bag 50. The second flexible materials (or material layers) 408 of the security panel assembly 100G, or parts thereof, are typically less thick and/or more pliable than a cut-resistant fabric 200. Accordingly, in a representative security panel assembly 100G, such a cut-resistant fabric 200, as a first flexible material (or material layer) 406 having an embedded polymeric fiber matrix 125 having cut-resistant, polymeric fibers, filaments, cables, threads or yarns 110, 112, 114, or 116, is coupled to one or more second flexible materials (or material layers) 408 which are not cut-resistant. In representative embodiments, as discussed in greater detail below, portions of the one or more second flexible materials (or material layers) 408 (one or more seam regions 170) are inserted (with other materials, such as the exterior fabric 40 and/or lining 42) into and stitched (or adhered) within seams 60 to secure the assembly 100G in a bag 50, bag panel 35, 45, 55 or gusset 70.

For the security panel assembly 100G, the one or more second flexible materials (or material layers) 408 extend beyond one or more edges 168 of the first flexible material (or material layer) 406, forming one or more seam regions 170. The one or more seam regions 170 are inserted (at any selected or desired location within the one or more seam regions 170, along with other materials, such as the exterior fabric 40 and/or lining 42) into and stitched (or adhered) within seams 60 to secure the assembly 100G in a bag 50, bag panel 35, 45, 55 or gusset 70.

Figure 25:
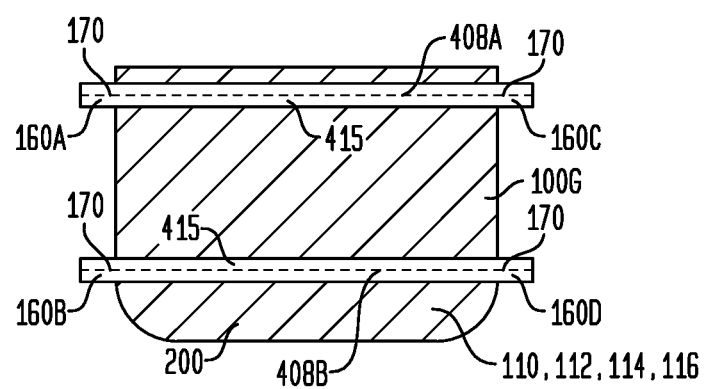
FIGS. 25-30 are plan views illustrating a seventh embodiment of a security panel assembly formed from a first flexible material (or material layer) having knit, woven, or spun nonmetallic, cut-resistant yarns or fibers which is coupled to one or more second flexible materials (or material layers).

As illustrated in FIG. 25, the cut-resistant fabric 200 is coupled, such as through stitching 415 or an adhesive (not separately illustrated) to a plurality of strips of second flexible materials (or material layers) 408A and 408B, which are illustrated as extending laterally across the cut-resistant fabric 200 and beyond the edges of the cut-resistant fabric 200 to form one or more seam regions 170 having the form or shape of tabs 160A, 160B, 160C, and 160D. The tabs 160A, 160B, 160C, and 160D (as one or more seam regions 170) are then inserted (at any selected or desired location within the one or more seam regions 170, along with other materials, such as the exterior fabric 40 and/or lining 42) into and stitched within seams 60 to secure the assembly 100G in a bag 50, bag panel 35, 45, 55 or gusset 70, such as along two opposite sides or edges. For example and without limitation, tabs 160A and 160B are inserted and stitched (or adhered) into a first seam 60 and tabs 160C and 160D are inserted into a second seam 60.

Figure 26:
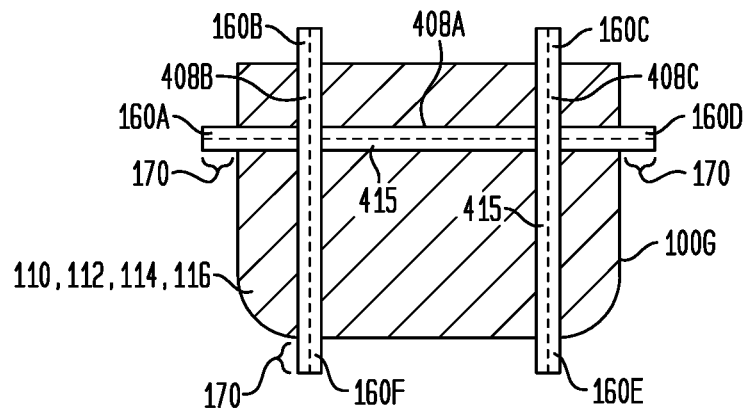

As illustrated in FIG. 26, the cut-resistant fabric 200 is coupled, such as through stitching 415 or an adhesive (not separately illustrated) to a plurality of strips of second flexible materials (or material layers) 408A, 408B and 408C, which are illustrated as respectively extending laterally or longitudinally across the cut-resistant fabric 200 and beyond the edges of the cut-resistant fabric 200 to form one or more seam regions 170 having the form or shape of tabs 160A, 160B, 160C, 160D, 160E, and 160F. The tabs 160A, 160B, 160C, 160D, 160E, and 160F are then inserted (at any selected or desired location within the one or more seam regions 170, along with other materials, such as the exterior fabric 40 and/or lining 42) into and stitched (or adhered) within seams 60 to secure the assembly 100G in a bag 50, bag panel 35, 45, 55 or gusset 70, such as along four sides or edges. For example and without limitation, tabs 160A is inserted and stitched (or adhered) into a first seam 60, tabs 160B and 160D are inserted and stitched (or adhered) into a second seam 60, tabs 160D is inserted and stitched (or adhered) into a third seam 60, and tabs 160E and 160F are inserted and stitched (or adhered) into a fourth seam 60.

Figure 27:
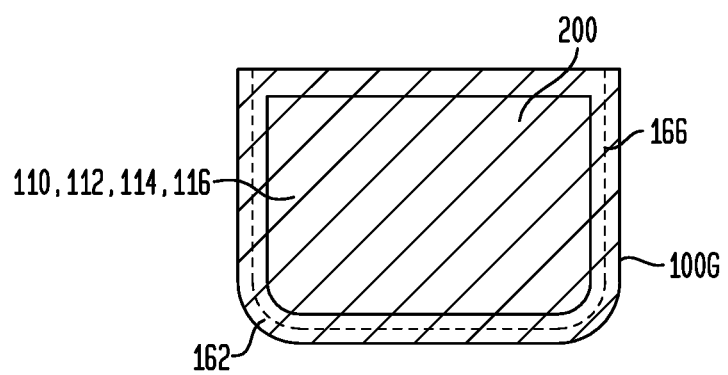

As illustrated in FIG. 27, the cut-resistant fabric 200 is coupled, such as through stitching 415 or an adhesive (not separately illustrated) to a second flexible material (or material layer) 408, which is illustrated as extending laterally and longitudinally across the cut-resistant fabric 200 and beyond the edges of the cut-resistant fabric 200 to form one or more seam regions 170 having the form or shape of a periphery or salvage portion 162. Respective portions of the periphery or salvage portion 162, as one or more seam regions 170, are then inserted (at any selected or desired location within the one or more seam regions 170, along with other materials, such as the exterior fabric 40 and/or lining 42) into and stitched (or adhered) within seams 60 to secure the assembly 100G in a bag 50, bag panel 35, 45, 55 or gusset 70, such as along any of four sides or edges, as previously described.

Figure 28:
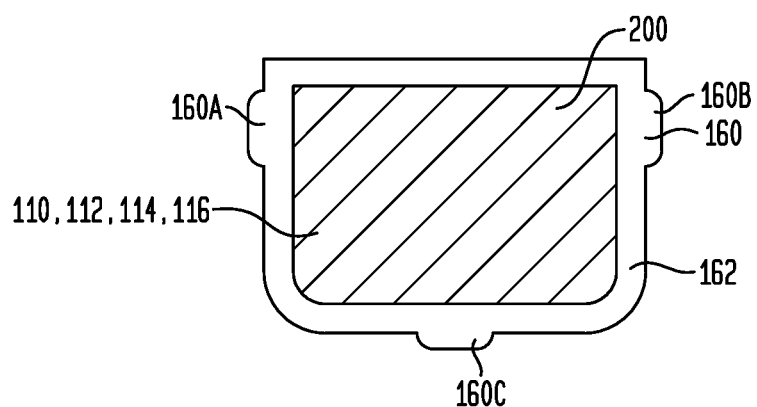

As illustrated in FIG. 28, the cut-resistant fabric 200 is coupled, such as through stitching 415 or an adhesive (not separately illustrated) to a second flexible material (or material layer) 408, which is illustrated as extending laterally and longitudinally across the cut-resistant fabric 200 and beyond the edges of the cut-resistant fabric 200 to form one or more seam regions 170 having the form or shape of a periphery or salvage portion 162 which further comprises one or more tabs 160A, 160B, 160C. Respective portions of the periphery or salvage portion 162 and/or tabs 160A, 160B, 160C, as one or more seam regions 170, are then inserted (at any selected or desired location within the one or more seam regions 170, along with other materials, such as the exterior fabric 40 and/or lining 42) into and stitched (or adhered) within seams 60 to secure the assembly 100G in a bag 50, bag panel 35, 45, 55 or gusset 70, such as along three sides or edges. For example and without limitation, tab 160A is inserted and stitched (or adhered) into a first seam 60, tab 160B is inserted and stitched (or adhered) into a second seam 60, and tab 160C is inserted and stitched (or adhered) into a third seam 60.

Figure 29:
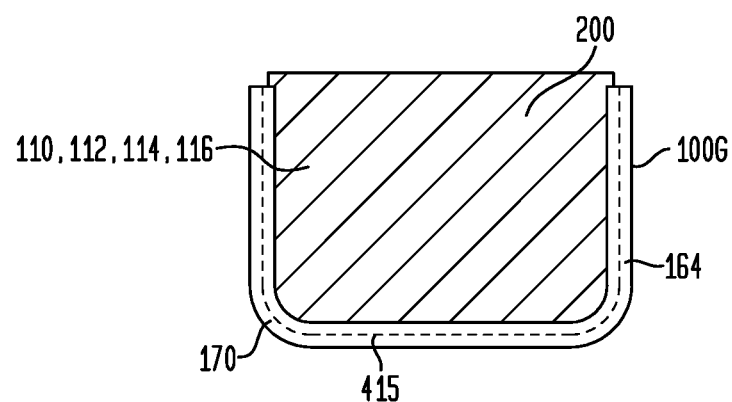

As illustrated in FIG. 29, the cut-resistant fabric 200 is coupled, such as through stitching 415 or an adhesive (not separately illustrated) to a second flexible material (or material layer) 408 to form one or more seam regions 170 having the form factor of a peripheral binding 164, which is illustrated as extending along the periphery of the cut-resistant fabric 200 and beyond the edges of the cut-resistant fabric 200 on three sides. Respective portions of the peripheral binding 164, as one or more seam regions 170, are then inserted (at any selected or desired location within the one or more seam regions 170, along with other materials, such as the exterior fabric 40 and/or lining 42) into and stitched (or adhered) within seams 60 to secure the assembly 100G in a bag 50, bag panel 35, 45, 55 or gusset 70, such as along any of the illustrated three sides or edges coupled to the peripheral binding 164, as previously described.

Figure 30:
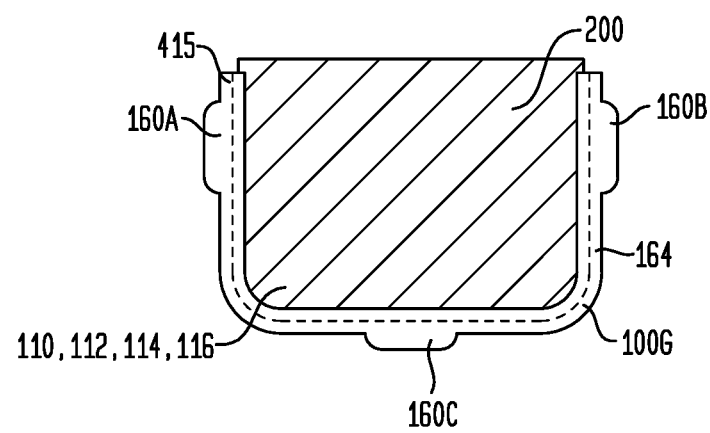

As illustrated in FIG. 30, the cut-resistant fabric 200 is coupled, such as through stitching 415 or an adhesive (not separately illustrated) to a second flexible material (or material layer) 408 having the form factor of a peripheral binding 164 which further comprises one or more tabs 160A, 160B, 160C, which is illustrated as extending along the periphery of the cut-resistant fabric 200 and beyond the edges of the cut-resistant fabric 200 on three sides. The peripheral binding 164 has a plurality of tabs 160A, 160B, 160C. Respective portions of the peripheral binding 164 and/or tabs 160A, 160B, 160C, as one or more seam regions 170, are then inserted (at any selected or desired location within the one or more seam regions 170, along with other materials, such as the exterior fabric 40 and/or lining 42) into and stitched (or adhered) within seams 60 to secure the assembly 100G in a bag 50, bag panel 35, 45, 55 or gusset 70, such as along three sides or edges. For example and without limitation, tab 160A is inserted and stitched (or adhered) into a first seam 60, tab 160B is inserted and stitched (or adhered) into a second seam 60, and tab 160C is inserted and stitched (or adhered) into a third seam 60.

Figure 31:
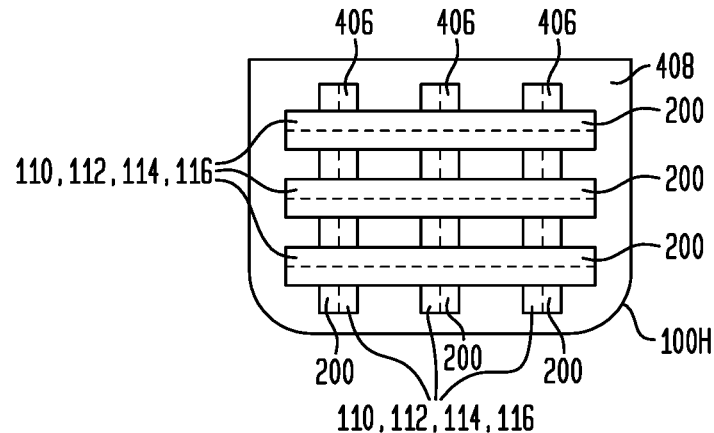
FIGS. 31-33 are plan views illustrating an eighth embodiment of a security panel assembly formed from a plurality of first flexible materials (or material layers) having knit, woven, or spun nonmetallic, cut-resistant yarns or fibers which are coupled to a second flexible material (or material layer).
Figure 32:
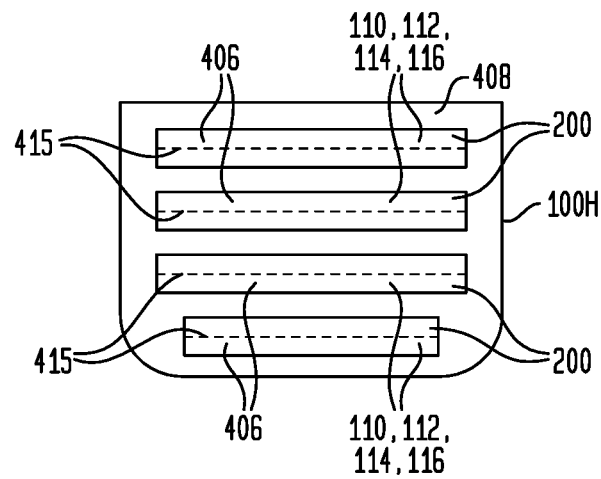
Figure 33:
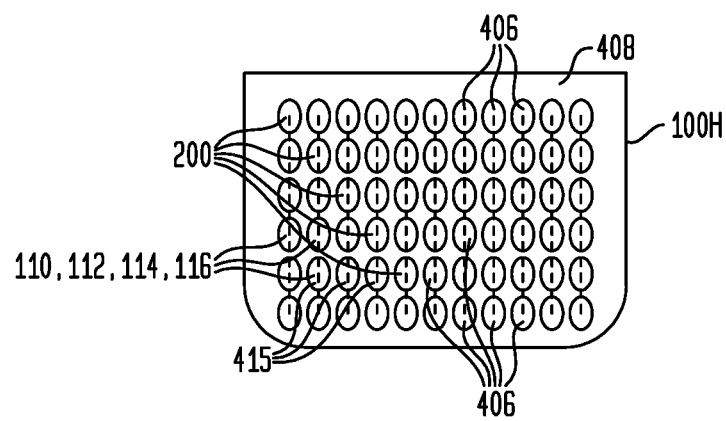

FIGS. 31-33 are plan views illustrating an eighth embodiment of a security panel assembly 100H formed from a plurality of first flexible materials (or material layers) 406 having knit, woven, or spun cut-resistant, polymeric fibers, filaments, cables, threads or yarns 110, 112, 114, or 116 forming a polymeric fiber matrix 125, such as a cut-resistant fabric 200, which is coupled to at least one second flexible material (or material layer) 408, which is generally not cut-resistant and otherwise is not required to include any polymeric fiber matrix 125 having cut-resistant, polymeric fibers, filaments, cables, threads or yarns 110, 112, 114, or 116. The one or more first flexible materials (or material layers) 406 having knit, woven, or spun cut-resistant, polymeric fibers, filaments, cables, threads or yarns 110, 112, 114, or 116 forming a polymeric fiber matrix 125, may be secured to a second flexible material (or material layer) 408 such as through stitching 415 or an adhesive 132 (not separately illustrated), to form a security panel assembly 100H. In a representative embodiment, the one or more second flexible materials (or material layers) 408 may be separate one or more second flexible materials (or material layers) 408 or may be embodied as the exterior fabric or material 40 or lining 42.

In a representative security panel assembly 100H, a plurality of cut-resistant fabrics 200, as a plurality of first flexible materials (or material layers) 406 having an embedded polymeric fiber matrix 125 having cut-resistant, polymeric fibers, filaments, cables, threads or yarns 110, 112, 114, or 116, is coupled (such as through stitching or an adhesive) to one or more second flexible materials (or material layers) 408 which are not cut-resistant. In representative embodiments, as discussed in greater detail below, portions of the one or more second flexible materials (or material layers) 408 (one or more seam regions 170) are inserted (with other materials, such as the exterior fabric and/or lining 42) into and stitched (or adhered) within seams 60 to secure the assembly 100H in a bag 50, bag panel 35, 45, 55 or gusset 70.

For the security panel assembly 100H, the one or more second flexible materials (or material layers) 408 also extend beyond one or more edges 168 of the first flexible materials (or material layers) 406, forming one or more seam regions 170. The one or more seam regions 170 are inserted (at any selected or desired location within the one or more seam regions 170, along with other materials, such as the exterior fabric 40 and/or lining 42) into and stitched (or adhered) within seams 60 to secure the assembly 100H in a bag 50, bag panel 35, 45, 55 or gusset 70.

As illustrated in FIG. 31, a plurality of strips of first flexible materials (or material layers) 406 having an embedded polymeric fiber matrix 125 having cut-resistant, polymeric fibers, filaments, cables, threads or yarns 110, 112, 114, or 116, such as a plurality of strips of a cut-resistant fabric 200, are coupled, such as through stitching 415 or an adhesive (not separately illustrated) to a second flexible material (or material layer) 408. The plurality of strips of first flexible materials (or material layers) 406 having an embedded polymeric fiber matrix 125 having cut-resistant, polymeric fibers, filaments, cables, threads or yarns 110, 112, 114, or 116 are illustrated as extending either laterally and/or longitudinally across the second flexible material (or material layer) 408 and within (i.e., not beyond) the edges 172 of the second flexible material (or material layer) 408. As a result, the second flexible material (or material layer) 408 also forms one or more seam regions 170 having the form or shape of a periphery or salvage portion 162. FIGS. 32 and 33 illustrate some available variations, in which the plurality of strips of first flexible materials (or material layers) 406 having an embedded polymeric fiber matrix 125 having cut-resistant, polymeric fibers, filaments, cables, threads or yarns 110, 112, 114, or 116 are illustrated as extending only laterally (FIG. 32) or the plurality of first flexible materials (or material layers) 406 having an embedded polymeric fiber matrix 125 having cut-resistant, polymeric fibers, filaments, cables, threads or yarns 110, 112, 114, or 116 are illustrated as having circular shapes (FIG. 33), such as providing a decorative (e.g., sequin) effect when the plurality of circles of first flexible materials (or material layers) 406 having an embedded polymeric fiber matrix 125 having cut-resistant, polymeric fibers, filaments, cables, threads or yarns 110, 112, 114, or 116 are applied to the exterior of the bag 50. Respective portions of the periphery or salvage portion 162, as one or more seam regions 170, are then inserted (at any selected or desired location within the one or more seam regions 170, along with other materials, such as the exterior fabric 40 and/or lining 42) into and stitched (or adhered) within seams 60 to secure the assembly 100H in a bag 50, bag panel 35, 45, 55 or gusset 70, such as along any of four sides or edges, as previously described.

Figure 34:
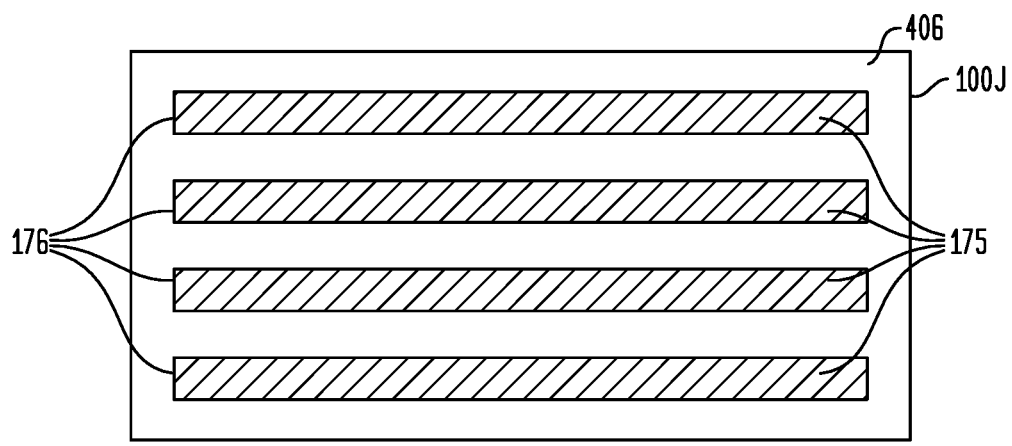
FIGS. 34 and 35 are plan views illustrating a ninth embodiment of a security panel assembly formed from selectively coating a first flexible material (or material layer) with a nonmetallic, cut-resistant polymer or resin.
Figure 35:
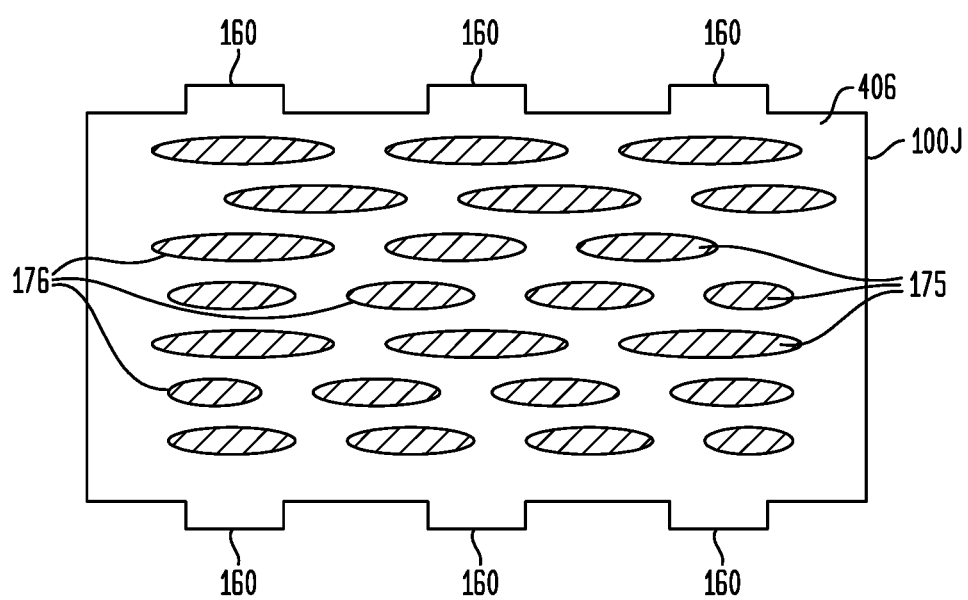

FIGS. 34 and 35 are plan views illustrating a ninth embodiment of a security panel assembly 100J formed from selectively coating a first flexible material (or material layer) 406, in one or more selected areas or regions 176 of the first flexible material (or material layer) 406 or across the entire first flexible material (or material layer) 406, with a non-metallic, cut-resistant polymer, rubber, or resin 175. The cut-resistant polymer or resin 175 may be selected to provide any desired or selected flexibility, adherence, cut-resistance, and other properties, and may be applied in any selected or desired thickness, in any selected or desired shapes, in any selected or desired regions 176, and in any selected or desired number of layers or coatings, for example and without limitation. The first flexible material (or material layer) 406 may include, for example and without limitation, a periphery or salvage portion 162 (as illustrated in FIG. 34) and/or one or more tabs 160 (as illustrated in FIG. 35), as one or more seam regions 170, which are then inserted (at any selected or desired location within the one or more seam regions 170, along with other materials, such as the exterior fabric 40 and/or lining 42) into and stitched (or adhered) within seams 60 to secure the assembly 100J in a bag 50, bag panel 35, 45, 55 or gusset 70, such as along any of four sides or edges, as previously described.

The cut-resistant polymer, rubber, or resin 175 may comprise, for example and without limitation, any polymer, polymeric precursor, rubber, or resin selected from the group consisting of: natural and synthetic rubber materials; any type or form of plastics; lacquers; vinyls and polyvinyls such as polyvinyl pyrrolidone, polyethylene glycol, polyvinyl acetate (PVA), polyvinyl alcohols, polyacrylic acids, polyethylene oxides, polyvinyl butyral (PVB); diethylene glycol, propylene glycol, 2-ethyl oxazoline; clays such as hectorite clays, garamite clays, organo-modified clays; saccharides and polysaccharides such as guar gum, xanthan gum; celluloses and modified celluloses such as hydroxy methylcellulose, methylcellulose, ethyl cellulose, propyl methylcellulose, methoxy cellulose, methoxy methylcellulose, methoxy propyl methylcellulose, hydroxy propyl methylcellulose, carboxy methylcellulose, hydroxy ethylcellulose, ethyl hydroxyl ethylcellulose, cellulose ether, cellulose ethyl ether, chitosan; polymers such as acrylate and (meth)acrylate polymers and copolymers; glycols such as ethylene glycols, diethylene glycol, polyethylene glycols, propylene glycols, dipropylene glycols, glycol ethers, glycol ether acetates; and combinations thereof.

Figure 36:
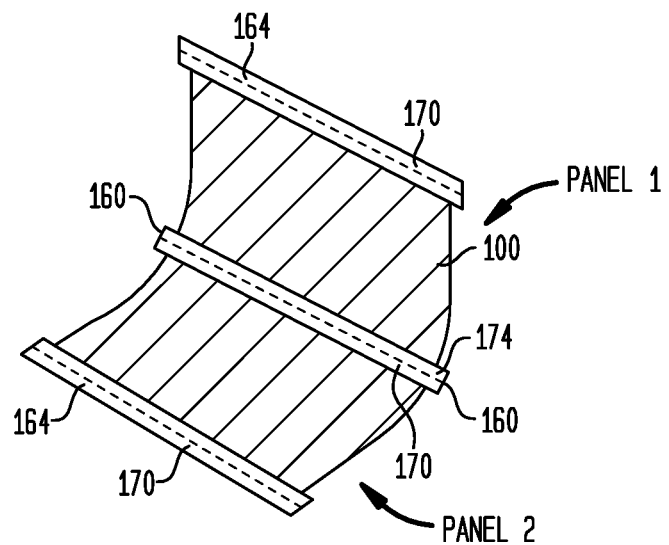
FIGS. 36 and 37 are isometric views illustrating a security panel assembly having knit, woven, or spun nonmetallic, cut-resistant yarns or fibers arranged to span multiple panels or sections of a carrying bag.
Figure 37:
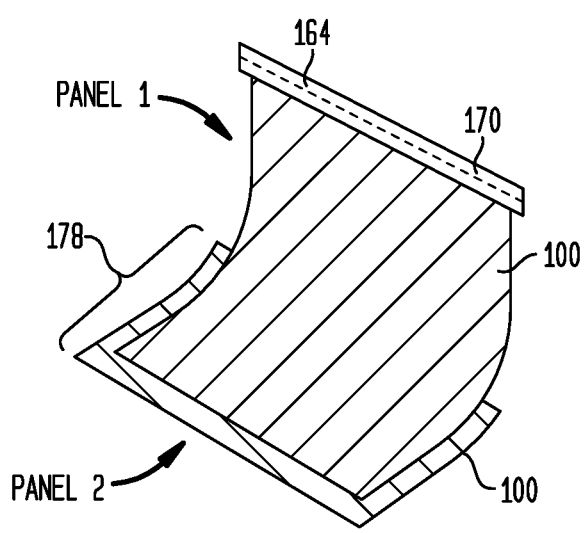

FIGS. 36 and 37 are isometric views illustrating a security panel assembly 100 having knit, woven, or spun cut-resistant, polymeric fibers, filaments, cables, threads or yarns 110, 112, 114, or 116, forming a polymeric fiber matrix 125, arranged to span multiple panels or sections of a carrying bag 50. Any of the various security panel assemblies 100 may be utilized, and may be utilized to include different selected combinations of features. For example, as illustrated in FIG. 36, the security panel assembly 100 includes peripheral bindings 164 and a lateral binding 174, also forming one or more tabs 160, one or more of which can be seam regions 170, which are then inserted (at any selected or desired location within the one or more seam regions 170, along with other materials, such as the exterior fabric 40 and/or lining 42) into and stitched (or adhered) within seams 60 to secure the assembly 100 in a bag 50, bag panel 35, 45, 55 or gusset 70, such as along any of four sides or edges, as previously described. Also for example, as illustrated in FIG. 37, the security panel assembly 100 includes a peripheral binding 164, and further includes a double layer of security panel assemblies 100 (in region 178), such as for added protection.

Figure 38:
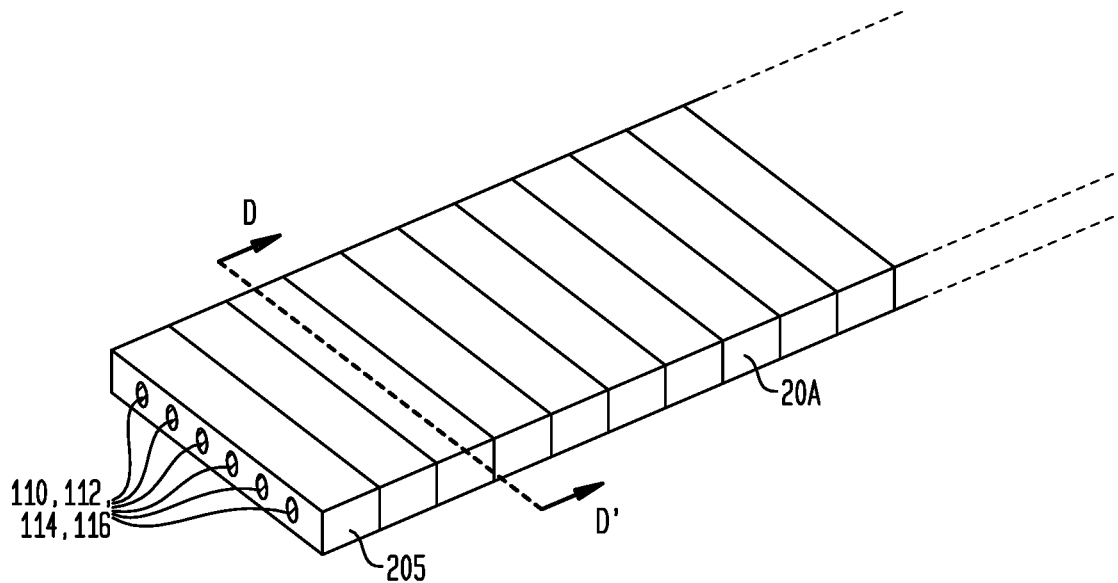
FIG. 38 is an isometric view illustrating a first embodiment of a carrying strap formed from knit, woven, or spun nonmetallic, cut-resistant yarns or fibers.
Figure 39:
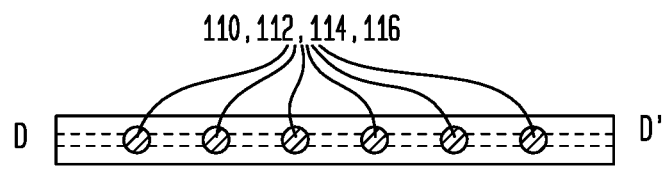
FIG. 39 is a cross-sectional view (through the D-D' plane) of the first embodiment of a carrying strap illustrated in FIG. 38.

FIG. 38 is an isometric view illustrating a first embodiment of a carrying strap 20A formed from knit, woven, or spun cut-resistant, polymeric fibers, filaments, cables, threads or yarns 110, 112, 114, or 116 forming a polymeric fiber matrix 125. FIG. 39 is a cross-sectional view (through the D-D' plane) of the first embodiment of a carrying strap 20A illustrated in FIG. 38. As illustrated in FIGS. 38 and 39, carrying strap 20A comprises a woven webbing 205 (i.e., a flexible, woven material having finished lateral edges) in which one or more of the woven threads, fibers or yarns of the webbing 205 are comprised of a nonmetallic, cut-resistant yarn or fiber 110, 112, 114, or 116, such as the illustrated warp threads. Stated another way, the cut-resistant, polymeric fibers, filaments, cables, threads or yarns 110, 112, 114, or 116 forming a polymeric fiber matrix 125 are woven directly into the webbing 205.

For the various carrying straps 20B-20T discussed below, reference may be made to a fabric or webbing material which does not include a polymeric fiber matrix 125 having cut-resistant, polymeric fibers, filaments, cables, threads or yarns 110, 112, 114, or 116. It should be noted that this feature is entirely optional, such that a polymeric fiber matrix 125 having cut-resistant, polymeric fibers, filaments, cables, threads or yarns 110, 112, 114, or 116 are not required in these fabric or webbing materials (e.g., webbing 210, fabric or webbing 215, 220), and any such fabric or webbing materials may be modified to include a polymeric fiber matrix 125 having cut-resistant, polymeric fibers, filaments, cables, threads or yarns 110, 112, 114, or 116 within the scope of the disclosure.

For the various carrying straps 20B-20T discussed below, reference may be made to a fabric or webbing material which does include a polymeric fiber matrix 125 having cut-resistant, polymeric fibers, filaments, cables, threads or yarns 110, 112, 114, or 116. It should be noted that any such fabric or webbing material which does include a polymeric fiber matrix 125 having cut-resistant, polymeric fibers, filaments, cables, threads or yarns 110, 112, 114, or 116, e.g., a second fabric or webbing material 284, may be embodied as or may be comprised of a security panel assembly 100 or a cut-resistant fabric 200, for example and without limitation.

Figure 40:
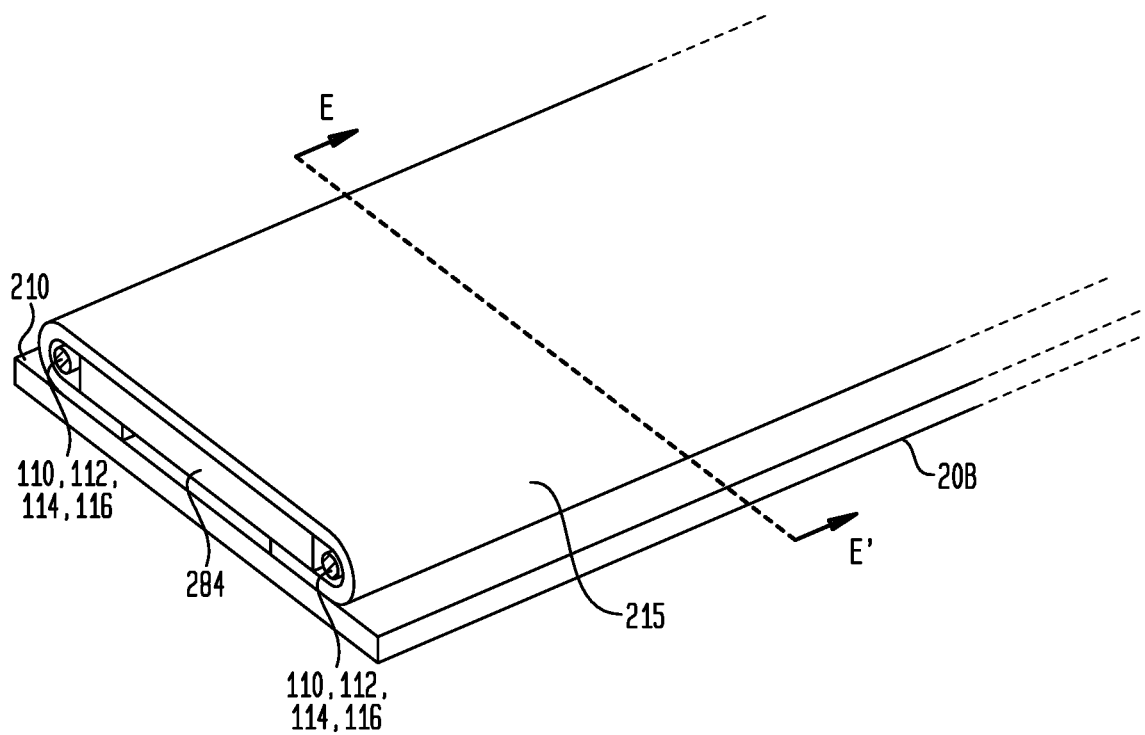
FIG. 40 is an isometric view illustrating a second embodiment of a carrying strap formed from routed, knit, woven, or spun nonmetallic, cut-resistant yarns or fibers.
Figure 41:
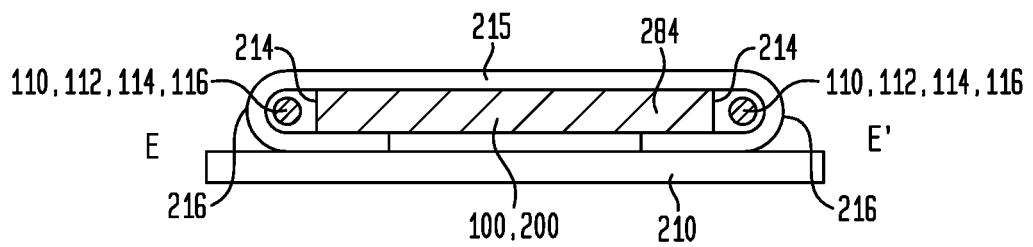
FIG. 41 is a cross-sectional view (through the E-E' plane) of the second embodiment of a carrying strap illustrated in FIG. 40.

FIG. 40 is an isometric view illustrating a second embodiment of a carrying strap 20B formed from routed, knit, woven, or spun cut-resistant, polymeric fibers, filaments, cables, threads or yarns 110, 112, 114, or 116 forming a polymeric fiber matrix 125. FIG. 41 is a cross-sectional view (through the E-E' plane) of the second embodiment of a carrying strap 20B illustrated in FIG. 40. As illustrated in FIGS. 40 and 41, carrying strap 20B comprises a first webbing material 210 which does not include a polymeric fiber matrix 125 having cut-resistant, polymeric fibers, filaments, cables, threads or yarns 110, 112, 114, or 116, which is coupled such as through stitching 212 (and/or an adhesive, not separately illustrated) to a second fabric or webbing material 284 which does include a polymeric fiber matrix 125 having cut-resistant, polymeric fibers, filaments, cables, threads or yarns 110, 112, 114, or 116. In a representative embodiment, the second fabric or webbing material 284 may be comprised of a security panel assembly 100 or a cut-resistant fabric 200, for example and without limitation. As illustrated, the second fabric or webbing material 284 (e.g., a security panel assembly 100 or a cut-resistant fabric 200) has been at least partially wrapped in the lateral dimension around its lateral edges 214 by a third fabric or webbing material 215 having lateral folds 216 and extending toward the center of the strap 20B in between the second fabric or webbing material 284 and the first webbing material 210. The third fabric or webbing material 215 typically does not have, although it may have, a polymeric fiber matrix 125 having cut-resistant, polymeric fibers, filaments, cables, threads or yarns 110, 112, 114, or 116. As an option for this representative embodiment, additional cut-resistant, polymeric fibers, filaments, cables, threads or yarns 110, 112, 114, or 116 may be included, illustrated as arranged laterally to the lateral edges 214 of the second fabric or webbing material 284 and included within the lateral folds 216 of the third fabric or webbing material 215. Additional variations of this strap 20B structure are illustrated and discussed below with reference to FIGS. 74 and 75.

Figure 42:
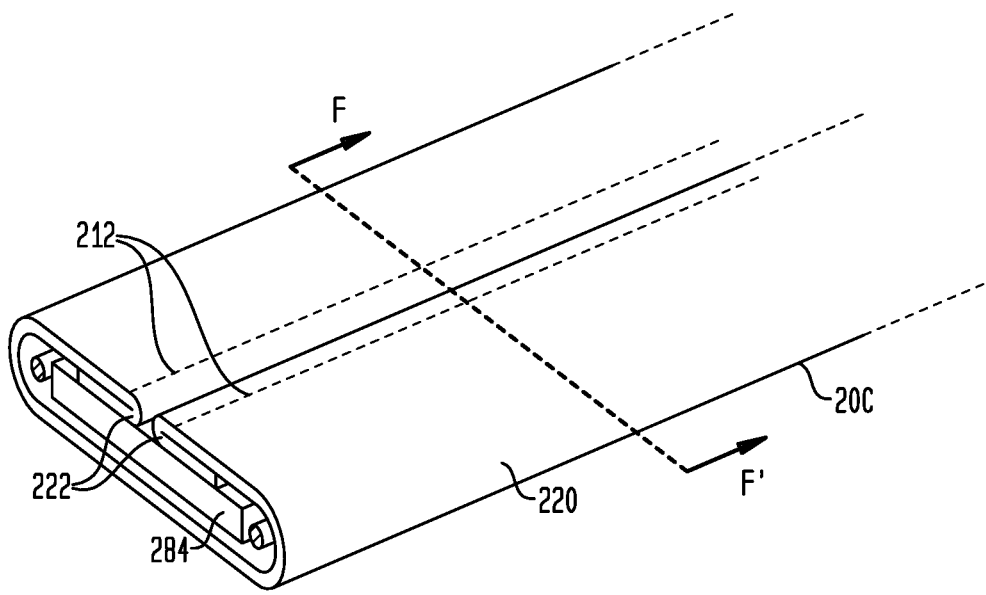
FIG. 42 is an isometric view illustrating a third embodiment of a carrying strap formed from routed, knit, woven, or spun nonmetallic, cut-resistant yarns or fibers.
Figure 43:
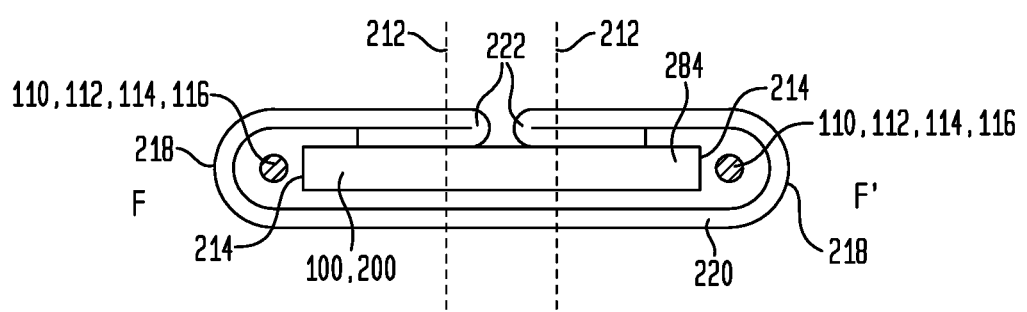
FIG. 43 is a cross-sectional view (through the F-F' plane) of the third embodiment of a carrying strap illustrated in FIG. 42.

FIG. 42 is an isometric view illustrating a third embodiment of a carrying strap 20C formed from routed, knit, woven, or spun cut-resistant, polymeric fibers, filaments, cables, threads or yarns 110, 112, 114, or 116 forming a polymeric fiber matrix 125. FIG. 43 is a cross-sectional view (through the F-F' plane) of the third embodiment of a carrying strap illustrated in FIG. 42. As illustrated in FIGS. 42 and 43, carrying strap 20C comprises a first fabric or webbing material 220 which does not include a polymeric fiber matrix 125 having cut-resistant, polymeric fibers, filaments, cables, threads or yarns 110, 112, 114, or 116, which is coupled such as through stitching 212 (and/or an adhesive, not separately illustrated) to a second fabric or webbing material 284 which does comprise or include a polymeric fiber matrix 125 having cut-resistant, polymeric fibers, filaments, cables, threads or yarns 110, 112, 114, or 116. In a representative embodiment, the second fabric or webbing material 284 may be comprised of a security panel assembly 100 or a cut-resistant fabric 200, for example and without limitation. As illustrated, the second fabric or webbing material 284 has been completely wrapped in the lateral dimension around its lateral edges 214 by the first fabric or webbing material 220 having lateral folds 218. As an option for this representative embodiment, the first fabric or webbing material 220 also includes central (or middle) folds 222, which are also stitched (through stitching 212) to the second fabric or webbing material 284. As another option for this representative embodiment, additional cut-resistant, polymeric fibers, filaments, cables, threads or yarns 110, 112, 114, or 116 may be included, illustrated as arranged laterally to the lateral edges 214 of the second fabric or webbing material 284 and included within the lateral folds 218 of the first fabric or webbing material 220.

Figure 44:
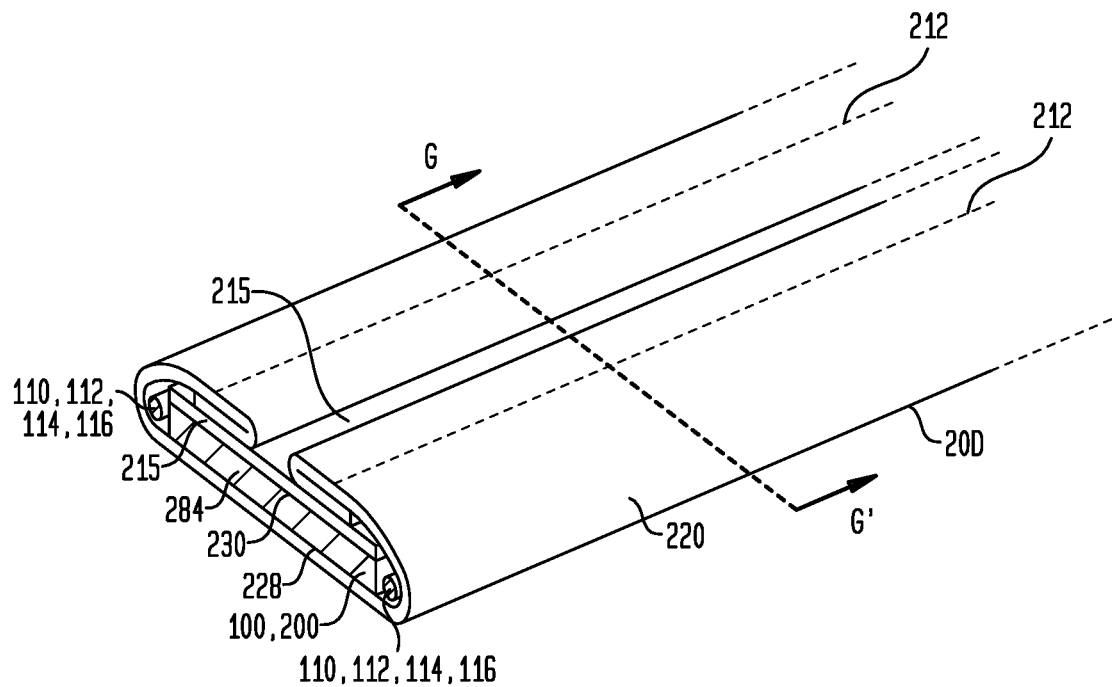
FIG. 44 is an isometric view illustrating a fourth embodiment of a carrying strap formed from routed, knit, woven, or spun nonmetallic, cut-resistant yarns or fibers.
Figure 45:
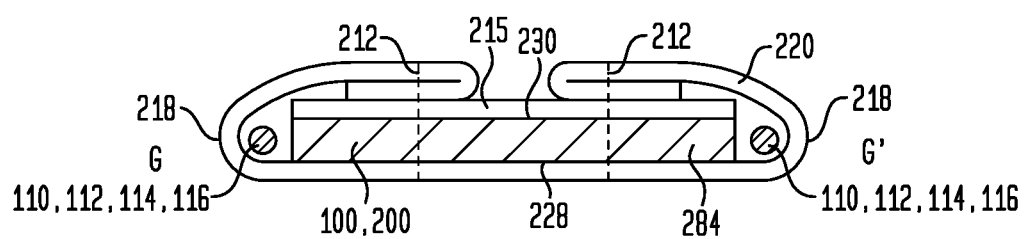
FIG. 45 is a cross-sectional view (through the G-G' plane) of the fourth embodiment of a carrying strap illustrated in FIG. 44.

FIG. 44 is an isometric view illustrating a fourth embodiment of a carrying strap 20D formed from routed, knit, woven, or spun cut-resistant, polymeric fibers, filaments, cables, threads or yarns 110, 112, 114, or 116 forming a polymeric fiber matrix 125. FIG. 45 is a cross-sectional view (through the G-G' plane) of the fourth embodiment of a carrying strap 20D illustrated in FIG. 44. As illustrated in FIGS. 44 and 45, carrying strap 20D comprises a first fabric or webbing material 220 which does not include a polymeric fiber matrix 125 having cut-resistant, polymeric fibers, filaments, cables, threads or yarns 110, 112, 114, or 116, which is coupled such as through stitching 212 (and/or an adhesive, not separately illustrated) to a second fabric or webbing material 284 which does comprise or include a polymeric fiber matrix 125 having cut-resistant, polymeric fibers, filaments, cables, threads or yarns 110, 112, 114, or 116. In a representative embodiment, the second fabric or webbing material 284 may be comprised of a security panel assembly 100 or a cut-resistant fabric 200, for example and without limitation. As illustrated, the second fabric or webbing material 284 has been completely wrapped in the lateral dimension on a first side 228 and around its lateral edges 214 by the first fabric or webbing material 220 having lateral folds 218. The carrying strap 20D differs from carrying strap 20C insofar as the carrying strap 20D also includes a third fabric or webbing material 215 arranged or coupled on a second side 230 of the second fabric or webbing material 284. As an option for this representative embodiment, the first fabric or webbing material 220 also includes central (or middle) folds 222, which are also stitched (through stitching 212) to the third fabric or webbing material 215 and to the second fabric or webbing material 284. As another option for this representative embodiment, additional cut-resistant, polymeric fibers, filaments, cables, threads or yarns 110, 112, 114, or 116 may be included, illustrated as arranged laterally to the lateral edges 214 of the second fabric or webbing material 284 and included within the lateral folds 218 of the first fabric or webbing material 220.

Figure 46:
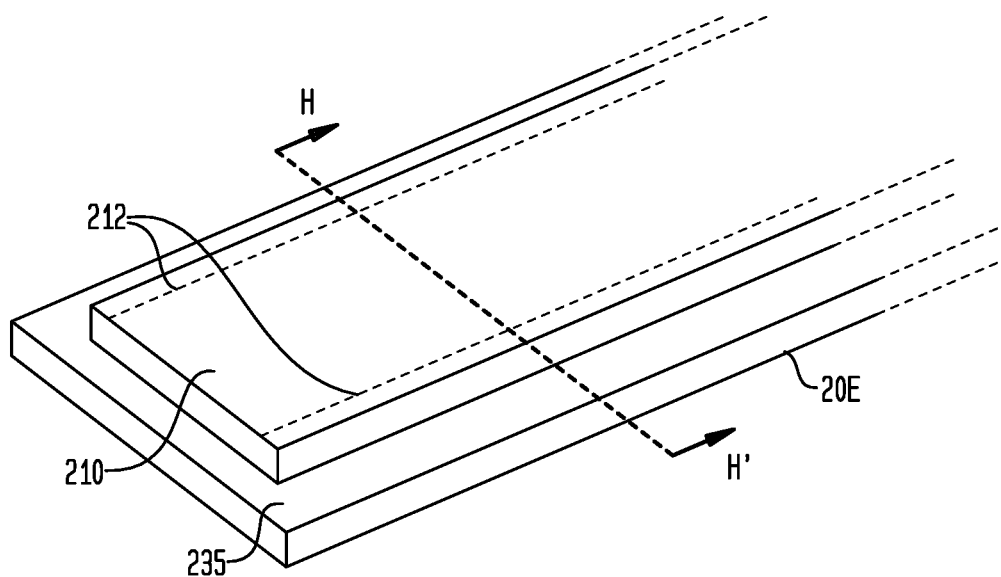
FIG. 46 is an isometric view illustrating a fifth embodiment of a carrying strap formed from routed, knit, woven, or spun nonmetallic, cut-resistant yarns or fibers.
Figure 47:
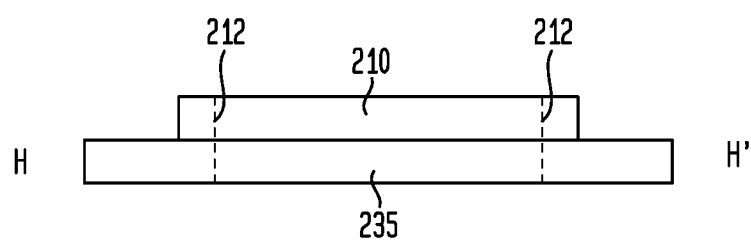
FIG. 47 is a cross-sectional view (through the H-H' plane) of the fifth embodiment of a carrying strap illustrated in FIG. 46.

FIG. 46 is an isometric view illustrating a fifth embodiment of a carrying strap 20E formed from routed, knit, woven, or spun cut-resistant, polymeric fibers, filaments, cables, threads or yarns 110, 112, 114, or 116 forming a polymeric fiber matrix 125. FIG. 47 is a cross-sectional view (through the H-H' plane) of the fifth embodiment of a carrying strap 20E illustrated in FIG. 46. As illustrated in FIGS. 46 and 47, carrying strap 20E comprises a first webbing material 210 which does not include a polymeric fiber matrix 125 having cut-resistant, polymeric fibers, filaments, cables, threads or yarns 110, 112, 114, or 116, which is coupled such as through stitching 212 (and/or an adhesive, not separately illustrated) to a second webbing material 235 (or a second fabric or webbing material 284) which does include a polymeric fiber matrix 125 having cut-resistant, polymeric fibers, filaments, cables, threads or yarns 110, 112, 114, or 116. As an option for this representative embodiment, additional cut-resistant, polymeric fibers, filaments, cables, threads or yarns 110, 112, 114, or 116 may be included (not separately illustrated), such as arranged in between the first webbing material 210 and the second webbing material 235 and any intervening layers (not separately illustrated). Any of the various first webbing material 210 and the second webbing material 235 (or second fabric or webbing material 284) may also include (upward or downward) lateral folds (not separately illustrated) extending toward the longitudinal center or middle of the strap 20E. It should be noted that the first webbing material 210 and the second webbing material 235 (or a second fabric or webbing material 284) may have any of various thicknesses, lengths, and lateral dimensions, in addition to those illustrated, e.g., any of the first webbing material 210 and second webbing material 235 (or a second fabric or webbing material 284) may be thicker or thinner than the other, or wider or narrower than the other, or having equal widths and/or thicknesses, for example and without limitation.

Figure 48:
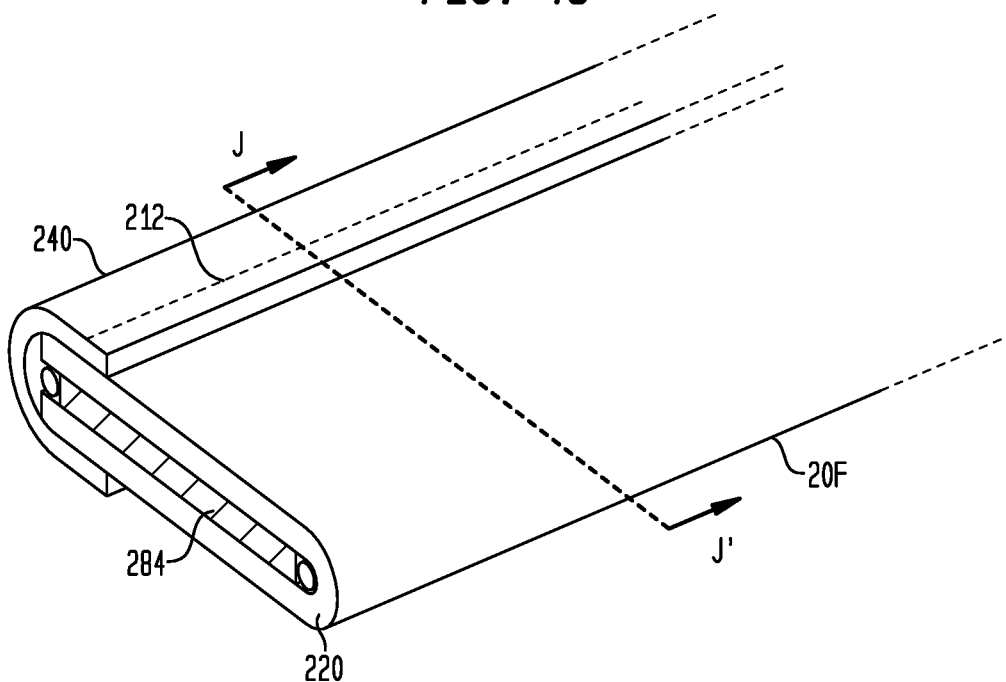
FIG. 48 is an isometric view illustrating a sixth embodiment of a carrying strap formed from routed, knit, woven, or spun nonmetallic, cut-resistant yarns or fibers.
Figure 49:
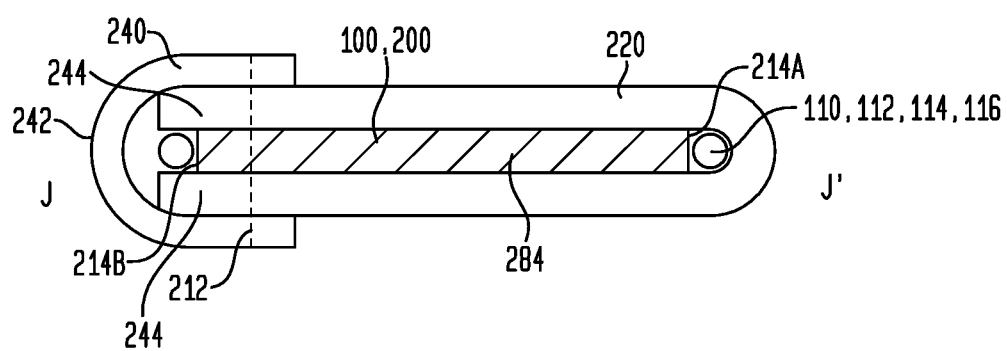
FIG. 49 is a cross-sectional view (through the J-J' plane) of the sixth embodiment of a carrying strap illustrated in FIG. 48.

FIG. 48 is an isometric view illustrating a sixth embodiment of a carrying strap 20F formed from routed, knit, woven, or spun cut-resistant, polymeric fibers, filaments, cables, threads or yarns 110, 112, 114, or 116 forming a polymeric fiber matrix 125. FIG. 49 is a cross-sectional view (through the J-J' plane) of the sixth embodiment of a carrying strap 20F illustrated in FIG. 48. As illustrated in FIGS. 48 and 49, carrying strap 20F comprises a first fabric or webbing material 220 which does not include a polymeric fiber matrix 125 having cut-resistant, polymeric fibers, filaments, cables, threads or yarns 110, 112, 114, or 116, which is coupled such as through stitching 212 (and/or an adhesive, not separately illustrated) to a second fabric or webbing material 284. In a representative embodiment, the second fabric or webbing material 284 may be comprised of a security panel assembly 100 or a cut-resistant fabric 200, for example and without limitation. As illustrated, the second fabric or webbing material 284 has been partially wrapped in the lateral dimension around a first lateral edge 214A by the first fabric or webbing material 220 having a lateral fold 218. A third binding fabric or material 240 has a lateral fold 242 which wraps around the second lateral edge 214B of the second fabric or webbing material 284 and which further covers the lateral regions 244A, 244B of the first fabric or webbing material 220. The third binding fabric or material 240 (which may or may not include a polymeric fiber matrix 125 having cut-resistant, polymeric fibers, filaments, cables, threads or yarns 110, 112, 114, or 116) is coupled through the stitching 212 to the second fabric or webbing material 284 and to the lateral regions 244 of the first fabric or webbing material 220. As an option for this representative embodiment, additional cut-resistant, polymeric fibers, filaments, cables, threads or yarns 110, 112, 114, or 116 may be included, illustrated as arranged laterally to the lateral edges 214A, 214B of the second fabric or webbing material 284 and included respectively within the lateral fold 218 of the first fabric or webbing material 220 and the lateral fold 242 of the third binding fabric or material 240.

Figure 50:
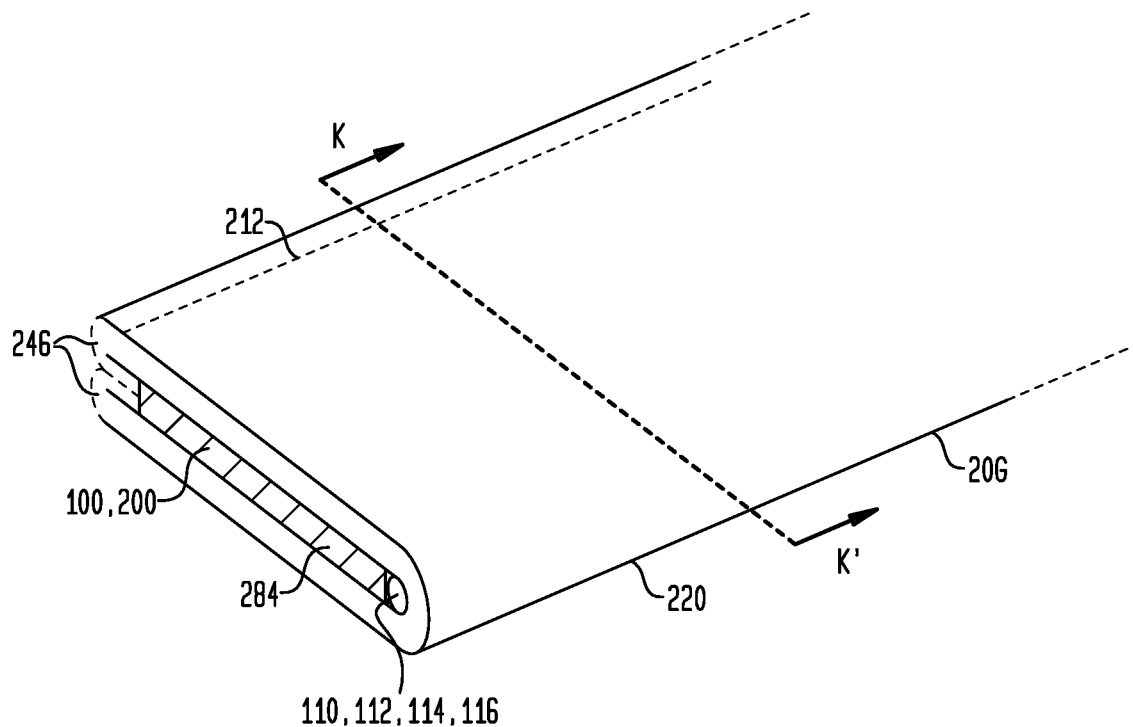
FIG. 50 is an isometric view illustrating a seventh embodiment of a carrying strap formed from routed, knit, woven, or spun nonmetallic, cut-resistant yarns or fibers.
Figure 51:
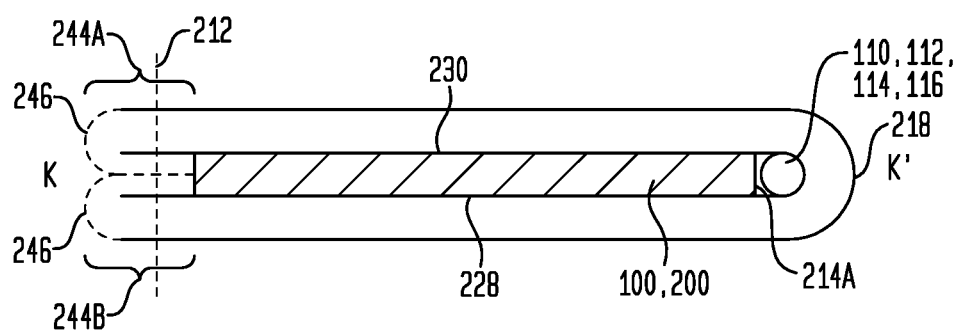
FIG. 51 is a cross-sectional view (through the K-K' plane) of the seventh embodiment of a carrying strap illustrated in FIG. 50.

FIG. 50 is an isometric view illustrating a seventh embodiment of a carrying strap 20G formed from routed, knit, woven, or spun cut-resistant, polymeric fibers, filaments, cables, threads or yarns 110, 112, 114, or 116 forming a polymeric fiber matrix 125. FIG. 51 is a cross-sectional view (through the K-K' plane) of the seventh embodiment of a carrying strap 20G illustrated in FIG. 50. As illustrated in FIGS. 50 and 51, carrying strap 20G comprises a first fabric or webbing material 220 which does not include a polymeric fiber matrix 125 having cut-resistant, polymeric fibers, filaments, cables, threads or yarns 110, 112, 114, or 116, which is folded around and coupled (such as through stitching 212 (and/or an adhesive, not separately illustrated)) to enclose a second fabric or webbing material 284. In a representative embodiment, the second fabric or webbing material 284 may be comprised of a security panel assembly 100 or a cut-resistant fabric 200, for example and without limitation. As illustrated, the second fabric or webbing material 284 has been partially wrapped in the lateral dimension on first and second sides 228, 230 and around a first lateral edge 214A by the first fabric or webbing material 220 having a lateral fold 218. Adjacent the second lateral edge 214B of the second fabric or webbing material 284, the lateral regions 244A, 244B of the first fabric or webbing material 220 are coupled to each other, such as through stitching 212. As an option for this representative embodiment, the first fabric or webbing material 220 may also include lateral folds 246 (illustrated using dashed lines), which are also stitched together (through stitching 212) to enclose the second fabric or webbing material 284. As another option for this representative embodiment, additional cut-resistant, polymeric fibers, filaments, cables, threads or yarns 110, 112, 114, or 116 may be included, illustrated as arranged laterally to the lateral edges 214 of the second fabric or webbing material 284 and included within the lateral fold 218 and/or within the coupled lateral regions 244 of the first fabric or webbing material 220.

Figure 52:
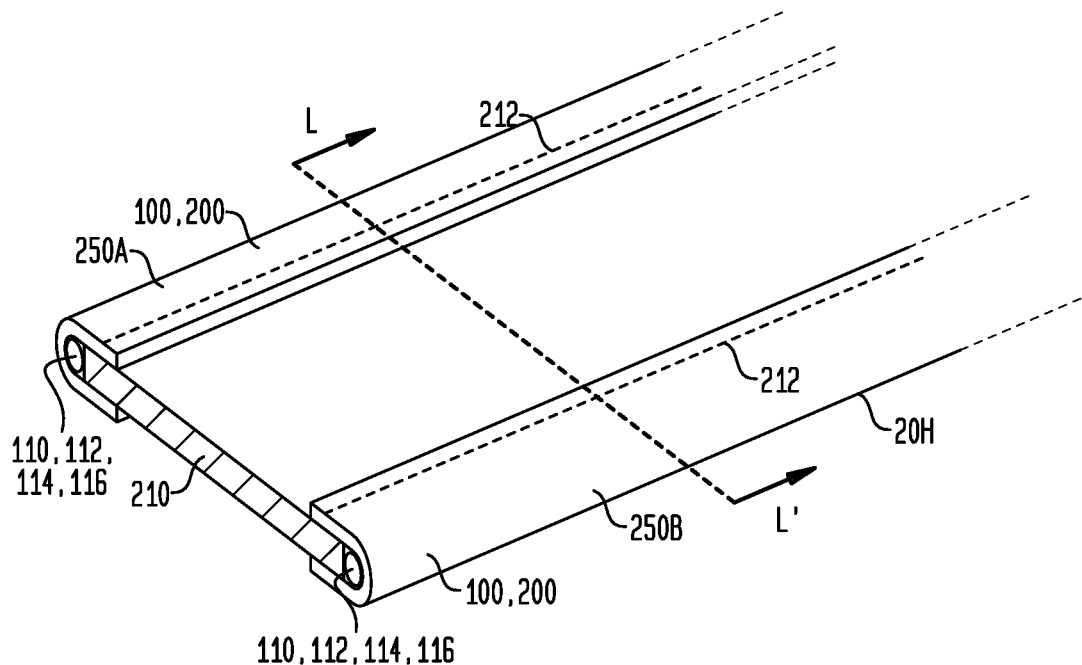
FIG. 52 is an isometric view illustrating an eighth embodiment of a carrying strap formed from routed, knit, woven, or spun nonmetallic, cut-resistant yarns or fibers.
Figure 53:
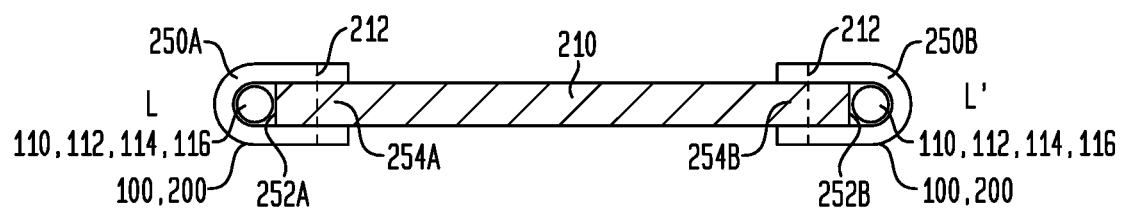
FIG. 53 is a cross-sectional view (through the L-L' plane) of the eighth embodiment of a carrying strap illustrated in FIG. 52.

FIG. 52 is an isometric view illustrating an eighth embodiment of a carrying strap 20H formed from routed, knit, woven, or spun cut-resistant, polymeric fibers, filaments, cables, threads or yarns 110, 112, 114, or 116 forming a polymeric fiber matrix 125. FIG. 53 is a cross-sectional view (through the L-L' plane) of the eighth embodiment of a carrying strap 20H illustrated in FIG. 52. As illustrated in FIGS. 52 and 53, carrying strap 20H comprises a first webbing material 210 which does not include a polymeric fiber matrix 125 having cut-resistant, polymeric fibers, filaments, cables, threads or yarns 110, 112, 114, or 116, which is coupled around its lateral edges 252A, 252B and lateral regions 254A, 254B, such as through stitching 212 (and/or an adhesive, not separately illustrated), respectively to one or more second binding fabrics or materials 250A, 250B, which second binding fabrics or materials 250 comprise or otherwise include a polymeric fiber matrix 125 having cut-resistant, polymeric fibers, filaments, cables, threads or yarns 110, 112, 114, or 116. For example, the second binding fabrics or materials 250 may be comprised of a security panel assembly 100 or a cut-resistant fabric 200. As illustrated, the second binding fabrics or materials 250A, 250B respectively have lateral folds 256A, 256B which respectively wrap around the lateral edges 252A, 252B and lateral regions 254A, 254B of the first webbing material 210. As an option, the second binding fabrics or materials 250A, 250B may also have additional folds 251, illustrated with dashed lines. As another option for this representative embodiment, additional cut-resistant, polymeric fibers, filaments, cables, threads or yarns 110, 112, 114, or 116 may be included, illustrated as arranged laterally to the lateral edges 252A, 252B of the first webbing material 210 and included respectively within the lateral folds 256A, 256B of the second binding fabrics or materials 250A, 250B.

As another option for this representative strap 20H embodiment, not separately illustrated, using the same illustrated structure, the first webbing material 210 may include a polymeric fiber matrix 125 having cut-resistant, polymeric fibers, filaments, cables, threads or yarns 110, 112, 114, or 116 (e.g., replaced by a cut-resistant fabric or webbing 235), and the second binding fabrics or materials 250 may or may not include a polymeric fiber matrix 125 having cut-resistant, polymeric fibers, filaments, cables, threads or yarns 110, 112, 114, or 116. For such an embodiment, any of the various additional cut-resistant, polymeric fibers, filaments, cables, threads or yarns 110, 112, 114, or 116 may be omitted or included, optionally.

Figure 54:
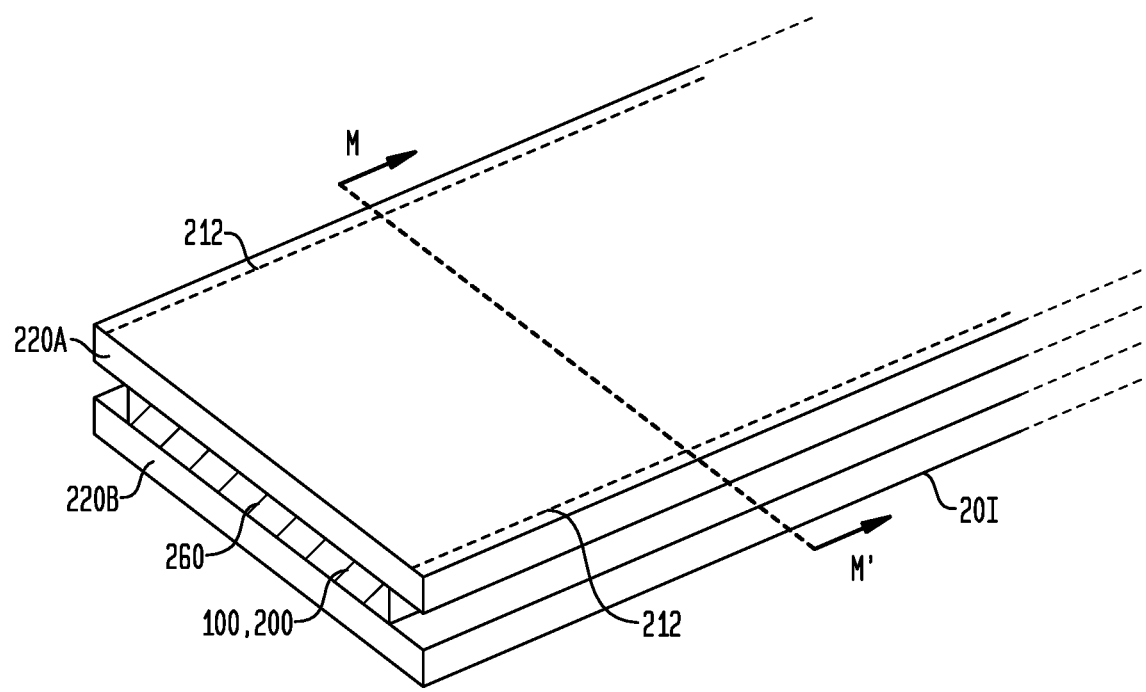
FIG. 54 is an isometric view illustrating a ninth embodiment of a carrying strap formed from routed, knit, woven, or spun nonmetallic, cut-resistant yarns or fibers.
Figure 55:
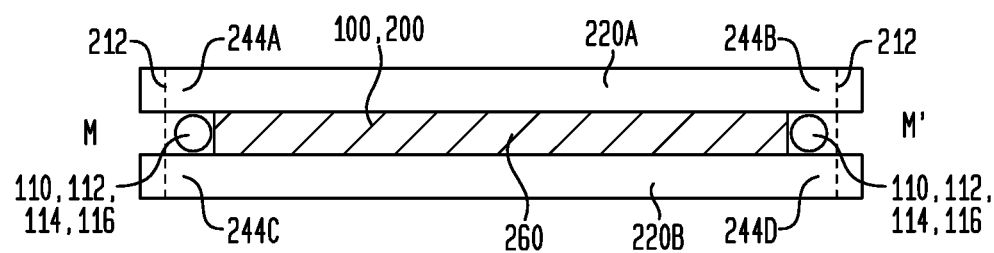
FIG. 55 is a cross-sectional view (through the M-M' plane) of the ninth embodiment of a carrying strap illustrated in FIG. 54.

FIG. 54 is an isometric view illustrating a ninth embodiment of a carrying strap 20I formed from routed, knit, woven, or spun cut-resistant, polymeric fibers, filaments, cables, threads or yarns 110, 112, 114, or 116 forming a polymeric fiber matrix 125. FIG. 55 is a cross-sectional view (through the M-M' plane) of the ninth embodiment of a carrying strap 20I illustrated in FIG. 54. As illustrated in FIGS. 54 and 55, carrying strap 20I comprises a first and second fabric or webbing materials 220A, 220B which do not include a polymeric fiber matrix 125 having cut-resistant, polymeric fibers, filaments, cables, threads or yarns 110, 112, 114, or 116, which are coupled to each other (at lateral regions 244A, 244C and 244B, 244D) such as through stitching 212 (and/or an adhesive, not separately illustrated) to enclose (e.g., to sandwich) a third, core fabric or webbing material 260 which does include a polymeric fiber matrix 125 having cut-resistant, polymeric fibers, filaments, cables, threads or yarns 110, 112, 114, or 116. In a representative embodiment, the third, core fabric or webbing material 260, which may be similar to or the same as the second fabric or webbing material 284, may be comprised of a security panel assembly 100 or a cut-resistant fabric 200, for example and without limitation. As an option for this representative embodiment, additional cut-resistant, polymeric fibers, filaments, cables, threads or yarns 110, 112, 114, or 116 may be included, such as arranged laterally to the third, core fabric or webbing material 260 and in between the first fabric or webbing material 220A and the second fabric or webbing material 220B and any intervening layers (not separately illustrated).

Figure 56:
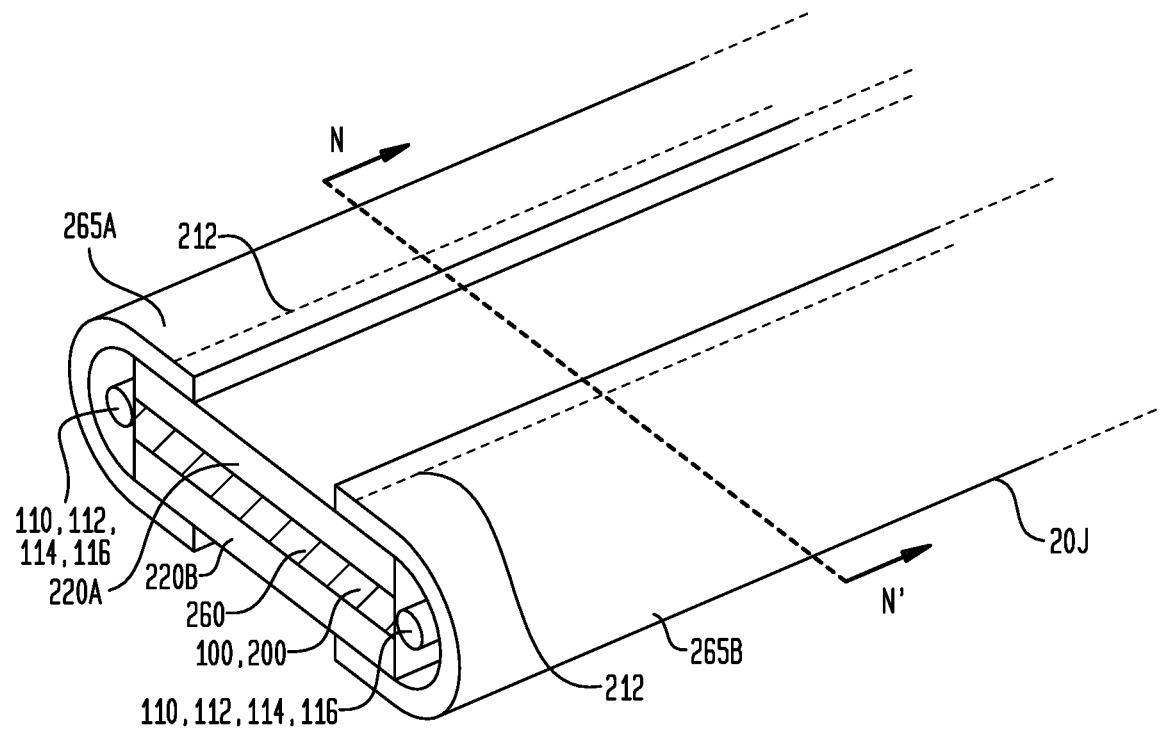
FIG. 56 is an isometric view illustrating a tenth embodiment of a carrying strap formed from routed, knit, woven, or spun nonmetallic, cut-resistant yarns or fibers.
Figure 57:
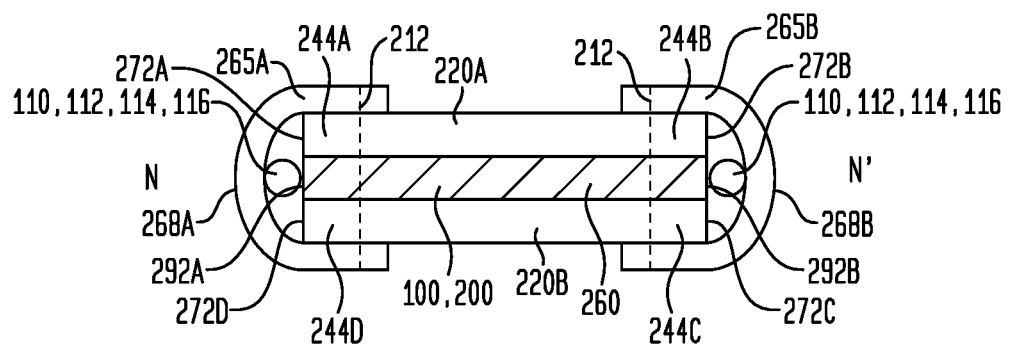
FIG. 57 is a cross-sectional view (through the N-N' plane) of the tenth embodiment of a carrying strap illustrated in FIG. 56.

FIG. 56 is an isometric view illustrating a tenth embodiment of a carrying strap 20J formed from routed, knit, woven, or spun cut-resistant, polymeric fibers, filaments, cables, threads or yarns 110, 112, 114, or 116 forming a polymeric fiber matrix 125. FIG. 57 is a cross-sectional view (through the N-N' plane) of the tenth embodiment of a carrying strap 20J illustrated in FIG. 56. As illustrated in FIGS. 56 and 57, carrying strap 20J comprises a first and second fabric or webbing materials 220A, 220B which do not include a polymeric fiber matrix 125 having cut-resistant, polymeric fibers, filaments, cables, threads or yarns 110, 112, 114, or 116, which are respectively coupled (such as through stitching 212 (and/or an adhesive, not separately illustrated)) to first and second sides 262, 264 of a third, core fabric or webbing material 260 which does include a polymeric fiber matrix 125 having cut-resistant, polymeric fibers, filaments, cables, threads or yarns 110, 112, 114, or 116. In a representative embodiment, the third, core fabric or webbing material 260, which may be similar to or the same as the second fabric or webbing material 284, may be comprised of a security panel assembly 100 or a cut-resistant fabric 200, for example and without limitation. The carrying strap 20J differs from the carrying strap 20I insofar as fourth binding fabrics or materials 265A, 265B (which may or may not also comprise a polymeric fiber matrix 125 having cut-resistant, polymeric fibers, filaments, cables, threads or yarns 110, 112, 114, or 116) are included and which have respective lateral folds 268A, 268B that respectively wrap around the lateral edges 292A, 292B of the third, core fabric or webbing material 260, the respective lateral edges 272A, 272C and 272B, 272D of the first and second fabric or webbing materials 220A, 220B, and which further respectively cover the lateral regions 244A, 244C and 244B, 244D of the first and second fabric or webbing materials 220A, 220B. The fourth binding fabrics or materials 265A, 265B are coupled through the stitching 212 to the third, core fabric or webbing material 260 and to the lateral regions 244A, 244C and 244B, 244D of the first and second fabric or webbing materials 220A, 220B. As an option for this representative embodiment, additional cut-resistant, polymeric fibers, filaments, cables, threads or yarns 110, 112, 114, or 116 may be included, such as arranged laterally to the third, core fabric or webbing material 260 and enclosed within the lateral folds 268A, 268B of the fourth binding fabrics or materials 265A, 265B.

Figure 58:
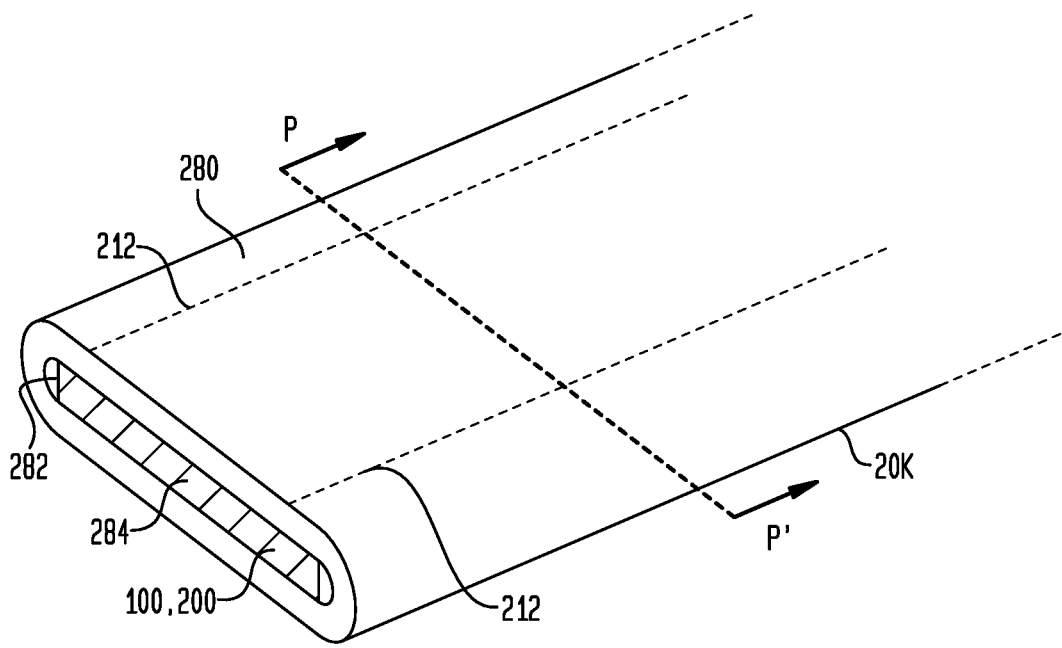
FIG. 58 is an isometric view illustrating an eleventh embodiment of a carrying strap formed from routed, knit, woven, or spun nonmetallic, cut-resistant yarns or fibers.
Figure 59:
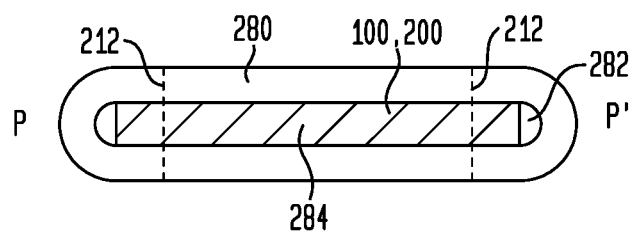
FIG. 59 is a cross-sectional view (through the P-P' plane) of the eleventh embodiment of a carrying strap illustrated in FIG. 58.

FIG. 58 is an isometric view illustrating an eleventh embodiment of a carrying strap 20K formed from routed, knit, woven, or spun cut-resistant, polymeric fibers, filaments, cables, threads or yarns 110, 112, 114, or 116 forming a polymeric fiber matrix 125. FIG. 59 is a cross-sectional view (through the P-P' plane) of the eleventh embodiment of a carrying strap 20K illustrated in FIG. 58. As illustrated in FIGS. 58 and 59, carrying strap 20K comprises a first, tubular fabric or webbing material 280 having a central lumen or channel 282. The first, tubular fabric or webbing material 280 generally is not required to and does not include a polymeric fiber matrix 125 having cut-resistant, polymeric fibers, filaments, cables, threads or yarns 110, 112, 114, or 116. A second fabric or webbing material 284 which does include a polymeric fiber matrix 125 having cut-resistant, polymeric fibers, filaments, cables, threads or yarns 110, 112, 114, or 116 is arranged within the central lumen or channel 282 of the first, tubular fabric or webbing material 280. In a representative embodiment, the second fabric or webbing material 284 may be comprised of a security panel assembly 100 or a cut-resistant fabric 200, for example and without limitation. While not required, but available as an option for this representative embodiment, the first, tubular fabric or webbing material 280 may be coupled such as through stitching 212 (and/or an adhesive, not separately illustrated) to the second fabric or webbing material 284. Also an option for this representative embodiment, additional cut-resistant, polymeric fibers, filaments, cables, threads or yarns 110, 112, 114, or 116 may be included (not separately illustrated), such as also arranged within the central lumen or channel 282.

Figure 60:
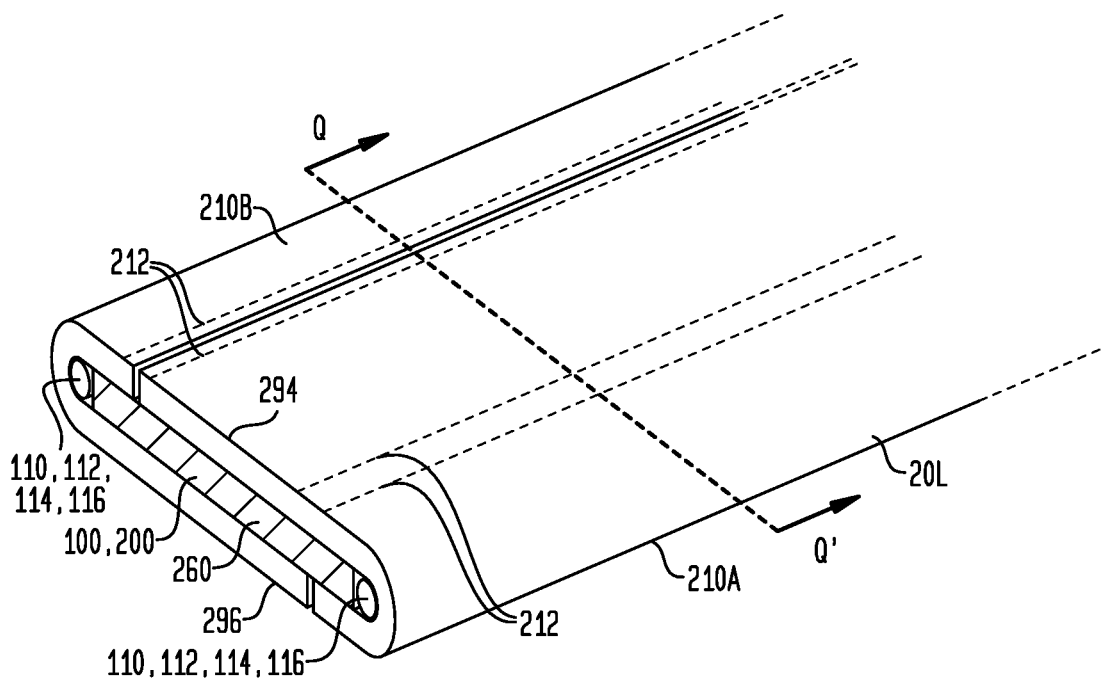
FIG. 60 is an isometric view illustrating a twelfth embodiment of a carrying strap formed from routed, knit, woven, or spun nonmetallic, cut-resistant yarns or fibers.
Figure 61:
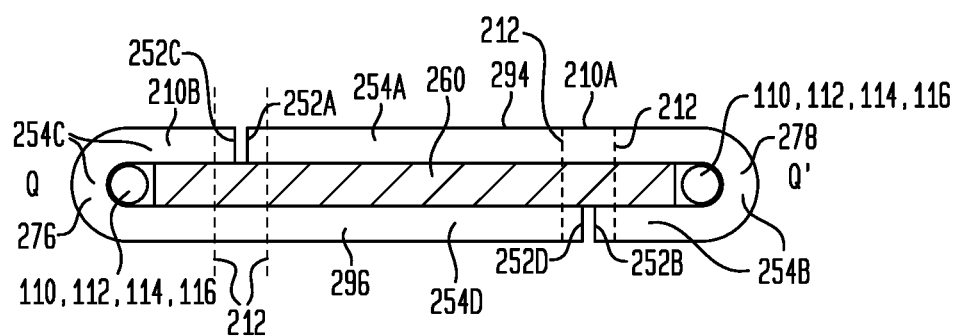
FIG. 61 is a cross-sectional view (through the Q-Q' plane) of the twelfth embodiment of a carrying strap illustrated in FIG. 60.

FIG. 60 is an isometric view illustrating a twelfth embodiment of a carrying strap 20L formed from routed, knit, woven, or spun cut-resistant, polymeric fibers, filaments, cables, threads or yarns 110, 112, 114, or 116 forming a polymeric fiber matrix 125. FIG. 61 is a cross-sectional view (through the Q-Q' plane) of the twelfth embodiment of a carrying strap 20L illustrated in FIG. 60. As illustrated in FIGS. 60 and 61, carrying strap 20L comprises a first and second webbing materials 210A, 210B which do not include a polymeric fiber matrix 125 having cut-resistant, polymeric fibers, filaments, cables, threads or yarns 110, 112, 114, or 116, which are coupled (such as through stitching 212 (and/or an adhesive, not separately illustrated)) to each other and to a third, core fabric or webbing material 260 which does include a polymeric fiber matrix 125 having cut-resistant, polymeric fibers, filaments, cables, threads or yarns 110, 112, 114, or 116, to enclose (e.g., to sandwich) the third, core fabric or webbing material 260. In a representative embodiment, the third, core fabric or webbing material 260, which may be similar to or the same as the second fabric or webbing material 284, may be comprised of a security panel assembly 100 or a cut-resistant fabric 200, for example and without limitation. As an option for this representative embodiment, additional cut-resistant, polymeric fibers, filaments, cables, threads or yarns 110, 112, 114, or 116 may be included, such as arranged laterally to the third, core fabric or webbing material 260 and in between the first webbing material 210A and the second webbing material 210B and any intervening layers (not separately illustrated).

For this carrying strap 20L embodiment, the first and second webbing materials 210A, 210B are offset laterally from each other, in an offset arrangement partially described in the related applications. The first webbing material 210A has a first lateral edge 252A, a first lateral region 244A, a second lateral edge 252B, and a second lateral region 254B. The second webbing material 210B has a first lateral edge 252C, a first lateral region 254C, a second lateral edge 252D, and a second lateral region 254D. The first lateral region 254C of the second webbing material 210B has a lateral fold 276 which wraps around the first lateral edge 292A of the third, core fabric or webbing material 260. The second lateral region 254B of the first webbing material 210A has a lateral fold 278 which wraps around the second lateral edge 292B of the third, core fabric or webbing material 260. In this arrangement, the first lateral edge 252C of the second webbing material 210B is adjacent the first lateral edge 252A of the first webbing material 210A on a first side 294 of the strap 20L, and the second lateral edge 252D of the second webbing material 210B is adjacent the second lateral edge 252B of the first webbing material 210A on a second side 296 of the strap 20L.

Figure 62:
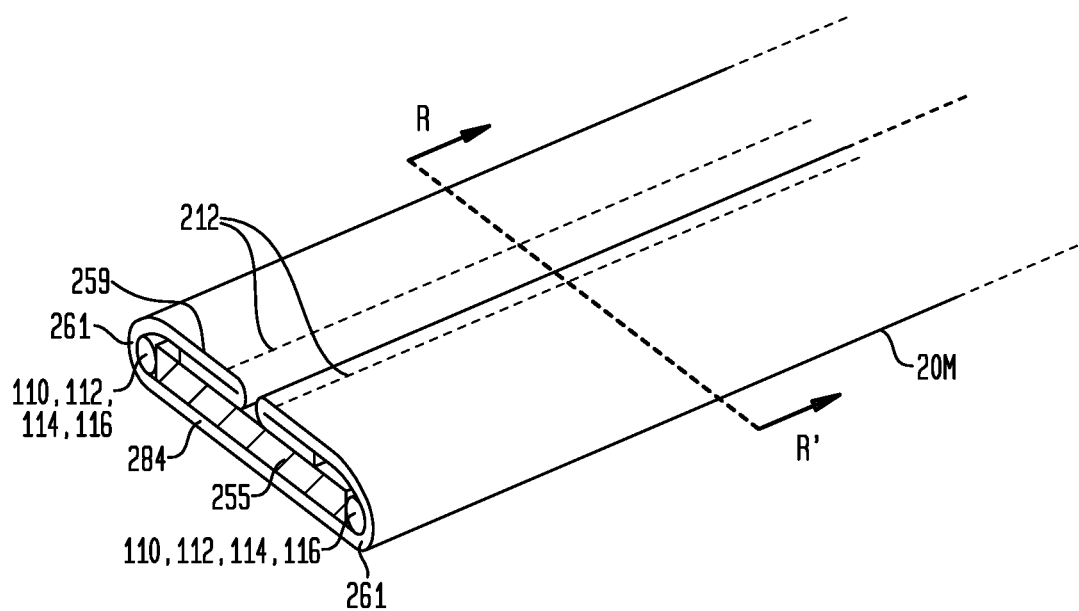
FIG. 62 is an isometric view illustrating a thirteenth embodiment of a carrying strap formed from routed, knit, woven, or spun nonmetallic, cut-resistant yarns or fibers.
Figure 63:
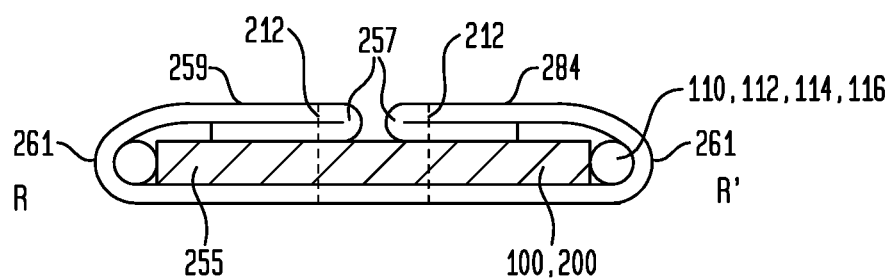
FIG. 63 is a cross-sectional view (through the R-R' plane) of the thirteenth embodiment of a carrying strap illustrated in FIG. 62.

FIG. 62 is an isometric view illustrating a thirteenth embodiment of a carrying strap 20M formed from routed, knit, woven, or spun cut-resistant, polymeric fibers, filaments, cables, threads or yarns 110, 112, 114, or 116 forming a polymeric fiber matrix 125. FIG. 63 is a cross-sectional view (through the R-R' plane) of the thirteenth embodiment of a carrying strap 20M illustrated in FIG. 62. As illustrated in FIGS. 62 and 63, carrying strap 20M comprises a first, filler material core 255 which does not include a polymeric fiber matrix 125 having cut-resistant, polymeric fibers, filaments, cables, threads or yarns 110, 112, 114, or 116 and a second fabric or webbing material 284 (which does include a polymeric fiber matrix 125 having cut-resistant, polymeric fibers, filaments, cables, threads or yarns 110, 112, 114, or 116). The second fabric or webbing material 284 is folded or wrapped laterally (lateral folds 261) around the first, filler material core 255 and encloses the first, filler material core 255. The second fabric or webbing material 284 is coupled, such as through stitching 212 or an adhesive (not separately illustrated), to the first, filler material core 255. In a representative embodiment, as an option as illustrated, the second fabric or webbing material 284 also has central folds 257, creating a double layer of second fabric or webbing material 284 on a first side 259 of the strap 20M, coupled to the first, filler material core 255 through stitches 212 (or an adhesive, as previously described). As an option for this representative embodiment, additional cut-resistant, polymeric fibers, filaments, cables, threads or yarns 110, 112, 114, or 116 may be included, such as arranged laterally to the first, filler material core 255 and enclosed by the second fabric or webbing material 284 and any intervening layers (not separately illustrated).

It should be noted that the first, filler material core 255 may be comprised of any flexible material, such as any type of fabric, any type of sponge, or any other type of compressible or non-compressible material which will add thickness to the strap 20. For any selected embodiment, as an option, the first, filler material core 255 also may include a polymeric fiber matrix 125 having cut-resistant, polymeric fibers, filaments, cables, threads or yarns 110, 112, 114, or 116.

Figure 64:
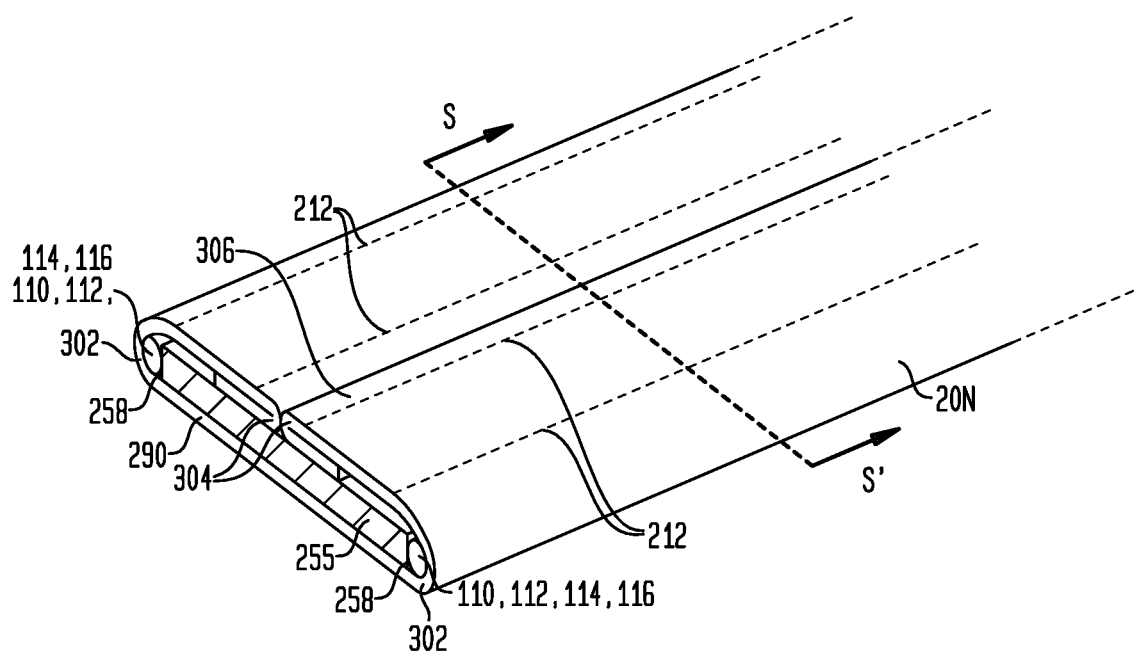
FIG. 64 is an isometric view illustrating a fourteenth embodiment of a carrying strap formed from nonmetallic, cut-resistant yarns or fibers.
Figure 65:
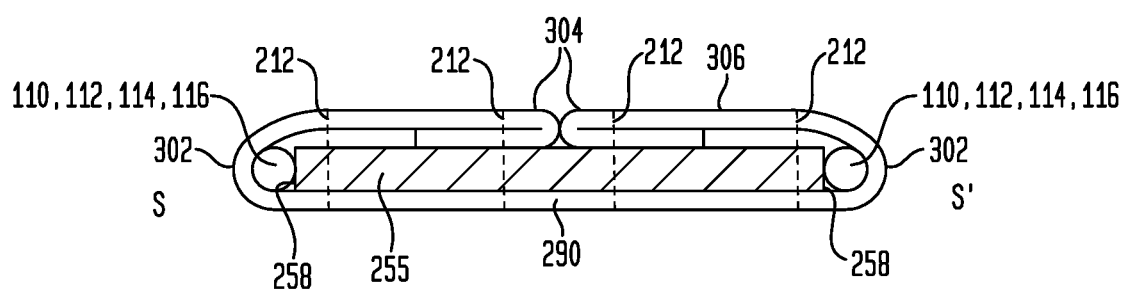
FIG. 65 is a cross-sectional view (through the S-S' plane) of the fourteenth embodiment of a carrying strap illustrated in FIG. 64.

FIG. 64 is an isometric view illustrating a fourteenth embodiment of a carrying strap 20N formed from nonmetallic, cut-resistant yarns or fibers. FIG. 65 is a cross-sectional view (through the S-S' plane) of the fourteenth embodiment of a carrying strap 20N illustrated in FIG. 64. As illustrated in FIGS. 64 and 65, carrying strap 20N comprises a first, filler material core 255 which generally does not include a polymeric fiber matrix 125 having cut-resistant, polymeric fibers, filaments, cables, threads or yarns 110, 112, 114, or 116, a plurality of cut-resistant, polymeric fibers, filaments, cables, threads or yarns 110, 112, 114, or 116 which are arranged adjacent or next to the lateral edges 258 of the first, filler material core 255, and a second fabric or webbing material 290 (also which optionally does not include a polymeric fiber matrix 125 having cut-resistant, polymeric fibers, filaments, cables, threads or yarns 110, 112, 114, or 116). The second fabric or webbing material 290 may be comprised of any flexible material, such as any type of fabric, any type of sponge, leather, suede, etc. The second fabric or webbing material 290 is folded or wrapped laterally (lateral folds 302) around the first, filler material core 255 and the cut-resistant, polymeric fibers, filaments, cables, threads or yarns 110, 112, 114, or 116 and encloses the first, filler material core 255 and the cut-resistant, polymeric fibers, filaments, cables, threads or yarns 110, 112, 114, or 116. The second fabric or webbing material 290 is coupled, such as through stitching 212 or an adhesive (not separately illustrated), to the first, filler material core 255 and also secures the cut-resistant, polymeric fibers, filaments, cables, threads or yarns 110, 112, 114, or 116 in place. In a representative embodiment, as an option as illustrated, the second fabric or webbing material 290 also has central folds 304, creating a double layer of second fabric or webbing material 290 on a first side 306 of the strap 20N, coupled to the first, filler material core 255 through stitches 212 (or an adhesive, as previously described). As an option for this representative embodiment, additional cut-resistant, polymeric fibers, filaments, cables, threads or yarns 110, 112, 114, or 116 may be included, such as arranged above or below the first, filler material core 255 or within the central folds 304 and enclosed by the second fabric or webbing material 290 and any intervening layers (not separately illustrated).

Figure 66:
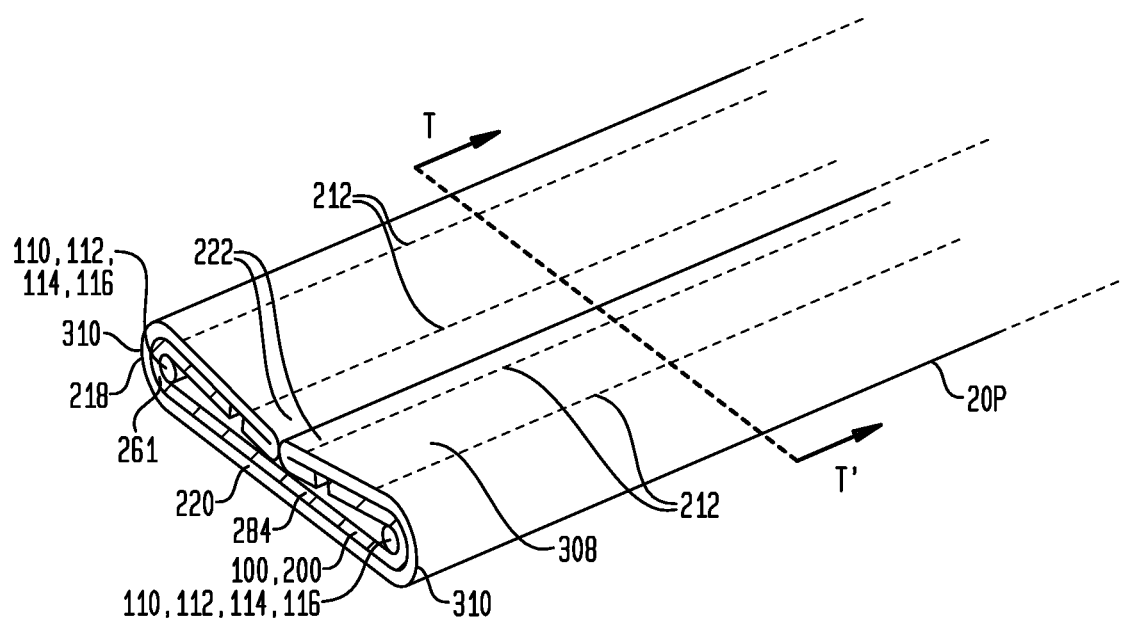
FIG. 66 is an isometric view illustrating a fifteenth embodiment of a carrying strap formed from nonmetallic, cut-resistant yarns or fibers and routed, knit, woven, or spun nonmetallic, cut-resistant yarns or fibers.
Figure 67:
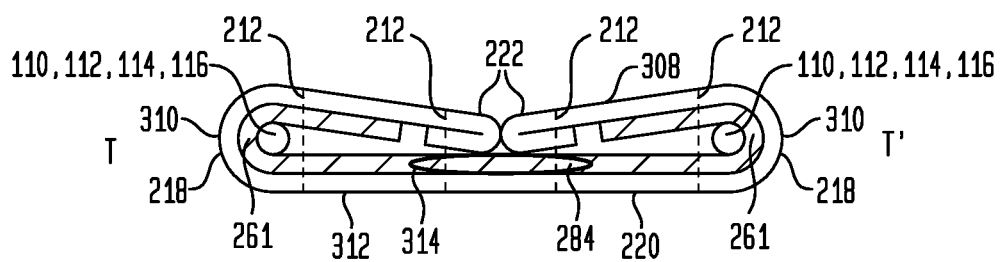
FIG. 67 is a cross-sectional view (through the T-T' plane) of the fifteenth embodiment of a carrying strap illustrated in FIG. 66.

FIG. 66 is an isometric view illustrating a fifteenth embodiment of a carrying strap 20P formed from nonmetallic, cut-resistant yarns or fibers and routed, knit, woven, or spun nonmetallic, cut-resistant yarns or fibers forming a polymeric fiber matrix 125. FIG. 67 is a cross-sectional view (through the T-T' plane) of the fifteenth embodiment of a carrying strap 20P illustrated in FIG. 66. As illustrated in FIGS. 66 and 67, carrying strap 20P comprises a first fabric or webbing material 220 which generally does not include a polymeric fiber matrix 125 having cut-resistant, polymeric fibers, filaments, cables, threads or yarns 110, 112, 114, or 116, a second fabric or webbing material 284 which does include a polymeric fiber matrix 125 having cut-resistant, polymeric fibers, filaments, cables, threads or yarns 110, 112, 114, or 116, and a plurality of cut-resistant, polymeric fibers, filaments, cables, threads or yarns 110, 112, 114, or 116 which are arranged adjacent or next to the lateral edges 310 of the strap 20P. More specifically, the second fabric or webbing material 284 is arranged underneath the first fabric or webbing material 220, and both the second fabric or webbing material 284 and the first fabric or webbing material 220 are collectively folded laterally to form the lateral edges 310 of the strap 20P, respectively having lateral folds 261 and lateral folds 218, with the cut-resistant, polymeric fibers, filaments, cables, threads or yarns 110, 112, 114, or 116 arranged within these lateral folds, specifically within the innermost lateral folds, the lateral folds 261. Not separately illustrated, the strap 20P may also include additional filler material, such as a first, filler material core 255 arranged within the interior of the strap 20P. The first fabric or webbing material 220 and the second fabric or webbing material 284 are folded or wrapped laterally around the cut-resistant, polymeric fibers, filaments, cables, threads or yarns 110, 112, 114, or 116 and enclose the cut-resistant, polymeric fibers, filaments, cables, threads or yarns 110, 112, 114, or 116. The first fabric or webbing material 220 and the second fabric or webbing material 284 are coupled, such as through stitching 212 or an adhesive (not separately illustrated), to secure the cut-resistant, polymeric fibers, filaments, cables, threads or yarns 110, 112, 114, or 116 in place. In a representative embodiment, as an option as illustrated, the first fabric or webbing material 220 also has central folds 222, creating a double layer of first fabric or webbing material 220 on a first side 308 of the strap 20P, coupled through stitches 212 (or an adhesive, as previously described). As an option for this representative embodiment, not separately illustrated, the second fabric or webbing material 284 does not extend fully along the second side 312 of the strap 20P (e.g., does not include a central or middle portion 314, and instead includes centrally arranged filler material), and is embodied instead in the form of two or more lateral bindings which are respectively folded and wrapped around the laterally-arranged cut-resistant, polymeric fibers, filaments, cables, threads or yarns 110, 112, 114, or 116 and within the lateral folds 218 of the first fabric or webbing material 220. As another option for this representative embodiment, additional cut-resistant, polymeric fibers, filaments, cables, threads or yarns 110, 112, 114, or 116 may be included, such as arranged centrally (in the middle) of the interior of the strap 20P and enclosed by the first fabric or webbing material 220 and any intervening layers (such as second fabric or webbing material 284, not separately illustrated).

Figure 68:
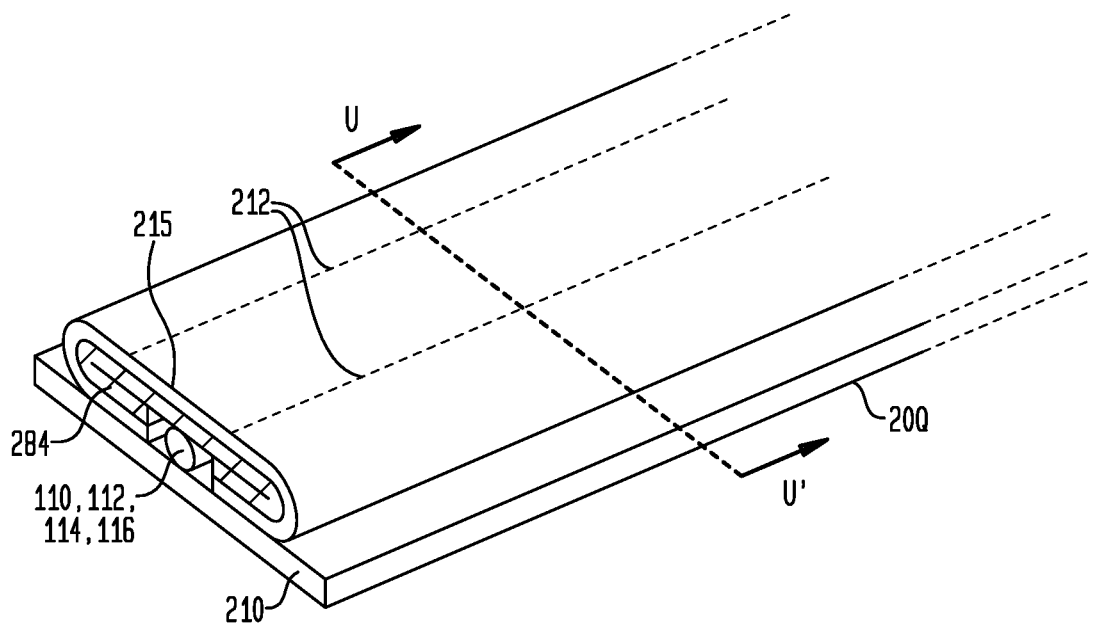
FIG. 68 is an isometric view illustrating a sixteenth embodiment of a carrying strap formed from nonmetallic, cut-resistant yarns or fibers and routed, knit, woven, or spun nonmetallic, cut-resistant yarns or fibers.
Figure 69:
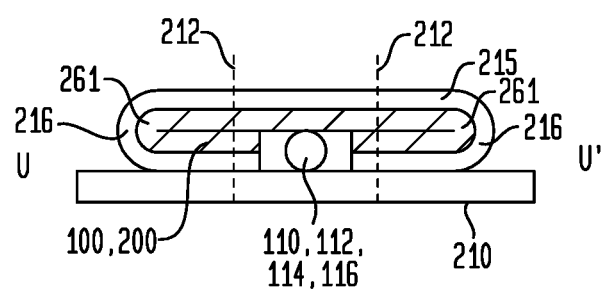
FIG. 69 is a cross-sectional view (through the U-U' plane) of the sixteenth embodiment of a carrying strap illustrated in FIG. 68.

FIG. 68 is an isometric view illustrating a sixteenth embodiment of a carrying strap 20Q formed from nonmetallic, cut-resistant yarns or fibers and routed, knit, woven, or spun nonmetallic, cut-resistant yarns or fibers. FIG. 69 is a cross-sectional view (through the U-U' plane) of the sixteenth embodiment of a carrying strap 20Q illustrated in FIG. 68. As illustrated in FIGS. 68 and 69, carrying strap 20Q comprises a first webbing material 210 which does not include cut-resistant, polymeric fibers, filaments, cables, threads or yarns 110, 112, 114, or 116, which is coupled such as through stitching 212 (and/or an adhesive, not separately illustrated) to a second fabric or webbing material 284 which does include a polymeric fiber matrix 125 having cut-resistant, polymeric fibers, filaments, cables, threads or yarns 110, 112, 114, or 116, and cut-resistant, polymeric fibers, filaments, cables, threads or yarns 110, 112, 114, or 116 which are arranged centrally along the longitudinal middle of the strap 20Q in between the first webbing material 210 and the second fabric or webbing material 284. In a representative embodiment, the second fabric or webbing material 284 may be comprised of a security panel assembly 100 or a cut-resistant fabric 200, for example and without limitation. As illustrated, the second fabric or webbing material 284 (e.g., a security panel assembly 100 or a cut-resistant fabric 200) has lateral folds 261 and has been at least partially wrapped in the lateral dimension around its lateral folds 261 by a third fabric or webbing material 215 having lateral folds 216 and extending toward the center of the strap 20Q in between the second fabric or webbing material 284 and the first webbing material 210, and secured through stitching 212 (and/or an adhesive, not separately illustrated). The third fabric or webbing material 215 typically does not have, although it may have, a polymeric fiber matrix 125 having cut-resistant, polymeric fibers, filaments, cables, threads or yarns 110, 112, 114, or 116. As an option for this representative embodiment, not separately illustrated, additional cut-resistant, polymeric fibers, filaments, cables, threads or yarns 110, 112, 114, or 116 may be included, such as arranged within the lateral folds 261 of the second fabric or webbing material 284.

Figure 70:
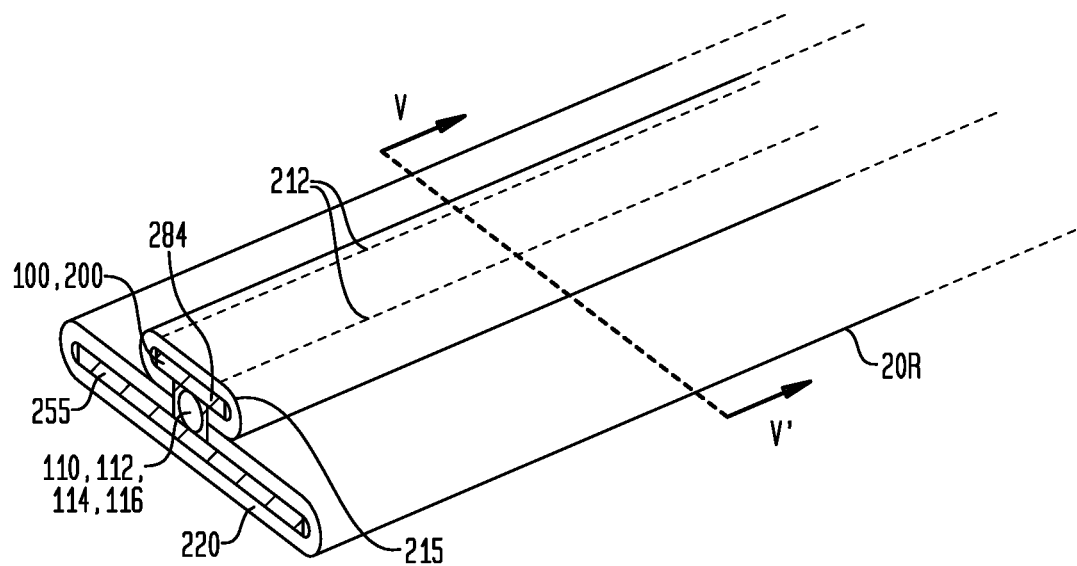
FIG. 70 is an isometric view illustrating a seventeenth embodiment of a carrying strap formed from nonmetallic, cut-resistant yarns or fibers and routed, knit, woven, or spun nonmetallic, cut-resistant yarns or fibers.
Figure 71:
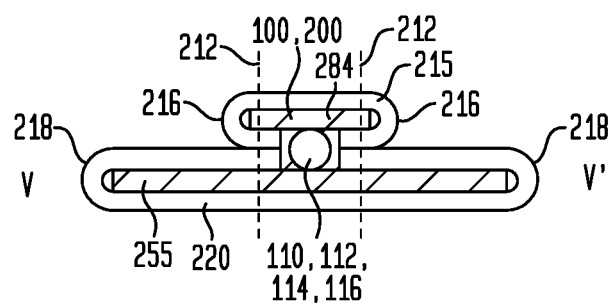
FIG. 71 is a cross-sectional view (through the V-V' plane) of the seventeenth embodiment of a carrying strap illustrated in FIG. 70.

FIG. 70 is an isometric view illustrating a seventeenth embodiment of a carrying strap 20R formed from nonmetallic, cut-resistant yarns or fibers and routed, knit, woven, or spun nonmetallic, cut-resistant yarns or fibers. FIG. 71 is a cross-sectional view (through the V-V' plane) of the seventeenth embodiment of a carrying strap 20R illustrated in FIG. 70. As illustrated in FIGS. 70 and 71, carrying strap 20R comprises a first, filler material core 255 which generally does not include a polymeric fiber matrix 125 having cut-resistant, polymeric fibers, filaments, cables, threads or yarns 110, 112, 114, or 116, and a first fabric or webbing material 220 (also which optionally does not include a polymeric fiber matrix 125 having cut-resistant, polymeric fibers, filaments, cables, threads or yarns 110, 112, 114, or 116). The first fabric or webbing material 220 is folded or wrapped laterally (lateral folds 218) around the first, filler material core 255, which are coupled such as through stitching 212 (and/or an adhesive, not separately illustrated) to a second fabric or webbing material 284 which does include a polymeric fiber matrix 125 having cut-resistant, polymeric fibers, filaments, cables, threads or yarns 110, 112, 114, or 116, and cut-resistant, polymeric fibers, filaments, cables, threads or yarns 110, 112, 114, or 116 which are arranged centrally along the longitudinal middle of the strap 20R in between the first, filler material core 255 (and/or the first fabric or webbing material 220) and the second fabric or webbing material 284. In a representative embodiment, the second fabric or webbing material 284 may be comprised of a security panel assembly 100 or a cut-resistant fabric 200, for example and without limitation. As illustrated, the second fabric or webbing material 284 (e.g., a security panel assembly 100 or a cut-resistant fabric 200) has been at least partially wrapped in the lateral dimension by a third fabric or webbing material 215 having lateral folds 216 and extending toward the center of the strap 20R in between the second fabric or webbing material 284 and the first fabric or webbing material 220 (and/or second fabric or webbing material 284), and secured through stitching 212 (and/or an adhesive, not separately illustrated). The third fabric or webbing material 215 typically does not have, although it may have, a polymeric fiber matrix 125 having cut-resistant, polymeric fibers, filaments, cables, threads or yarns 110, 112, 114, or 116. As an option for this representative embodiment, not separately illustrated, additional cut-resistant, polymeric fibers, filaments, cables, threads or yarns 110, 112, 114, or 116 may be included, such as arranged within any of the various lateral folds 218, 216.

As another option for this representative strap 20R embodiment, not separately illustrated, using the same illustrated folded structure of the first fabric or webbing material 220 and the third fabric or webbing material 215, the first, filler material core 255 may be replaced by a cut-resistant fabric or webbing 235 or a cut-resistant second fabric or webbing material 284, for example and without limitation. As another option for this representative strap 20R embodiment, not separately illustrated, using the same illustrated folded structure of the first fabric or webbing material 220 and the third fabric or webbing material 215, the cut-resistant second fabric or webbing material 284 may be omitted, for example and without limitation, while including the centrally arranged cut-resistant, polymeric fibers, filaments, cables, threads or yarns 110, 112, 114, or 116. For such embodiments, any of the various second fabric or webbing material 284 in other locations (such as wrapped within the folded third fabric or webbing material 215) and/or cut-resistant, polymeric fibers, filaments, cables, threads or yarns 110, 112, 114, or 116 may be omitted or included, optionally.

Figure 72:
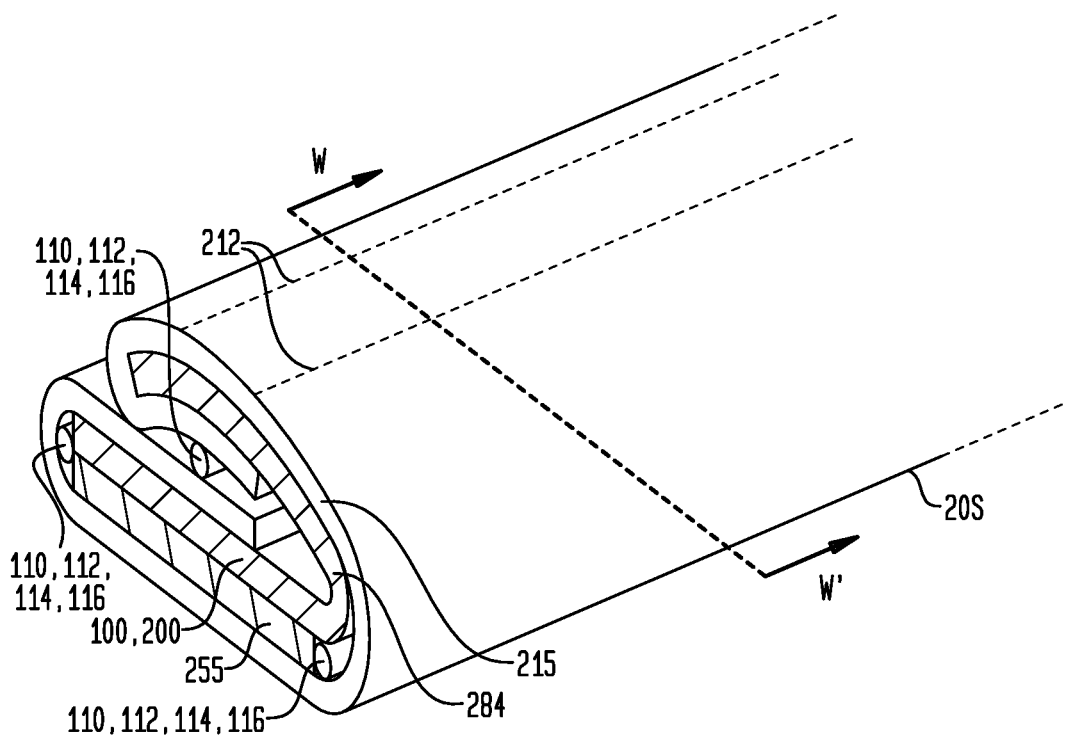
FIG. 72 is an isometric view illustrating an eighteenth embodiment of a carrying strap formed from nonmetallic, cut-resistant yarns or fibers and routed, knit, woven, or spun nonmetallic, cut-resistant yarns or fibers.
Figure 73:
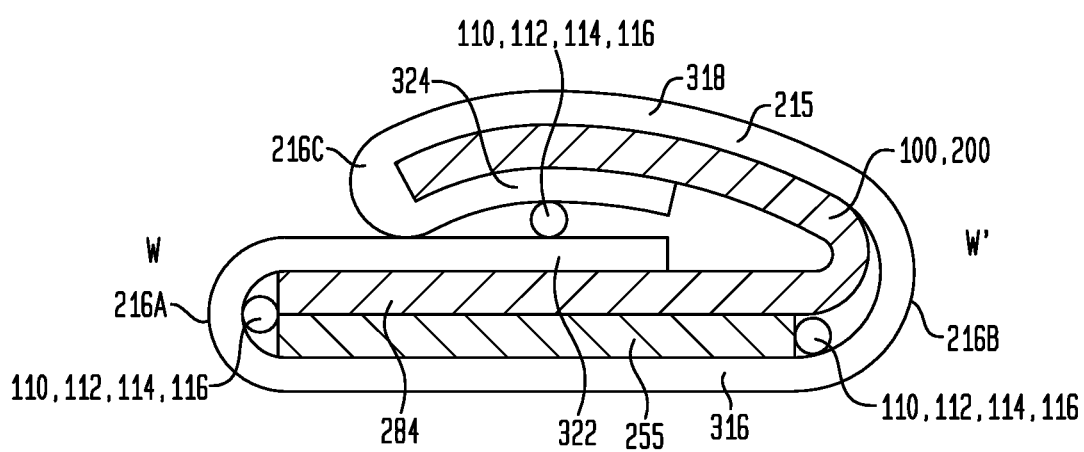
FIG. 73 is a cross-sectional view (through the W-W' plane) of the eighteenth embodiment of a carrying strap illustrated in FIG. 72.

FIG. 72 is an isometric view illustrating an eighteenth embodiment of a carrying strap 20S formed from nonmetallic, cut-resistant yarns or fibers and routed, knit, woven, or spun nonmetallic, cut-resistant yarns or fibers. FIG. 73 is a cross-sectional view (through the W-W' plane) of the eighteenth embodiment of a carrying strap 20S illustrated in FIG. 72. As illustrated in FIGS. 72 and 73, carrying strap 20S comprises a first, filler material core 255 which generally does not include a polymeric fiber matrix 125 having cut-resistant, polymeric fibers, filaments, cables, threads or yarns 110, 112, 114, or 116, and a second fabric or webbing material 284 which does include a polymeric fiber matrix 125 having cut-resistant, polymeric fibers, filaments, cables, threads or yarns 110, 112, 114, or 116, which may be arranged in a plurality of locations within the strap 20S as illustrated using dashed lines. In a representative embodiment, the second fabric or webbing material 284 may be comprised of a security panel assembly 100 or a cut-resistant fabric 200, for example and without limitation. A third fabric or webbing material 215 is folded or wrapped laterally (first lateral fold 216A extending toward the center of the strap 20S, and second lateral fold 216B) around the first, filler material core 255 and second fabric or webbing material 284 (when included at the location next to the first, filler material core 255), and folded again (third lateral fold 216C also extending toward the center of the strap 20S) to form a plurality of layers of the third fabric or webbing material 215, a first bottom layer 316, a second top layer 318, and third and fourth intermediate layers 322 and 324. As an option, cut-resistant, polymeric fibers, filaments, cables, threads or yarns 110, 112, 114, or 116 are arranged centrally along the longitudinal middle of the strap 20S in between the third and fourth intermediate layers 322 and 324 of the folded third fabric or webbing material 215, and/or within the lateral folds 216A, 216B, and/or 216C.

In a representative embodiment, the second fabric or webbing material 284 may be arranged centrally, along the longitudinal middle of the strap 20S, in any of a plurality of locations, such as (1) in between the third intermediate layer 322 and the first bottom layer 316 of the third fabric or webbing material 215; or (2) in between the fourth intermediate layer 324 and the second top layer 318; or (3) the second fabric or webbing material 284 may be arranged in between the third intermediate layer 322 and the first bottom layer 316 of the third fabric or webbing material 215 and may further extend around (within lateral fold 216B) in between the fourth intermediate layer 324 and the second top layer 318. The first, filler material core 255, the second fabric or webbing material 284, and the folded third fabric or webbing material 215 are secured through stitching 212 (and/or an adhesive, not separately illustrated). The third fabric or webbing material 215 typically does not have, although it may have, a polymeric fiber matrix 125 having cut-resistant, polymeric fibers, filaments, cables, threads or yarns 110, 112, 114, or 116. As an option for this representative embodiment, additional cut-resistant, polymeric fibers, filaments, cables, threads or yarns 110, 112, 114, or 116 may be included, such as arranged within any of the various lateral folds 216A, 216B, 216C, as illustrated, for example and without limitation.

As another option for this representative strap 20S embodiment, not separately illustrated, using the same illustrated folded structure of the third fabric or webbing material 215, the third fabric or webbing material 215 may be replaced by a cut-resistant fabric or webbing 235, for example and without limitation. For such an embodiment, any of the various second fabric or webbing material 284 and/or cut-resistant, polymeric fibers, filaments, cables, threads or yarns 110, 112, 114, or 116 may be omitted or included, optionally.

Such exchanges of any of the various cut-resistant and non-cut-resistant fabric and webbing materials, and inclusion of non-inclusion of cut-resistant, polymeric fibers, filaments, cables, threads or yarns 110, 112, 114, or 116 and/or a polymeric fiber matrix 125, may be performed for any of the various straps 20, as necessary or desirable, to tailor the cut-resistance of the strap 20 to any desired level, e.g., to an ANSI level A5, for example. In addition, any of the fabric, webbing or other material components straps may include any additional lateral folds, which may be upward folds or downward folds, extending toward or away from the longitudinal center or middle of the strap 20, which may also be coupled (such as through stitching or adhesive) to other fabric, webbing or other material components straps 20.

Figure 74:
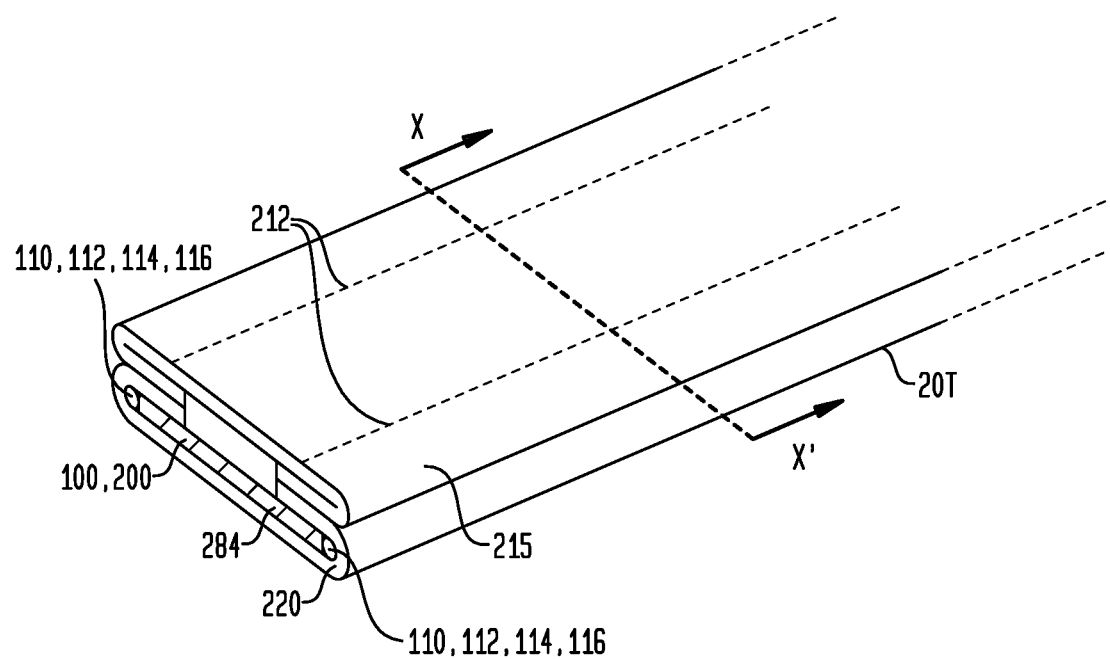
FIG. 74 is an isometric view illustrating a nineteenth embodiment of a carrying strap formed from routed, knit, woven, or spun nonmetallic, cut-resistant yarns or fibers.
Figure 75:
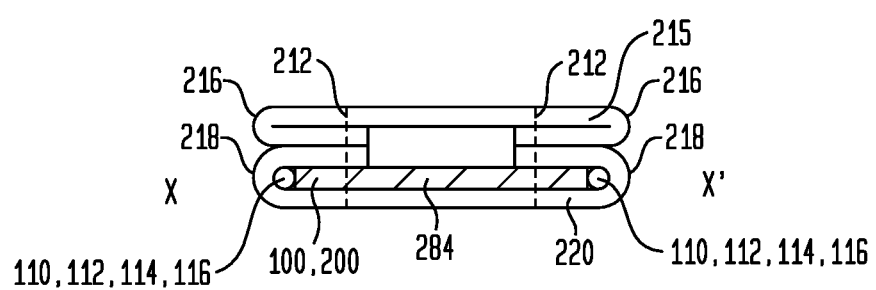
FIG. 75 is a cross-sectional view (through the X-X' plane) of the nineteenth embodiment of a carrying strap illustrated in FIG. 74.

FIG. 74 is an isometric view illustrating a nineteenth embodiment of a carrying strap 20T formed from routed, knit, woven, or spun nonmetallic, cut-resistant yarns or fibers. FIG. 75 is a cross-sectional view (through the X-X' plane) of the nineteenth embodiment of a carrying strap 20T illustrated in FIG. 74. As illustrated in FIGS. 74 and 75, carrying strap 20T (as a variant of the strap 20B structure) comprises a first fabric or webbing material 220 which does not include a polymeric fiber matrix 125 having cut-resistant, polymeric fibers, filaments, cables, threads or yarns 110, 112, 114, or 116, which is folded (upward lateral folds 218), wraps around and is coupled such as through stitching 212 (and/or an adhesive, not separately illustrated) to a second fabric or webbing material 284 which does include a polymeric fiber matrix 125 having cut-resistant, polymeric fibers, filaments, cables, threads or yarns 110, 112, 114, or 116. In a representative embodiment, the second fabric or webbing material 284 may be comprised of a security panel assembly 100 or a cut-resistant fabric 200, for example and without limitation. As illustrated, the second fabric or webbing material 284 (e.g., a security panel assembly 100 or a cut-resistant fabric 200) has been at least partially wrapped in the lateral dimension around its lateral edges 214 by the first fabric or webbing material 220 having lateral folds 218 and extending toward the center of the strap 20T. A third fabric or webbing material 215 which typically does not have, although it may have, a polymeric fiber matrix 125 having cut-resistant, polymeric fibers, filaments, cables, threads or yarns 110, 112, 114, or 116, has (downward) lateral folds 216. The first fabric or webbing material 220 (through its lateral folds 218) is coupled such as through stitching 212 (and/or an adhesive, not separately illustrated) to the second fabric or webbing material 284, and to the third fabric or webbing material 215 (through its lateral folds 216). As an option for this representative embodiment, additional cut-resistant, polymeric fibers, filaments, cables, threads or yarns 110, 112, 114, or 116 may be included, illustrated as arranged laterally to the lateral edges 214 of the second fabric or webbing material 284 and included within the lateral folds 218 of the first fabric or webbing material 220 or included within the lateral folds 216 of the third fabric or webbing material 215.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. One having skill in the art will further recognize that additional or equivalent method steps may be utilized, or may be combined with other steps, or may be performed in different orders, any and all of which are within the scope of the claimed invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment and not necessarily in all embodiments, and further, are not necessarily referring to the same embodiment. Furthermore, the particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect structural coupling, connection or attachment, or adaptation or capability for such a direct or indirect structural coupling, connection or attachment, including integrally formed components and components which are coupled via or through another component.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" shall not be limited to a single item or element and include plural references unless the context clearly dictates otherwise and unless specifically disclaimed. Also as used in the description herein and throughout the claims that follow, the meaning of "in" includes "in" and "on" unless the context clearly dictates otherwise. By way of example, though specific claim language may include the word "between", the interpretation of such a word shall not be limited to preclude extent of elements beyond boundaries of the example unless specific disclaimer is made or unless by virtue of prosecution the term is to be limited. The examples of the invention should therefore not be interpreted as limiting unless indicated as such.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. Thus, while there has been set forth embodiments of the invention, the invention is to be limited only by the following claims and equivalents.

What is claimed is:

1. A carrying strap comprising:
   a first flexible fabric or webbing, the first flexible fabric or webbing having a first lateral fold and a second lateral fold;
   a security panel assembly coupled to the first flexible fabric or webbing, the security panel assembly arranged within the first and second lateral folds, the security panel assembly comprising a a monofilament polymeric fiber netting haying at least one first monofilament polymeric fiber arranged as a plurality of coupled and bonded polymeric fiber crossings, each coupled and bonded polymeric fiber crossing comprising at least two sections of the at least one first monofilament polymeric fiber coupled and bonded to each other, the at least one first monofilament polymeric fiber comprising at least one monofilament polymeric fiber, filament, cable, thread or yarn; and
   a second flexible fabric or webbing coupled over the first flexible fabric or webbing or the security panel assembly to enclose the security panel assembly between the first flexible fabric or webbing and the second flexible fabric or webbing.

2. The carrying strap of claim 1, wherein the carrying strap has a cut-resistance level to withstand an applied cutting force up to 3,000 grams applied over 20 mm laterally across the carrying strap.

3. The carrying strap of claim 1, wherein the security panel assembly further comprises:
   first flexible material layer having a first side and a plurality of edges, the monofilament polymeric fiber netting arranged on the first side of the first flexible material layer; and
   a second flexible material layer arranged adjacent to the monofilament polymeric fiber netting and coupled to the first side of the first flexible material layer with a plurality of stitches, or with an adhesive, or with both a plurality of stitches and an adhesive, to form the security panel assembly.

4. The carrying strap of claim 1, further comprising:
   at least one multifilament fiber, cable, thread or yarn arranged laterally to the security panel assembly and further arranged within the first lateral fold or the second lateral fold of the first flexible fabric or webbing.

5. The carrying strap of claim 4, wherein the at least one multifilament fiber, cable, thread or yarn comprises at least one polymeric fiber, filament, cable, thread or yarn and either or both at least one carbon fiber or at least one metallic wire, fiber, filament, cable, thread or yarn.

6. The carrying strap of claim 1, wherein she as least one first monofilament polymeric fiber, filament, cable, thread or yarn comprises at least one material selected from the group consisting of: aramid; liquid crystal polymer;
   polyethylene; ultra high molecular weight polyethylene ("UHMWPE") having a molecular mass between 3.5 and 7.5 million Daltons; high-modulus polyethylene ("HMPE"); High Performance Polyethylene ("HPPE"); glass; nylon; polyester; and
   combinations thereof.

7. The carrying strap of claim 1, further comprising:
   a polymeric fiber matrix comprising a plurality of knitted or woven fibers, filaments, cables, threads, or yarns.

8. The carrying strap of claim 1, further comprising:
   a polymeric fiber matrix comprising a plurality of knitted or woven fibers, filaments, cables, threads, or yarns arranged in a crossing or quilting pattern on a first side of a first flexible material layer and extending on a second side of the first flexible material layer or an intervening flexible material layer.

9. The carrying strap of claim 1, wherein the second flexible fabric or webbing is coupled to the first flexible fabric or webbing with a plurality of stitches, or with an adhesive, or with both a plurality of stitches and an adhesive.

10. The carrying strap of claim 1, wherein the first flexible fabric or webbing further has first and second central folds over the security panel assembly.

11. The carrying strap of claim 1, further comprising:
    a plurality of second monofilament polymer fibers arranged laterally to the security panel assembly and further arranged within the first lateral fold or the second lateral fold of the first flexible fabric or webbing.

12. The carrying strap of claim 1, further comprising:
a flexible binding coupled over the first flexible fabric or webbing.

13. The carrying strap of claim 1, further comprising:
at least one flexible binding coupled over the first flexible fabric or webbing or the second flexible fabric or webbing.

14. The carrying strap of claim 1, further comprising:
a first flexible binding of a plurality of flexible bindings coupled over the first and second flexible fabrics or webbings on a first lateral side; and
a second flexible binding of the plurality of flexible bindings coupled over the first and second flexible fabrics or webbings on a second lateral side.

15. The carrying strap of claim 1, further comprising:
at least one second cut-resistant multifilament or monofilament polymeric fiber, cable, thread or yarn arranged centrally between the first and second lateral folds and between the first flexible fabric or webbing and the second flexible fabric or webbing.

16. A carrying strap comprising:
a first flexible fabric or webbing, the first flexible fabric or webbing having a first lateral fold and a second lateral fold;
a security panel assembly coupled to the first flexible fabric or webbing, the security panel assembly arranged within the first and second lateral folds, the security panel assembly comprising a netting having at least one first monofilament polymeric fiber arranged as a plurality of coupled and bonded monofilament polymeric fiber crossings, each coupled and bonded monofilament fiber crossing comprising at least two sections of the at least one monofilament polymeric fiber coupled and bonded to each other;
at least one second monofilament or multifilament fiber, cable, thread or yarn arranged laterally to the security panel assembly and further arranged within the first lateral fold or the second lateral fold of the first flexible fabric or webbing; and
a second flexible fabric or webbing coupled over the first flexible fabric or webbing or the security panel assembly to enclose the security panel assembly between the first flexible fabric or webbing and the second flexible fabric or webbing;
wherein the carrying strap has a cut-resistance level to withstand an applied cutting force up to 3,000 grams applied over 20 mm laterally across the carrying strap.

17. The carrying strap of claim 16, further comprising:
at least one third multifilament or monofilament polymeric fiber, cable, thread or yarn arranged centrally between the first and second lateral folds and between the first flexible fabric or webbing and the second flexible fabric or webbing.

18. The carrying strap of claim 16, further comprising:
a flexible binding coupled over the first flexible fabric or webbing.

19. A carrying strap comprising:
a first flexible fabric or webbing;
a security panel assembly coupled to the first flexible fabric or webbing, the security panel assembly comprising:
a first flexible material layer having a first side and a plurality of edges; and
a polymeric fiber matrix arranged on the first side of the first flexible material layer, the polymeric fiber matrix comprising a netting having at least one first monofilament polymeric fiber arranged as a plurality of coupled and bonded monofilament polymeric fiber crossings, each coupled and bonded monofilament fiber crossing comprising at least two sections of the at least one first monofilament polymeric fiber coupled and bonded to each other;
a second flexible material layer arranged adjacent to the polymeric fiber matrix and coupled to the first side of the first flexible material layer with a plurality of stitches, or with an adhesive, or with both a plurality of stitches and an adhesive;
a second flexible fabric or webbing coupled over the first flexible fabric or webbing or the security panel assembly to enclose the security panel assembly between the first flexible fabric or webbing and the second flexible fabric or webbing; and
at least one second monofilament or multifilament fiber, cable, thread or yarn either arranged laterally to the security panel assembly and within the first lateral fold or the second lateral fold of the first flexible fabric or webbing or arranged centrally between the first and second lateral folds and between the first flexible fabric or webbing and the second flexible fabric or webbing.

* * * * *